US012296921B2

(12) United States Patent
Braedt et al.

(10) Patent No.: US 12,296,921 B2
(45) Date of Patent: May 13, 2025

(54) ELECTRIC BICYCLE DRIVE UNIT

(71) Applicant: SRAM DEUTSCHLAND GmbH, Schweinfurt (DE)

(72) Inventors: Henrik Braedt, Dittelbrunn (DE); Sebastian Heyna, Dittelbrunn (DE)

(73) Assignee: SRAM DEUTSCHLAND GmbH, Schweinfurt (DE)

( * ) Notice: Subject to any disclaimer, the term of this patent is extended or adjusted under 35 U.S.C. 154(b) by 35 days.

(21) Appl. No.: 17/725,047

(22) Filed: Apr. 20, 2022

(65) Prior Publication Data

US 2022/0332389 A1 Oct. 20, 2022

(30) Foreign Application Priority Data

| Apr. 20, 2021 | (DE) | 10 2021 002 051.0 |
| Oct. 30, 2021 | (DE) | 10 2021 005 374.5 |
| Apr. 19, 2022 | (DE) | 10 2022 109 481.2 |

(51) Int. Cl.
  *B62M 6/55* (2010.01)
  *B62J 43/13* (2020.01)

(52) U.S. Cl.
  CPC .............. *B62M 6/55* (2013.01); *B62J 43/13* (2020.02)

(58) Field of Classification Search
  CPC . B62M 6/55; B62M 6/40; B62J 43/13; B62K 19/34
  See application file for complete search history.

(56) References Cited

U.S. PATENT DOCUMENTS

| 6,276,479 | B1 * | 8/2001 | Suzuki | B62M 6/45 |
| | | | | 180/68.5 |
| 9,966,785 | B2 | 5/2018 | Kato et al. | |
| 10,179,626 | B2 * | 1/2019 | Arbour | B62K 19/30 |
| 10,773,769 | B2 * | 9/2020 | Takeshita | B62M 6/90 |
| 2005/0029033 | A1 | 2/2005 | Rip | |
| 2014/0191705 | A1 | 7/2014 | Takao | |
| 2016/0336559 | A1 | 11/2016 | White | |
| 2017/0012455 | A1 | 1/2017 | Kato | |
| 2017/0021739 | A1 | 1/2017 | Tsuji | |
| 2017/0036735 | A1 * | 2/2017 | Douglas | B62K 21/12 |
| 2018/0222332 | A1 | 8/2018 | Hosaka | |
| 2019/0103754 | A1 | 4/2019 | Mali | |

(Continued)

FOREIGN PATENT DOCUMENTS

| CN | 204587213 U | 8/2015 |
| CN | 105947078 | 9/2016 |

(Continued)

*Primary Examiner* — Paul N Dickson
*Assistant Examiner* — Matthew Joseph Ganci

(57) ABSTRACT

The disclosure relates to an electric Bicycle Drive Unit for arrangement in a Bottom Bracket Area of a Bicycle Frame. The Drive Unit has an Electric Motor Device and a Bottom Bracket Assembly having a Bottom Bracket Shaft. The disclosure also relates to a Bicycle Frame or Frame Interface Unit, and an Energy Storage Device for the Electric Bicycle Drive Unit. The Drive Unit includes s an Integrative Energy Storage Device for supplying energy to the motor device. The Integrative Energy Storage Device can be arranged adjacent to the motor device in such a way that the center of gravity position of the Energy Storage Device and the center of gravity position of the Drive Unit lie within the Bottom Bracket Area.

20 Claims, 34 Drawing Sheets

(56) References Cited

U.S. PATENT DOCUMENTS

| | | | |
|---|---|---|---|
| 2020/0062341 A1* | 2/2020 | Talavasek | B62K 25/02 |
| 2020/0247500 A1* | 8/2020 | Zawistowski | B62J 43/23 |
| 2020/0247502 A1* | 8/2020 | Mitsuyasu | B62M 6/90 |
| 2021/0016850 A1 | 1/2021 | Bass et al. | |
| 2021/0147032 A1 | 5/2021 | Farrell | |
| 2021/0155315 A1 | 5/2021 | Hahn | |
| 2022/0033032 A1 | 2/2022 | Sendo | |
| 2022/0123581 A1 | 4/2022 | Clarke | |
| 2022/0233382 A1 | 7/2022 | Williams | |

FOREIGN PATENT DOCUMENTS

| | | | |
|---|---|---|---|
| CN | 107776823 | 3/2018 | |
| CN | 107925262 | 4/2018 | |
| CN | 215399137 U | 1/2022 | |
| CN | 114394193 | 4/2022 | |
| DE | 102016106037 | 10/2017 | |
| DE | 102017100722 | 7/2018 | |
| DE | 102021104614 | 9/2022 | |
| DE | 102022109481 | 10/2022 | |
| EP | 1449755 | 8/2004 | |
| EP | 3444176 B1 * | 2/2020 | B62K 11/04 |
| EP | 3838654 | 6/2021 | |
| EP | 3851365 | 7/2021 | |
| FR | 3043982 | 5/2017 | |
| FR | 3046401 A1 | 7/2017 | |
| TW | M515499 U | 1/2016 | |
| WO | 2016205974 A1 | 12/2016 | |
| WO | 2019149668 A1 | 8/2019 | |
| WO | 2021077309 | 4/2021 | |
| WO | 2022177436 | 8/2022 | |

\* cited by examiner

Stand der Technik

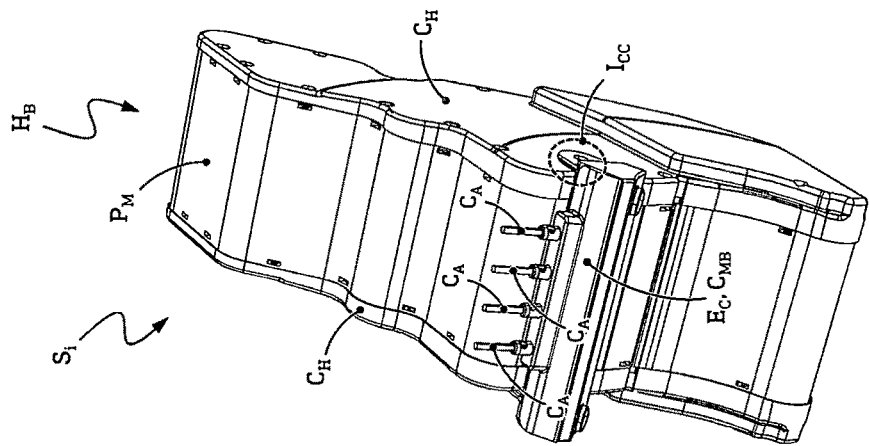
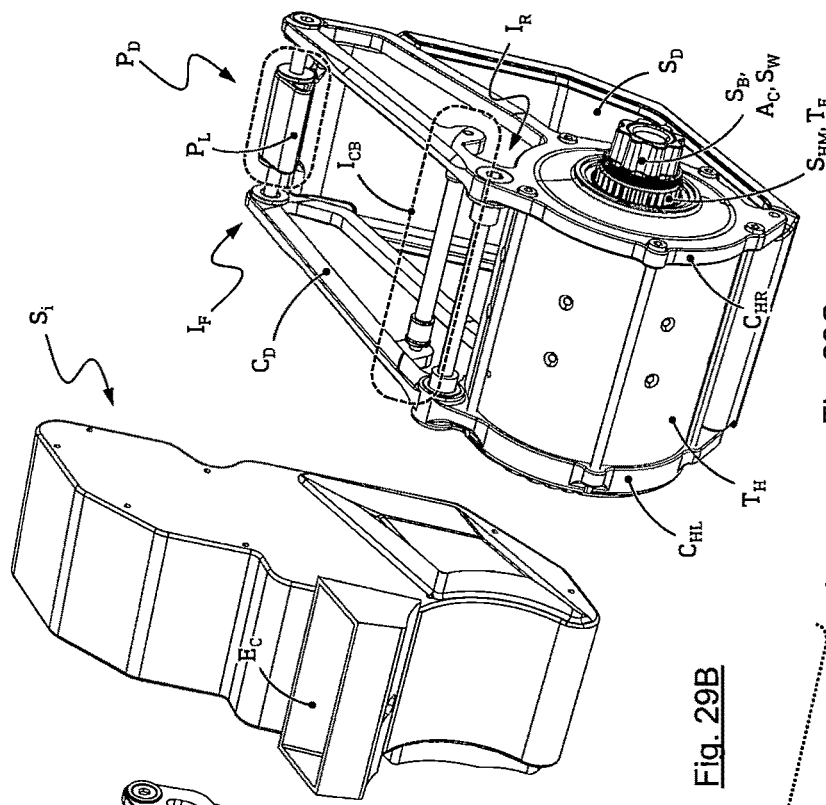
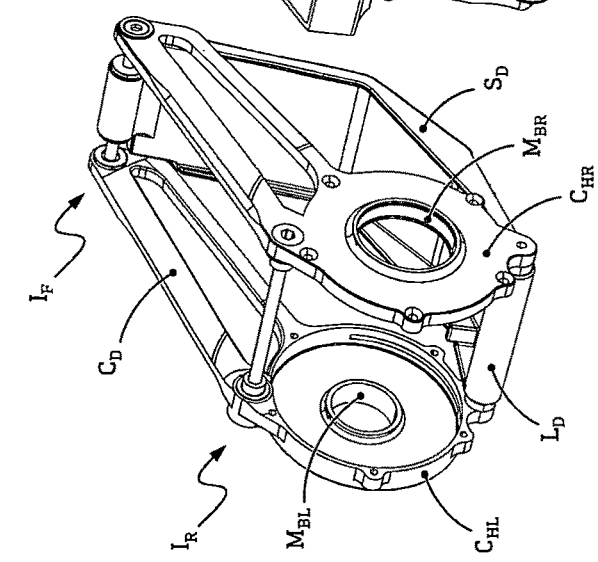
Fig. 29A
Fig. 29B
Fig. 29C
Fig. 29D

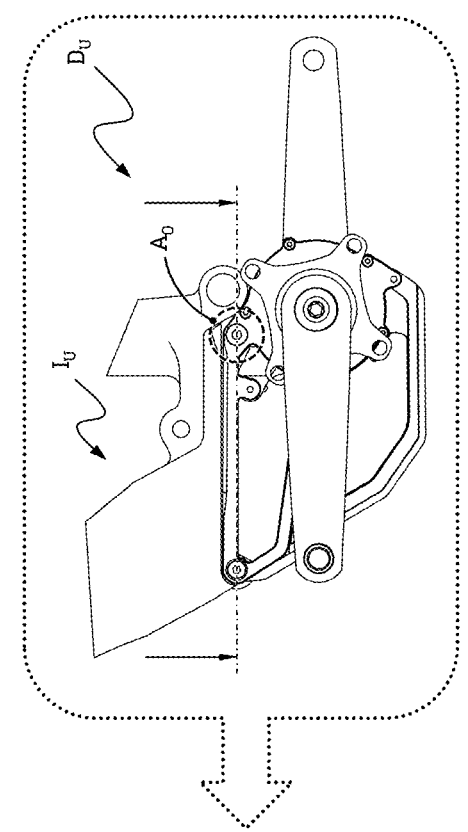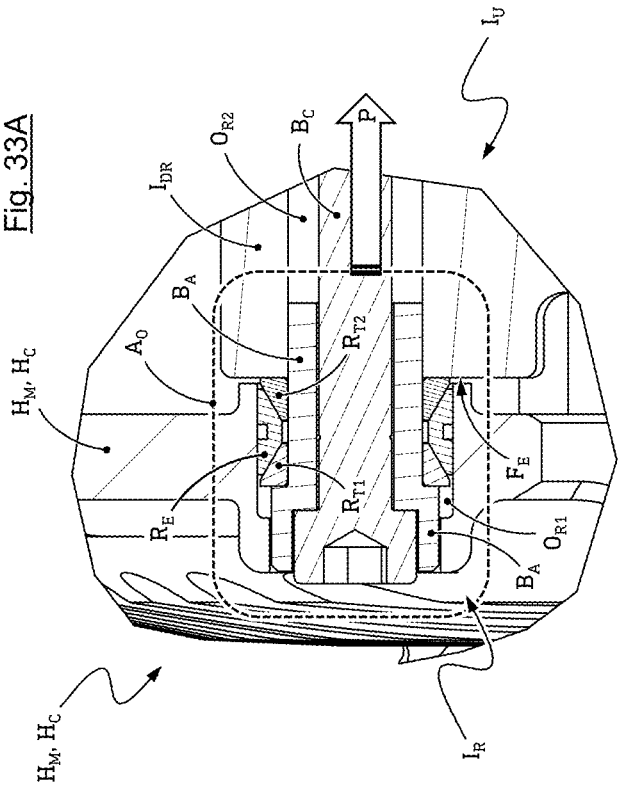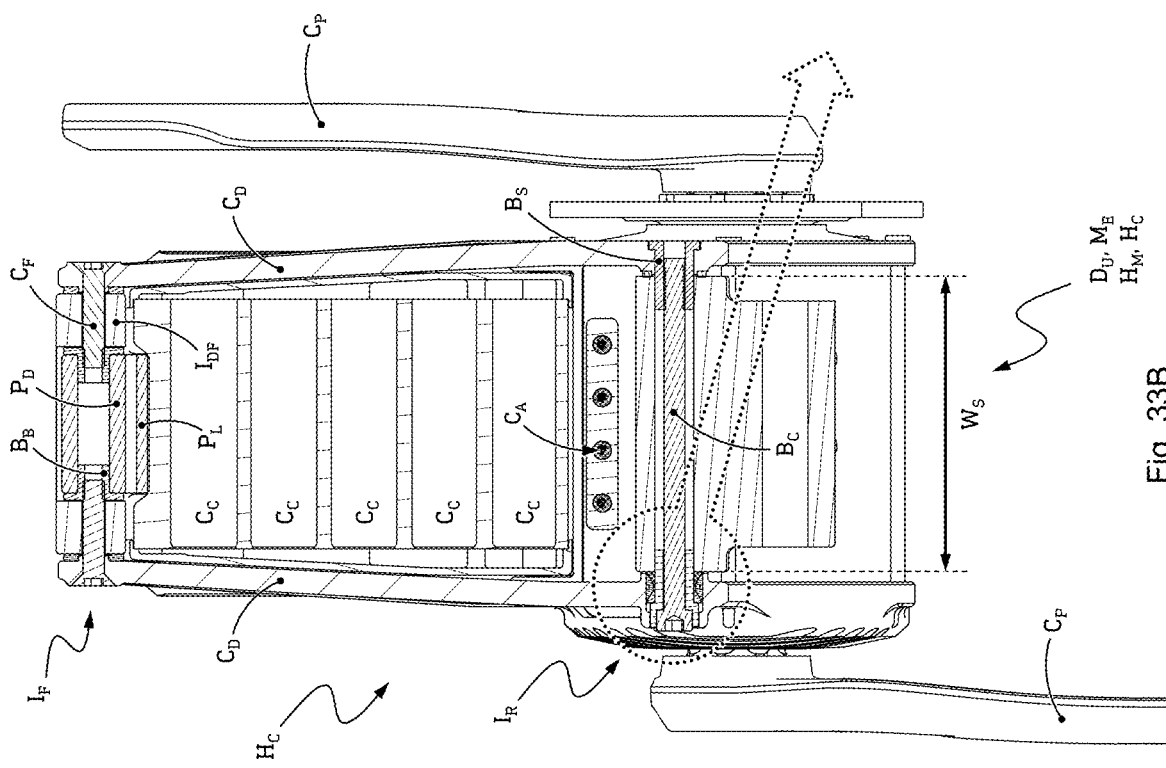
Fig. 33A
Fig. 33C
Fig. 33B

ELECTRIC BICYCLE DRIVE UNIT

This application claims priority to, and/or the benefit of, German patent applications DE 10 2021 002 051.0 filed Apr. 20, 2021, and DE 10 2021 005 374.5 filed Oct. 30, 2021, and DE 10 2022 109 481.2 filed Apr. 19, 2022, the contents of which are incorporated herein in their entirety.

FIELD OF THE DISCLOSURE

The present disclosure relates to an Electric Bicycle Drive Unit, a Bicycle Frame or Frame Interface Unit, and an Energy Storage Device.

BACKGROUND

Off-road bikes with electric power assistance are becoming increasingly popular. These bikes, also known as e-mountain bikes or E-MTBs for short, are divided into categories such as "cross country," "trail," "enduro" and "downhill" and are also used for sporting purposes.

Such applications place high demands on the robustness, frame rigidity and "handling" of the E-MTB. When handling the E-MTB, the center of gravity of the bike is of particular importance. A high center of gravity of the bike impairs cornering and increases the risk of rollovers during strong braking deceleration or in steep downhill sections.

The distance between the bicycle's center of gravity and the rear wheel axle is also of particular importance. The further forward the center of gravity of the bicycle is in the direction of travel, the higher the risk of rollover and the more difficult it becomes for the rider to lift the front wheel, especially in cases without the assistance of a drive torque.

Lifting the front wheel is one of the most important driving techniques, which is used in a wide variety of driving situations. In this way, larger obstacles and steps can be overcome, or bumps can be ridden over at high speed. Compared to bicycles or mountain bikes without an assist drive, the weight of the batteries and the motor is particularly important in this respect.

Furthermore, the distance between the rear wheel axle and the Bottom Bracket Shaft of electric mountain bikes tends to be larger than on mountain bikes without an auxiliary drive, as the electric motor also takes up installation space in the area of the bottom bracket shaft, and as there is therefore less radial clearance available there for the rear wheel tire. In full-suspension bicycles, the additional electric drive also affects the installation space for the bridge between the chainstays in the area of the bottom bracket, which is usually required for stability reasons. Depending on the rear suspension kinematics used for the rear wheel suspension, there may also be a conflict of installation space with corresponding rear suspension pivot joints.

Moreover, the frame stiffness as well as the frame weight of E-MTBs is usually compromised by open down tube constructions, which are mostly required in known E-MTBs to accommodate the drive battery. In particular, the torsional load due to pedal loads or torque input via the headset can be absorbed much better via a down tube with an intact tube cross-section, since the moment of resistance against torsion is much higher with a closed tube cross-section than with such a U-shaped profile cross-section.

It also follows from this that a closed tube cross-section has a better stiffness/weight ratio than the known open profile cross-sections. Furthermore, connecting elements for accommodating and fastening drive batteries in or on the Down Tube increase the complexity and weight of the Bicycle Frame. Due to the considerable distance of such drive batteries from the rear wheel axle, the center of gravity of the bicycle is shifted further forward to the detriment of handling.

SUMMARY

What is disclosed is an Electric Bicycle Drive Unit for arrangement in a Bottom Bracket Area of a Bicycle Frame having the features as described in this disclosure. Also disclosed is a Bicycle Frame or a Frame Interface Unit for the Electric Bicycle Drive Unit. An Integrated Energy Storage Device for the Electric Bicycle Drive Unit is also disclosed. Preferred embodiments are the subject of the claims.

In one aspect, an Electric Bicycle Drive Unit is disclosed. The Electrical Bicycle Drive Unit includes an Electric Motor device. The Electric Motor Device has a Bottom Bracket Assembly and a Bottom Bracket Shaft. The Electric Bicycle Drive Unit also includes an Integrative Energy Storage Device for supplying energy to the electric motor device. The Integrative Energy Storage Device is arranged adjacent to the electric motor device so that a center of gravity position of the Energy Storage Device and a center of gravity position of the Electric Bicycle Drive Unit lie within the Bottom Bracket Area of a bicycle frame.

In another aspect, a Bicycle Frame is disclosed. The Bicycle Frame includes a Frame Interface Rear Connection and a Frame Interface Front Connection for connection to an Electric Bicycle Drive Unit. The Electrical Bicycle Drive Unit has a rear mounting axis and a front mounting axis. The frame interface rear connection fixes degrees of freedom of movement of the Electric Bicycle Drive Unit with respect to the Bicycle Frame except for a degree of rotational freedom about the rear mounting axis. The Frame Interface Front Connection fixes the degree of rotational freedom of the Drive Unit about the rear mounting axis.

In another aspect, an Energy Storage Device is disclosed. The Energy Storage Device includes a wireless transceiver for wirelessly communicating with a battery controller. The Energy Storage Device also includes a connector for electrically connecting to an electric motor device. The Energy Storage Device is configured such that the center of gravity position of the Energy Storage Device lies within the Bottom Bracket Area of a bicycle frame.

BRIEF DESCRIPTION OF THE DRAWINGS

The following is an exemplary description of embodiments based on the figures.

In the figures:

FIG. 29A-B shows parts of the Drive Unit housing as well as the battery of the Drive Unit according to the first embodiment example shown in FIGS. 17 to 26;

FIG. 29C-D shows a second embodiment example for a Drive Unit;

FIG. 33A-C shows a Frame Offset Adapter for compensating for different tolerances between the Drive Unit and the Bicycle Frame or between the Drive Unit and the Frame Interface Unit in the Drive Unit according to the second embodiment of FIGS. 29C to 32C.

DETAILED DESCRIPTION

Figure 1:
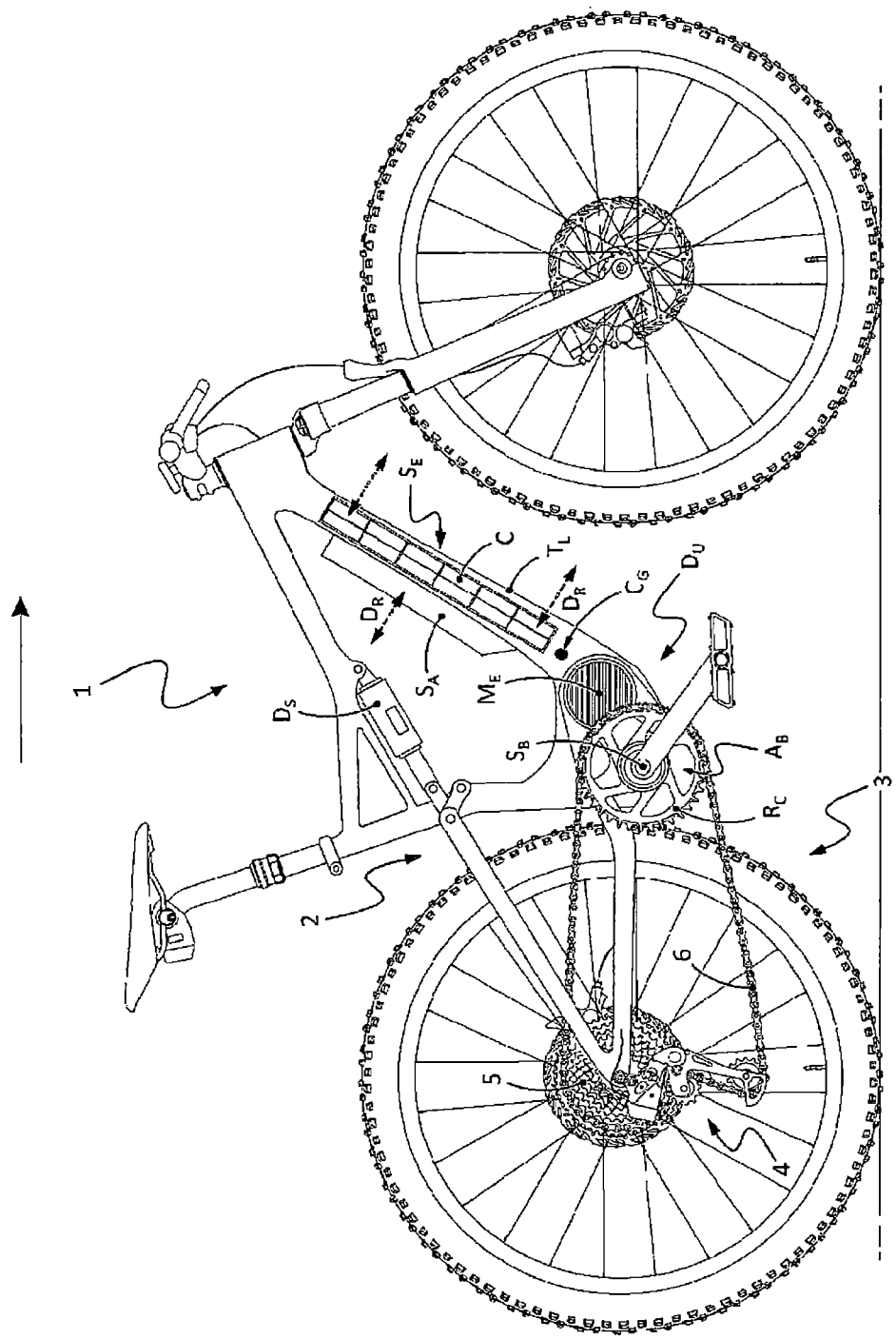
FIG. 1 shows a prior art e-mountain bike in a side view from the drive side.

Location or direction references used and not further specified in the following description, such as "left", "right", "front", "back", "top", "bottom", "side view", etc., correspond to a rider's perspective on a bicycle.

Based on the prior art described above, it is the task of the present disclosure to provide a solution for the arrangement or integration of the energy storage unit or battery and the Drive Unit for an e-mountain bike, with which the disadvantages described above can be overcome.

According to an embodiment, the Drive Unit $D_u$ includes an Electric Motor device $M_E$ as well as a Bottom Bracket Assembly $A_B$ with a Bottom Bracket Shaft $S_B$ for receiving the pedal cranks $C_P$ of the bicycle. Depending on the design of the motor, a drive unit of the generic type usually also includes a reduction gearbox, usually arranged together with the motor in a common Motor Housing, for transmitting the supporting motor torque to the Bottom Bracket Shaft, although gearless drive units for directly driving the Bottom Bracket Shaft are also known.

The Drive Unit $D_u$ has an Integrative Energy Storage Device $S_i$ for supplying energy to the Motor device $M_E$. In this case, the Integrative Energy Storage Device $S_i$ is arranged adjacent to the Motor device $M_E$, and the center of mass of the Integrative Energy Storage Device $S_i$ is located in the Bottom Bracket Area after the Drive Unit $D_u$ has been mounted on the Bicycle Frame 1.

This means that the energy storage unit is spatially combined with the Motor device $M_E$ and with the Bottom Bracket Assembly $A_B$, and possibly together with the reduction gear between the Motor device $M_E$ and the Bottom Bracket Shaft $S_B$, and is formed as a thus integrated Drive Unit $D_u$, which is positioned in the Bottom Bracket Area of the bicycle after the assembly of the Drive Unit $D_u$.

For the purposes of the present disclosure, "Bottom Bracket Area" means the immediate spatial environment of the bicycle bottom bracket, including the immediate end regions of the saddle and Down Tubes $T_L$ adjacent to the bottom bracket, as distinguished from the spatial region of the entire bicycle Down Tube $T_L$ up to the bicycle control head, which in the prior art typically contains the Energy Storage Device for the Electric Motor device $M_E$.

For the purposes of the present disclosure, the term "Integrative Energy Storage Device" means an Energy Storage Device which is either integrated into the housing of the Electric Motor device $M_E$, or is arranged together with the Electric Motor device $M_E$ in a common housing, or which can be arranged in an independent housing directly on a housing of the Electric Motor device $M_E$.

The Energy Storage Device according to the present disclosure is positioned in the immediate vicinity of the Drive Unit $D_u$ and approximately at the horizontal height of the Bottom Bracket Assembly $A_B$. This results in a vertically very low center of gravity position of the integrated Drive Unit $D_u$, which is limited only by maintaining the respective desired ground clearance in the area of the bottom bracket.

Furthermore, the distance of the center of gravity of the Drive Unit $D_u$ or the entire bicycle from the rear wheel axle is also advantageously reduced in this way.

Since the widest area of a Bicycle Frame, apart from the rear end, is usually the bottom bracket receptacle, the Drive Unit $D_u$ according to the disclosure allows the space available in the axial direction (relative to the Bottom Bracket Shaft) in this area to be used much more effectively than is usual in the prior art.

In other words, this means that the cross-sectional dimensions of the integrative energy storage unit in particular (in relation to a section plane parallel to the Bottom Bracket Shaft) can be significantly larger than with conventional energy storage units arranged in the area of the Down Tube $T_L$ or in the Down Tube $T_L$.

Due to the integrated Drive Unit $D_u$, the Bicycle Frame can be realized with an intact, i.e. closed, Down Tube $T_L$ cross-section, in contrast to the typical configuration where the Down Tube $T_L$ is open for battery removal resulting in the Down Tube $T_L$ often having a U-shaped cross-section, whereby the bending and torsional stiffnesses of the Down Tube $T_L$ is adversely affected. With the Drive Unit $D_u$ integration the stiffness Bicycle Frame can be increased, or the mass of the Bicycle Frame can be reduced accordingly.

The integration of the Motor device $M_E$ and Energy Storage Device also reduces or eliminates the cables and, in particular, separable, complex connector devices otherwise required for the electrical connection of these assemblies, resulting in further cost and weight savings.

According to an embodiment, the Integrative Energy Storage Device $S_i$ can be arranged directly on a housing of the Motor device $M_E$. In this embodiment, the Integrative Energy Storage Device $S_i$ can have its own housing or at least partial housing, which is connected or connectable to a housing or partial housing of the Motor device $M_E$.

In particular, this connection between the Integrative Energy Storage Device $S_i$ and the Motor device $M_E$ may be designed to be separable, for example with a quick release fastener, allowing the user to remove the Integrative Energy Storage Device $S_i$ independently of the Motor device $M_E$, for example for the purpose of charging regardless of the location of the bicycle.

This removal of the Integrative Energy Storage Device $S_i$ also allows an opening to the interior of the Down Tube to be revealed, so that this installation space can be used, by way of example, for storing tools, smaller items of luggage or also for an additional battery, without affecting the closed tube cross section of the Down Tube $T_L$.

According to a further embodiment, the Integrative Energy Storage Device $S_i$ is at least partially enclosed or enclosable by a housing of the Motor device $M_E$. A housing of the motor device $M_E$ need not be a closed housing, in particular not in that region of the housing which is designed to enclose the Energy Storage Device. Rather, at least this housing area can also be designed to enclose the Energy Storage Device in a substantially skeleton-like manner. In this way, weight is saved and the accessibility of the battery is improved, in particular for the purpose of battery replacement.

Another embodiment provides for the Integrative Energy Storage Device $S_i$ to be arranged together with the Motor device $M_E$ in the form of a fully integrated design in a Common Drive Housing. In this embodiment, mass and costs can be saved in particular by eliminating the need for connecting and separate housing elements. In this embodiment, any necessary replacement of the Integrative Energy Storage Device $S_i$ is carried out by skilled personnel after the joint housing of the Motor device $M_E$ and Integrative Energy Storage Device $S_i$ has been opened accordingly.

In another embodiment, the Integrative Energy Storage Device $S_i$, when ready for operation, is attached exclusively to the Motor device $M_E$, or to a housing of the Motor device $M_E$, or to the Common Drive Housing, but not to the Bicycle Frame. This improves the handling or the removal and reinsertion of the Energy Storage Device. Moreover, costs for procuring parts and assembling a bicycle equipped with the Drive Unit $D_u$ according to the present disclosure can be significantly reduced, since the additional fastening devices for the battery to the Bicycle Frame, which are common in the prior art, are not required.

Another embodiment provides that the Integrative Energy Storage Device Si, after mounting the Drive Unit $D_u$ to a Bicycle Frame 1, is at least partially arranged in a Down Tube $T_L$ of the Bicycle Frame 1. In this way, the Integrative Energy Storage Device $S_i$ can be further enlarged, and in particular a part of the Integrative Energy Storage Device $S_i$ can extend, substantially along a longitudinal axis of the Down Tube $T_L$, from below into the Down Tube $T_L$. The Down Tube $T_L$ can thus further have a closed tube cross-section and still contain at least part of the Integrative Energy Storage Device Si. In another embodiment the entire Integrative Energy Storage Device $S_i$ can be arranged in a Down Tube $T_L$ of the Bicycle Frame.

According to another embodiment, an Auxiliary Energy Storage Device is also assigned to the Drive Unit $D_u$ in addition to the Integrative Energy Storage Device $S_i$. After assembly of the Drive Unit $D_u$ with the Auxiliary Energy Storage Device, the Auxiliary Energy Storage Device is arranged at least partially, and in another embodiment, in a Down Tube $T_L$ of the Bicycle Frame. By means of the Auxiliary Energy Storage Device, the energy supply of the Drive Unit $D_u$ can be increased accordingly, for which purpose installation space in the Down Tube $T_L$ of the Bicycle Frame can again be used without impairing its closed tube cross-section.

According to a further embodiment, the Auxiliary Energy Storage Device is mechanically connectable or connected directly to the Drive Unit $D_u$ or to the Integrative Energy Storage Device $S_i$. In the case of direct mechanical connection of the Auxiliary Energy Storage Device to the Integrative Energy Storage Device $S_i$, the mechanical connection also includes an electrical connection between the two Energy Storage Devices, which is designed, for example, as an electrical plug-in connection.

If the Auxiliary Energy Storage Device is directly mechanically connected to the Integrative Energy Storage Device $S_i$, or if it is a one-piece design, the two Energy Storage Devices are thus combined to form an Energy Storage Assembly or Energy Storage Device, which is then fixed to a housing of the motor device $M_E$. This connection of the Auxiliary Energy Storage Device to the Integrative Energy Storage Device $S_i$ to form a possibly one-piece Integrative Energy Storage Device Si allows the installation space in the Down Tube to be used for additional energy storage capacity without the need for additional fixation devices or mechanical interfaces for fixing or securing the Auxiliary Energy Storage Device or the Integrative Energy Storage Device $S_i$ in the Down Tube $T_L$.

In another embodiment, in a mounted state of the Drive Unit $D_u$ on the Bicycle Frame, the Integrative Energy Storage Device $S_i$ is arranged to a major extent outside a Down Tube $T_L$ of the Bicycle Frame. Also, the Integrative Energy Storage Device $S_i$ is located at least partially below the axis of rotation of the Bottom Bracket Shaft $S_B$ in a position of the Drive Unit $D_u$ corresponding to the mounted state of the Drive Unit $D_u$ on the Bicycle Frame. This accommodates for the desired low center of gravity of the Bicycle, and facilitates both the structural integration of the Drive Unit $D_u$ into the Bicycle Frame 1 and the handling of the Energy Storage Device during removal and reinsertion.

With regard to the desired lowest possible center of gravity, a further embodiment provides that the Center Of Gravity of the Integrative Energy Storage Device $S_i$, or the common center of gravity of the Integrative Energy Storage Device $S_i$ and Auxiliary Energy Storage Device, or the center of gravity of the Drive Unit $D_u$ including the Integrative Energy Storage Device $S_i$, is located within a radius of 350 mm, in another embodiment 250 mm, and in yet another embodiment 200 mm, around the Bottom Bracket Shaft $S_B$ in a side view of the bicycle. For this purpose, the integrative energy storage unit $S_i$ is arranged in such a way that it is located at least partially below the Bottom Bracket Shaft $S_B$ when the Drive Unit $D_u$ is mounted on the bicycle.

In this way, a low center of mass of the bicycle is achieved which is advantageous for handling. At the same time, this also ensures that the center of mass of the bicycle is shifted as far back as possible in relation to the direction of travel, which also benefits handling.

According to an embodiment of the Drive Unit $D_u$, a Center of Mass of the Energy Storage Device and/or a Center of Mass of the Drive Unit $D_u$ is located, in a side view from the right and with respect to the axis of rotation of the Bottom Bracket Shaft $S_B$, within an upper right Bottom Bracket Quadrant having a side length of 175 mm, in another embodiment within a Bottom Bracket Quadrant having a side length of 125 mm, and in yet another embodiment within a Bottom Bracket Quadrant having a side length of 100 mm.

Also in an embodiment, the battery center of mass and/or the Drive Unit $D_u$ center of mass, relative to the axis of rotation of the Bottom Bracket Shaft $S_B$, is located at a height of 50 mm, in an embodiment 30 mm, and in another embodiment 20 mm above the axis of rotation of the Bottom Bracket Shaft $S_B$.

This position of the battery and/or Drive Unit's $D_u$ center of gravity addresses many of the issues common to typical e-mountain bikes, particularly with regard to handling and riding safety.

Another embodiment of the Drive Unit $D_u$ includes a Drive Shield $S_D$ attached solely to the Motor device Housing or to the common Energy Storage Device Housing, wherein the Drive Shield $S_D$ simultaneously forms a movable closure flap for covering and/or supporting the Integrative Energy Storage Device $S_i$.

This is advantageous because the considerable forces that can occur, for example, when the bicycle hits an obstacle in the Bottom Bracket Area, can be transmitted directly from the drive shield to the Drive Unit $D_u$ and, if necessary, from the latter to the Bicycle Frame 1.

The Bicycle Frame 1 is also significantly relieved by the fact that the rider often stands in the pedals when the bicycle hits an obstacle in the Bottom Bracket Area. In this case, the impact forces can be transmitted directly to the Bottom Bracket Shaft $S_B$ of the Drive Unit $D_u$ and from there to the damping and cushioning legs of the rider without significantly stressing the frame 1, thanks to an attachment of the Drive Shield $S_D$ exclusively to the Drive Unit $D_u$.

Typically, however, drive shields are usually not connected to the drive housing but directly to the Bicycle Frame. For this reason, there is a considerable risk with the prior art of damaging the Bicycle Frame 1, for example, when the bicycle hits obstacles.

According to a another embodiment, the Drive Unit $D_u$ includes exactly two frame interface arrangements. These in turn define a front and a rear mounting axis.

Example positions of the Frame Interface Assemblies, Drive Unit Interface Assemblies, or mounting axes relative to the Drive Unit $D_u$ or relative to the Frame Interface Unit are briefly described below.

In one embodiment, the frame interfaces and the two attachment axes as interfaces between the Drive Unit $D_u$ and the Main Frame are located in a vertical region above an imaginary horizontal plane containing the axis of rotation of the Bottom Bracket Shaft $S_B$ and below a horizontal plane containing the point of application of the Chain Pull Force to the chainring.

To minimize torques generated by the Chain Traction Force and corresponding loads or deformations of the Drive Unit $D_u$ or Main Frame, the vertical distance between the rear mounting axis and the point of application of the Chain Traction Force is as small as possible, in an embodiment less than 30 mm, and in another embodiment less than 21 mm.

Also, the two mounting axes are further forward than an imaginary vertical plane containing the axis of rotation of the Bottom Bracket Shaft $S_B$, and in another embodiment more than 15 mm further forward than the imaginary vertical plane.

Here, the two mounting axes are located in front of an imaginary Inclined Plane containing the axis of rotation of the Bottom Bracket Shaft $S_B$, the Inclined Plane being tilted forward relative to a horizontal plane by an angle $\beta$ of 50°, in other words tilted clockwise with respect to a view from the right-hand side of a bicycle.

Viewed from the right, the two mounting axes lie within an angle $\alpha$ of 30° to 80° located in the top right Bottom Bracket Quadrant, particularly within an angle $\alpha$ of 50° to 60°, the apex of the angle coinciding with the axis of rotation of the Bottom Bracket Shaft $S_B$.

Such a positioning of the two fastening axes is only made possible by the interaction of the features of the Drive Unit $D_u$ according to the present disclosure, including in particular the allocation of almost all forces, torque and tolerances to the rear frame interface and the short tolerance chains and force transmission paths as well as high stiffnesses of the Drive Unit $D_u$ thus achieved, which in turn makes it possible to dispense with the third fastening axis far behind, and in some cases even below, the Bottom Bracket Shaft $S_B$, which is common in the prior art.

Positioning the two fastening axes in this way as interfaces between the Drive Unit $D_u$ and the Main Frame offers numerous advantages over the state of the art.

Firstly, this provides considerably more space for assemblies such as swing arm bearings and shock linkage, since the Main Frame 1 no longer has to extend relatively far behind the bottom bracket, as in the state of the art, and in some cases even below the bottom bracket height, in order to support the electric drive unit there. This also reduces complexity, weight and costs, and gives the frame manufacturer considerably more design freedom in the functionally very important area directly behind the bottom bracket.

Furthermore, compared with the prior art, in which the frame often largely encloses the Drive Unit $D_u$, the above-described embodiments also improve the possibilities for cooling the electrical and electronic components of the Drive Unit $D_u$. This is playing an increasingly important role in view of the current trend toward ever smaller sizes for these components, coupled with a simultaneous upward trend in engine output.

With regard to the lateral positioning of the frame interfaces on the Drive Unit $D_u$, it is provided that interface planes between the Rear Frame Interface Arrangement of the Drive Unit $D_u$ and an associated frame-side Rear Interface Arrangement are positioned on the left and right frame sides outside of the Main Frame 1, respectively, with a regard to optimum torque and force transmission from the Drive Unit $D_u$ to the Main Frame, and with a view to high rigidity of the Drive Unit $D_u$, resulting in a correspondingly advantageously large Support Width $W_S$.

In this context, a Support Factor can be formed as a quotient of this Support Width $W_S$ and a Pedal Force Effective Width, which corresponds to the horizontal distance between the effective pedal force application points on the connecting surfaces between the pedal crank $C_P$ and Bottom Bracket Shaft $S_B$. The Support Factor is greater than 0.5, in another embodiment greater than 0.55 and in yet another embodiment greater than 0.6.

Alternatively or in addition to the values of the Support Factor, the Support Width $W_S$ is selected such that a Chain Pull Factor formed as a quotient of the Support Width $W_S$ and a Chain Pull Horizontal Distance between the Chain Pull Attack Point to the chain ring and the right-hand Interface Plane is greater than 5, in another embodiment greater than 5.5, and in yet another embodiment greater than 6.

This ensures optimum transmission of the lateral forces acting on the Drive Unit $D_u$, in particular the pedal forces, and also the Chain Traction Forces, by the shortest possible route into the Bicycle Frame. This also gives the structures of the Drive Unit $D_u$ and Main Frame 1 involved in this power transmission a particularly high rigidity with low weight, which counteracts undesirable twisting and associated power losses during operation of the Drive Unit $D_u$.

In the case of prior-art Drive Units values for the Support Factor are typically below 0.4, and values for the Chain Pull Factor are typically below 3.

The values for the Support Factor or for the Chain Pull Factor are made possible in particular by the fact that the Drive Unit $D_u$ according to the present disclosure grips around the outside of the Bicycle Frame 1 in the Bottom Bracket Area, or the Frame Interface Unit arranged there. In the prior art, it is usually the other way around, in other words, the Bicycle Frame (often relatively narrow in itself) surrounds the Drive Unit $D_u$ at least in the areas of the frame interfaces or mounting axes, whereby in particular the Support Widths $W_S$ are considerably narrower than can be achieved according to the present disclosure.

In the prior art, this results in high bending moments due to the effect of the pedal forces and the Chain Traction Forces, which either lead to correspondingly large deformations of the Drive Unit $D_u$ or the Bicycle Frame 1 in the Bottom Bracket Area, or have to be absorbed and compensated for with large wall thicknesses in these areas, which leads to correspondingly high weights of the Drive Unit $D_u$ and/or frame 1.

Furthermore, all degrees of freedom of movement of the Drive Unit $D_u$ relative to the Bicycle Frame 1 or relative to a Frame Interface Unit, except a degree of freedom of rotation about an axis of rotation parallel to the axis of rotation of the Bottom Bracket Shaft $S_B$, are fixed or fixable via the Rear Frame Interface Arrangement. In terms of the present disclosure, this is also intended to include that all forces and torques are transmittable between the Drive Unit $D_u$ and the Bicycle Frame 1 or Frame Interface Unit via the Rear Frame Interface Arrangement, with the exception of torques acting about an axis of rotation or attachment of the Rear Frame Interface Unit. The remaining degree of rotational freedom with respect to the Bicycle Frame or Frame Interface Unit is thereby fixed or fixable by means of the Front Frame Interface Arrangement.

The Rear Frame Interface Arrangement of the Drive Unit also includes a Frame Offset Adapter for compensating for width tolerances of the Bicycle Frame or Frame Interface Unit. For radial fixing of the Rear Frame Interface Arrangement relative to the Bicycle Frame or relative to the Frame Interface Unit, and for infinitely play-free adjustable axial tolerance compensation between the Rear Frame Interface Arrangement and the Bicycle Frame or Frame Interface Unit, the Frame Offset Adapter includes a stepped sleeve which can be screwed into a receiving bore of the drive housing in an axially adjustable manner, or a radial clamping device which can be received in a receiving bore of the drive housing in an axially displaceable manner.

This tolerance compensation is of considerable importance, since in practice in the bicycle market the Drive Unit can be combined with a wide variety of Bicycle Frames or different Frame Interface Units, whereby the Bicycle Frames, or the Frame Interface Units, can be supplied by a wide variety of manufacturers.

Experience has shown that, depending on the origin or manufacturer of the Bicycle Frame or the Frame Interface Unit, respectively, this results in a wide variety of tolerance situations with regard to the Support Width. Such different tolerance situations can be compensated easily and steplessly with the compensation adapter.

Furthermore, the Drive Unit $D_u$ includes a hermetically sealable Controller Enclosure disposed in a space region between the Motor device $M_E$ and the Energy Storage Device for housing a Controller Device for controlling the Motor device $M_E$ and/or the Energy Storage Device.

The Controller Enclosure may have a plugging device in itself known in the prior art for connecting the Controller Enclosure and the Energy Storage Device.

In another embodiment, the Controller Enclosure includes a plugless Current Interface for connecting the Controller Device and the Energy Storage Device. The plugless Current Interface has Interface Planes arranged parallel to a Removal Direction of the Energy Storage Device. In this way, the Current Interface can be automatically opened by removing the battery and automatically connected by inserting and/or attaching the battery.

In order to provide sufficient installation space for the largest possible energy storage, a motor device $M_E$ with a compact design is used for the Drive Unit $D_u$. So-called or concentric coaxial Motor devices are particularly advantageous in this respect, in which the Motor device and the usually required reduction gear, or their respective output shafts, are arranged coaxially or concentrically to the Bottom Bracket Shaft $S_B$.

Alternatively, the Motor device $M_E$ of the Drive Unit $D_u$ can also have an output shaft which is aligned axially parallel or also at an angle or right angle to the Bottom Bracket Shaft $S_B$. In particular, motor device $M_E$s with output shafts aligned axially parallel to the Bottom Bracket Shaft $S_B$ are widely used and inexpensive. In this case, it is advantageous to arrange the Motor device $M_E$ so that the installation space provided for the integrative Energy Storage Unit or for the integrative Energy Storage Assembly does not overlap with the installation space of the Drive Unit $D_u$ provided for the Motor device $M_E$.

For this purpose, the Motor device $M_E$ is arranged in such a way that the area of maximum radial extension of the motor device $M_E$ is vertically above the Bottom Bracket Assembly $A_B$ or Bottom Bracket Shaft $S_B$, and thus outside the installation space area according to the disclosure for the integrative energy storage system. With such a substantially vertical orientation of the motor device $M_E$, the housing of the Motor device $M_E$ extends into an area in which a main pivot bearing for the rear suspension is usually arranged in the case of sprung Bicycle Frames.

With this in mind, another embodiment of the disclosure provides that the housing of the Motor device $M_E$ or the Common Drive Housing of the Motor device $M_E$ and Integrative Energy Storage Device $S_i$ simultaneously has or forms an interface or bearing receptacle for a main pivot bearing or for a swing arm of the rear suspension of a suspended rear frame.

This results in further functional integration with simultaneous weight reduction and savings in installation space and costs. In addition, the desirably high lateral stiffness of the rear suspension is improved in this way.

According to a further embodiment, the Energy Storage Device and/or the Auxiliary Energy Storage Device contains substantially prismatically shaped Energy Storage Cells, wherein the definition of "prismatic" also includes cylindrical shapes in particular. The Energy Storage Cells are thereby arranged such that the longitudinal axes of a predominant portion of the Energy Storage Cells extend substantially axially parallel to the rotation axis of the Bottom Bracket Shaft $S_B$, with the longitudinal axes of the remaining portion of the Energy Storage Cells extending substantially parallel to a direction perpendicular to the rotation axis of the Bottom Bracket Shaft $S_B$.

In an embodiment, the ratio of the number of Energy Storage Cells arranged essentially parallel to the axis of the Bottom Bracket Shaft $S_B$ to the number of Energy Storage Cells arranged essentially parallel to a direction perpendicular to the Bottom Bracket Shaft $S_B$ is between 3 and 5 to 1.

With the Energy Storage Cells positioned predominantly parallel to the Bottom Bracket Shaft $S_B$, a cell packing configuration is achieved which allows optimum utilization of the volume available in the Bottom Bracket Area.

Alternatively, all Energy Storage Cells of the Integrative Energy Storage Device Si and/or the Auxiliary Energy Storage Device can be arranged essentially parallel to one or more directions perpendicular to the rotation axis of the Bottom Bracket Shaft $S_B$, which usually results in a correspondingly lower packing density of the Energy Storage Cells.

The orientation of the polarity of the Energy Storage Cells can be selected as required in that the positive or negative pole sides of the Energy Storage Cells point alternately to the left/right or front/rear or top/bottom.

The present disclosure further relates to a Bicycle Frame or Frame Interface Unit. The Bicycle Frame or Frame Interface Unit includes a Drive Unit Rear Interface Assembly and a Drive Unit Front Interface Assembly for connection to a Drive Unit $D_u$ as described above.

The Bicycle Frame 1 or Frame Interface Unit thus has exactly two Drive Unit Interface arrangements defining a front and a rear mounting axis for mounting the Drive Unit. The Rear Frame Interface Arrangement is configured to fixate all degrees of freedom of movement of the Drive Unit relative to the Bicycle Frame or Frame Interface Unit, except for the remaining degree of freedom of rotation about the rear mounting axis. The Front Frame Interface Arrangement is configured as a torque arm to fixate the remaining degree of freedom of rotation.

In other words, this means that the Rear Frame Interface Arrangement transmits all forces and torques to and from the Drive Unit $D_u$, except torques about the rear mounting axis as the axis of rotation. In contrast to the prior art, this enables in particular a clear definition of all load paths, and a clear assignment of all essential tolerances to the rear frame interface, while the front frame interface as torque arm only has to transmit comparatively small forces and is subject to very low requirements in terms of accuracy and tolerances.

The mounting axes of the Bicycle Frame 1 or the Frame Interface Unit, respectively, are arranged analogously to the arrangement of the mounting axes at the Drive Unit $D_u$ as described above with respect to the Drive Unit $D_u$. Likewise, Support Factor and Chain Pull Factor are of the same values as described above with regard to the Drive Unit.

In an embodiment, the Bicycle Frame 1 or the Frame Interface Unit, respectively, includes bearing mounts for a swing arm of a suspended rear frame. Particularly in the case of the Frame Interface Unit, this enables a particularly compact and weight-saving design of a sprung rear frame while at the same time reducing costs compared to the state of the art.

The present disclosure further relates to an Energy Storage Device for a Drive Unit $D_u$ as described above. The Energy Storage Device, in an embodiment, has those features which have already been mentioned above in the description of the Drive Unit $D_u$, and which are shown in detail in the following figure description.

FIG. 1 shows a mountain bike with electric auxiliary drive according to the prior art. The mountain bike has a Main Frame 1 with a Suspended Rear Frame 2. The Drive Train 3 of the mountain bike includes a Chainring $R_C$, a Rear Derailleur 4, a Multiple Pinion Cassette 5 and a Drive Chain 6. Furthermore, the mountain bike is equipped with an Electric Drive Unit $D_U$ which assists the rider and has an Electric Motor device $M_E$ which is designed as a Middle Motor, i.e. is arranged in the area of the Bottom Bracket Assembly $A_B$. The Drive Unit $D_U$ is associated with an Energy Storage Device $S_E$ and an Auxiliary Energy Storage Device $S_A$. To control the motor $M_E$ and/or battery $S_E$, $S_A$, the Drive Unit $D_U$ includes a controller $C_{MB}$.

The Energy Storage Device $S_E$ is arranged inside the Down Tube $T_L$ of the Main Frame 1 and can be removed from the Down Tube $T_L$ essentially radially in the Removal Direction $D_R$ with reference to the Down Tube $T_L$ and reinserted in the opposite direction. For this purpose, it is necessary for the Down Tube $T_L$ to have a downwardly open, in particular U-shaped tube cross section, with the disadvantages described in the introduction to the description, in particular with regard to reduced rigidity or increased weight.

A comparatively complex sealing of the Down Tube $T_L$ against penetrating dirt or water is also required, as well as a similarly complex electrical connection with cabling and detachable plug-in devices, and a mechanical locking device for the Energy Storage Device $S_E$.

In relation to the bicycle, the Auxiliary Energy Storage Device $S_A$ is arranged on top of the Down Tube $T_L$ and has a Removal Direction $D_R$ also running essentially radially to the Down Tube $T_L$. The Auxiliary Energy Storage Device $S_A$ also requires a further plug connection with corresponding cabling as well as a mechanical locking device to the Down Tube $T_L$ of the Main Frame 1.

Due to the positioning of the Motor Device $M_E$ and the Energy Storage Devices $S_E$, $S_A$ in front of or far in front of the bottom bracket $A_B$, which entails the center of gravity position $C_{GEA}$ of Energy Storage Device $S_E+S_A$, or the common center of gravity position $C_{GCA}$ of Drive Unit $D_U$ and Energy Storage Device $S_E$, $S_A$, as shown in FIG. 1, it is clear that the center of gravity of the bicycle is shifted far upwards and forwards by these assemblies, which have a considerable mass, with the disadvantages described in the introduction to the description, particularly with regard to handling and riding safety.

Figure 2:
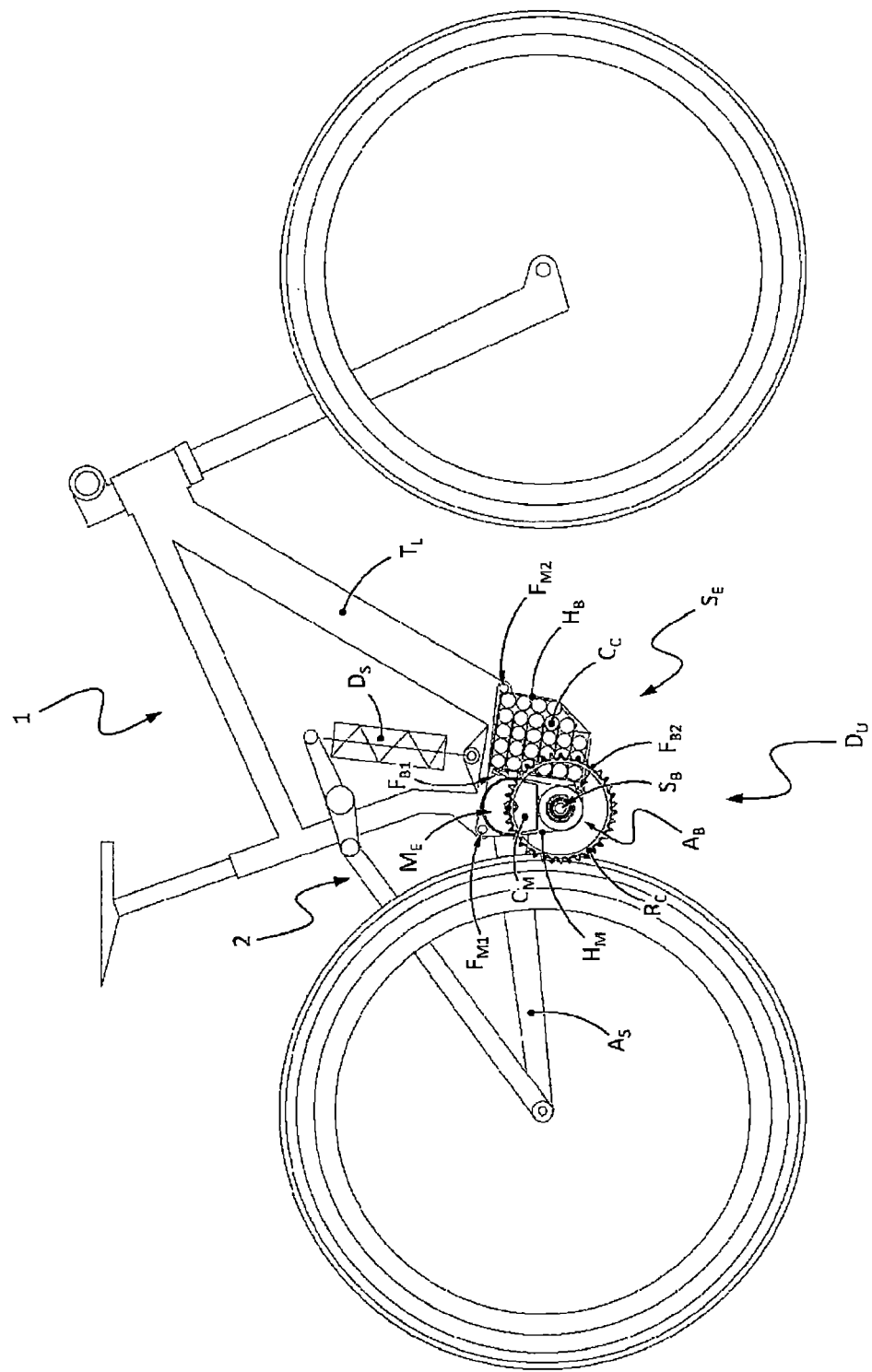
FIG. 2 shows, in a view corresponding to FIG. 1 and in schematic representation, an e-mountain bike with an embodiment of the Drive Unit according to the disclosure, in which the Integrative Energy Storage Device is mounted directly on the motor device.

FIG. 2 shows a schematic diagram of the main assemblies and components of an e-mountain bike equipped with one embodiment of the Drive Unit $D_U$ according to the disclosure.

For the sake of simplicity and better clarity, in FIGS. 2 to 15, apart from the schematized representation of most components, most parts of the Drive Train 3 as shown in FIG. 1 as well as the parts of the wheel suspension located in front of a longitudinal center plane of the bicycle are not shown. Furthermore, the Chainring $R_C$ is drawn partially transparent in order to be able to recognize the components located behind it.

It can be seen that the Motor Device $M_E$ is arranged above the Bottom Bracket Assembly $A_B$ or Bottom Bracket Shaft $S_B$ to save space. This frees up space in front of and diagonally above the Bottom Bracket Assembly $A_B$, which is used here for the Integrative Energy Storage Device $S_i$ in accordance with the disclosure. In this embodiment, the Integrative Energy Storage Device $S_i$ has its own housing $H_B$. In the embodiment shown, the housing $H_B$ of the Integrative Energy Storage Device $S_i$ is suspended by means of a hook device $F_{B1}$ on the housing $H_M$ containing the Motor Device $M_E$ with Motor Controller $C_M$, gearbox and Bottom Bracket Assembly $A_B$ and is additionally connected, for example screwed, to the Motor Housing $H_M$ by means of a detachable connection $F_{B2}$. The Motor Housing $H_M$, and thus also the Battery Housing $H_B$ attached to the Motor Housing $H_M$, can be connected to the Main Frame 1 at two frame interfaces or attachment axes $F_{M1}$ and $F_{M2}$. The Motor Controller $C_M$ can also be a combined Controller $C_{MB}$ for motor and/or battery. In another embodiment, however, the motor and battery have separate controllers $C_M$ and $C_B$, with the Battery Controller $C_B$ in particular taking over control and monitoring of the battery charging processes.

The Integrative Energy Storage Device or integrated battery $S_i$ is made up of essentially prismatic, in this case cylindrical Energy Storage Cells C, at least a large part of which $C_C$ is arranged axially parallel to the Bottom Bracket Shaft $S_B$.

Figure 3:
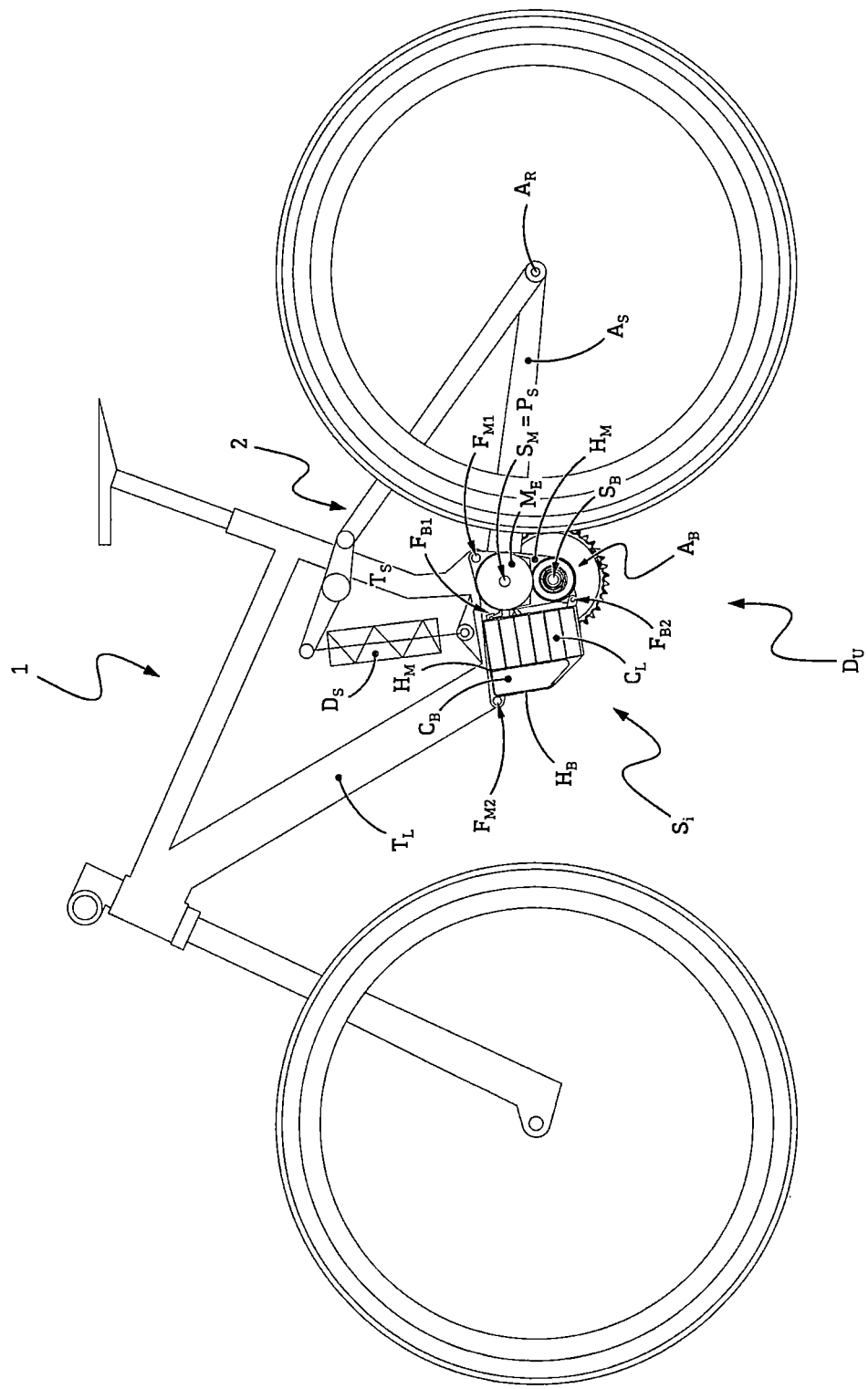
FIG. 3 shows the e-mountain bike according to FIG. 2 in side view from the non-drive side.

FIG. 3 shows that in this embodiment a smaller part $C_L$ of the Energy Storage Cells C is arranged parallel to a direction perpendicular to the Bottom Bracket Shaft $S_B$. Together with the axis-parallel arrangement of the larger part $C_C$ of the Energy Storage Cells C as shown in FIG. 2, this results in a high packing density of the Energy Storage Cells C and at the same time optimum utilization of the entire considerable installation space width available in the Bottom Bracket Area.

In addition to the assemblies described above with reference to FIG. 2, FIG. 3 shows in particular the arrangement of the Battery Controller $C_B$, which occupies that part of the housing $H_B$ of the Integrative Energy Storage Device $S_i$ which is occupied neither by the battery cells $C_C$ arranged parallel to the axis nor by the battery cells $C_L$ arranged perpendicularly thereto or longitudinally. In this way, the space available in the Bottom Bracket Area for the Integrative Energy Storage Device $S_i$ is optimally utilized.

Furthermore, it can be seen from FIG. 3 in conjunction with FIG. 2 that in this embodiment the pivot axis of the swing arm $A_S$ of the sprung rear end 2 coincides with the axis of rotation of the output shaft $S_M$ of the motor $M_E$. This can be used to arrange the interface to the Rear Swing Arm $A_S$, or the pivot bearing $P_S$ of the Rear Swing Arm $A_S$ together with rotating components of the Drive Unit, for example together with a rotor and/or with an output shaft $S_M$ or an output gearwheel of the Motor Device $M_E$ on the same shaft, resulting in a particularly compact and torsionally rigid unit including the Drive Unit $D_U$ and the pivot bearing $P_S$ of the Rear Swing Arm $A_S$.

Figure 4:
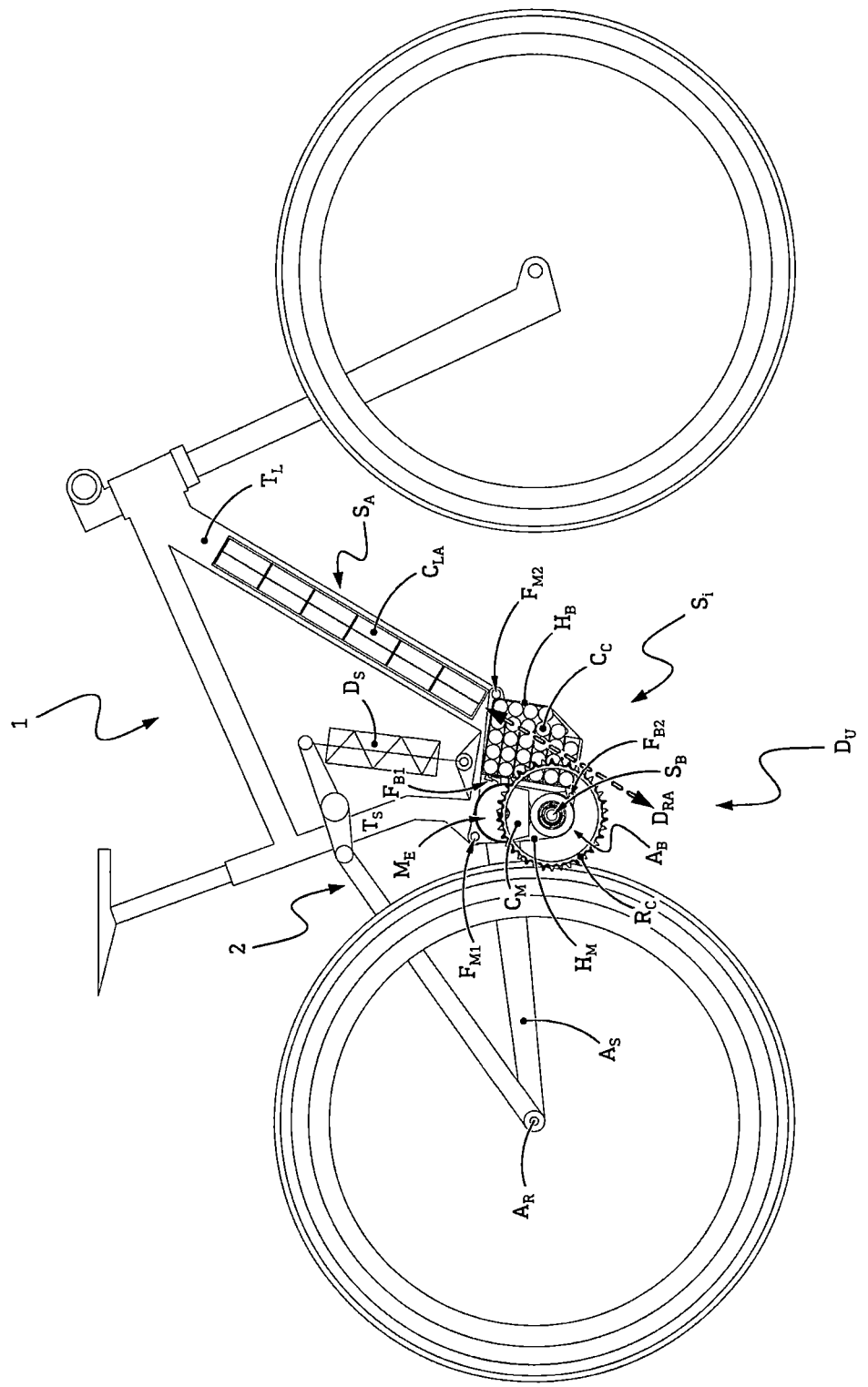
FIG. 4 shows in a view and illustration corresponding to FIG. 2, an e-mountain bike according to FIGS. 2 and 3 with an Auxiliary Energy Storage Device.
Figure 5:
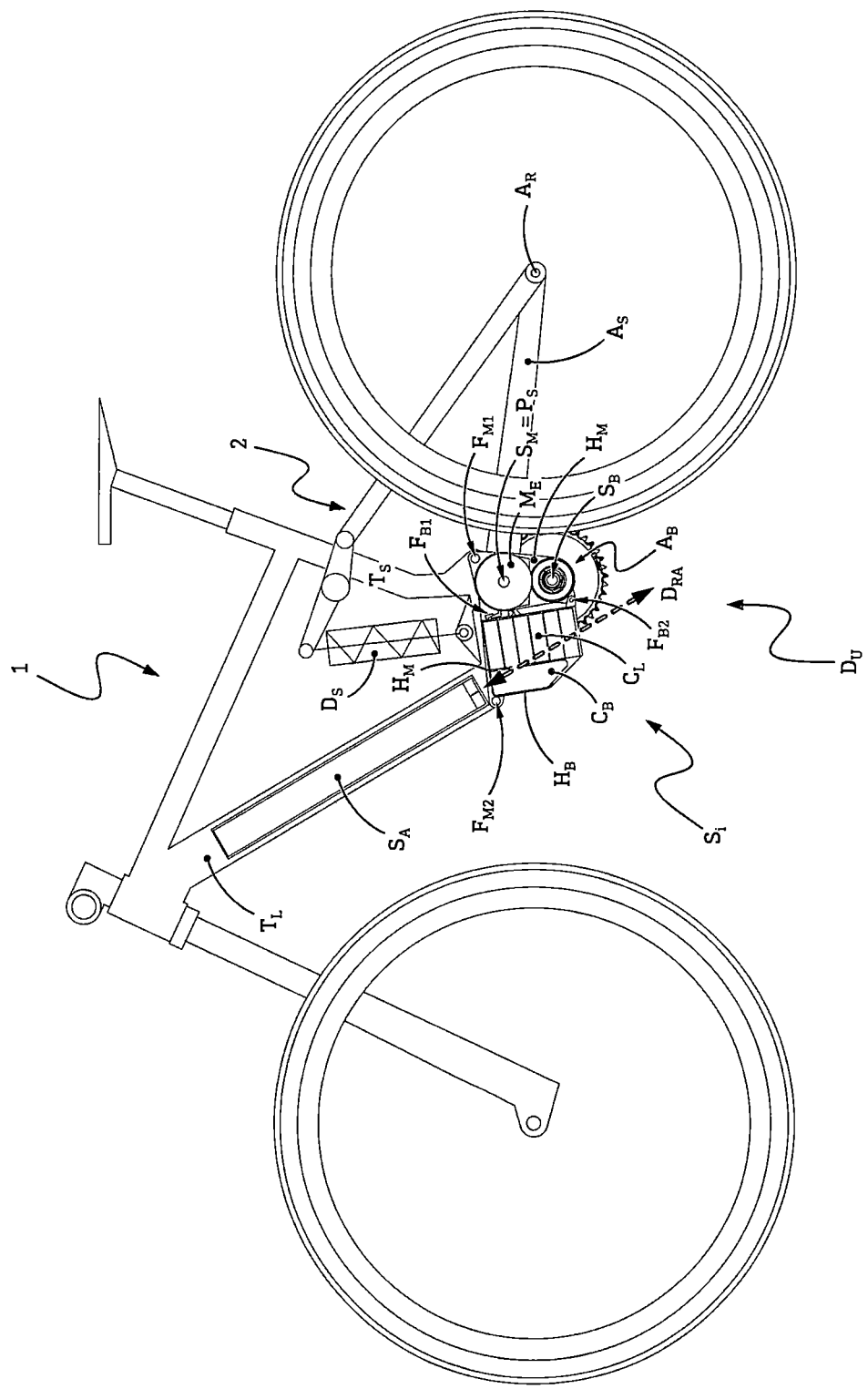
FIG. 5 shows the e-mountain bike according to FIG. 4 in side view from the non-drive side.

The e-mountain bike shown in FIGS. 4 and 5 and its Drive Unit $D_U$ are identical to the e-mountain bike and its Drive Unit $D_U$ shown in FIGS. 2 and 3, except that the e-mountain bike shown in FIGS. 4 and 5 also has an Auxiliary Energy Storage Device $S_A$ with Energy Storage Cells $C_{LA}$ in addition to the Integrative Energy Storage Device $S_i$. The Auxiliary Energy Storage Device $S_A$ is arranged inside the Down Tube $T_L$ similar to the prior art according to FIG. 1.

However, due to the Motor Device $M_E$ arranged vertically above the Bottom Bracket Assembly $A_B$ in the Drive Unit $D_U$ according to FIGS. 4 and 5, it is possible to remove or reinsert the auxiliary battery $S_A$ in a Removal Direction $D_{RA}$ running coaxially to the Bottom Tube $T_L$. To do this, simply remove the Integrative Energy Storage Device $S_i$ or the Drive Unit $D_U$ together with the Integrative Energy Storage Device $S_i$ from the Bottom Bracket Area.

In this way, the closed tube cross-section of the Down Tube $T_L$ can be maintained, which benefits the rigidity and desirably low weight of the frame 1.

Figure 6:
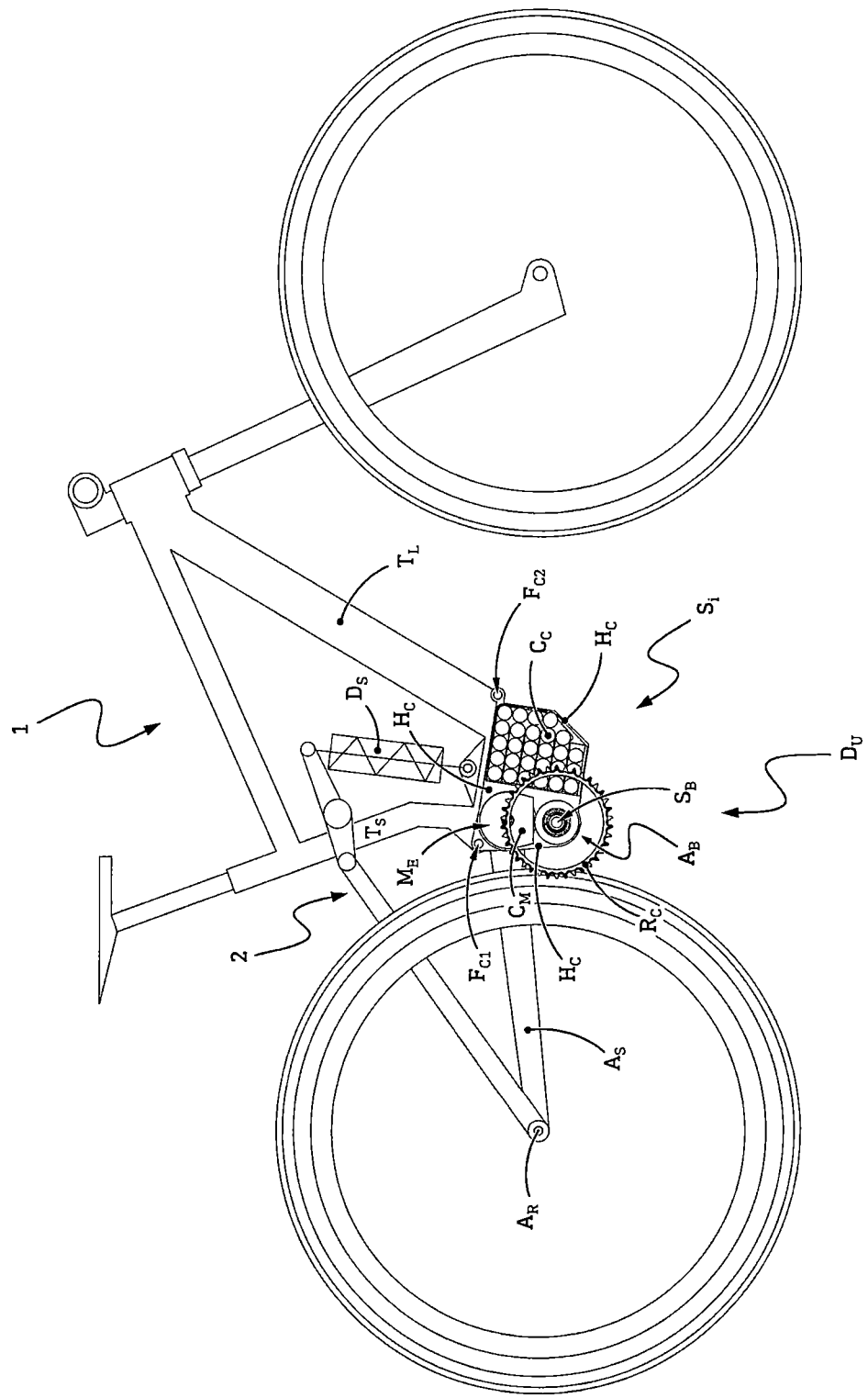
FIG. 6 shows, in a view and representation corresponding to FIG. 2, an e-mountain bike with an embodiment of the Drive Unit in which the Integrative Energy Storage Device and Motor Device are fully integrated in a Common Drive Housing.
Figure 7:
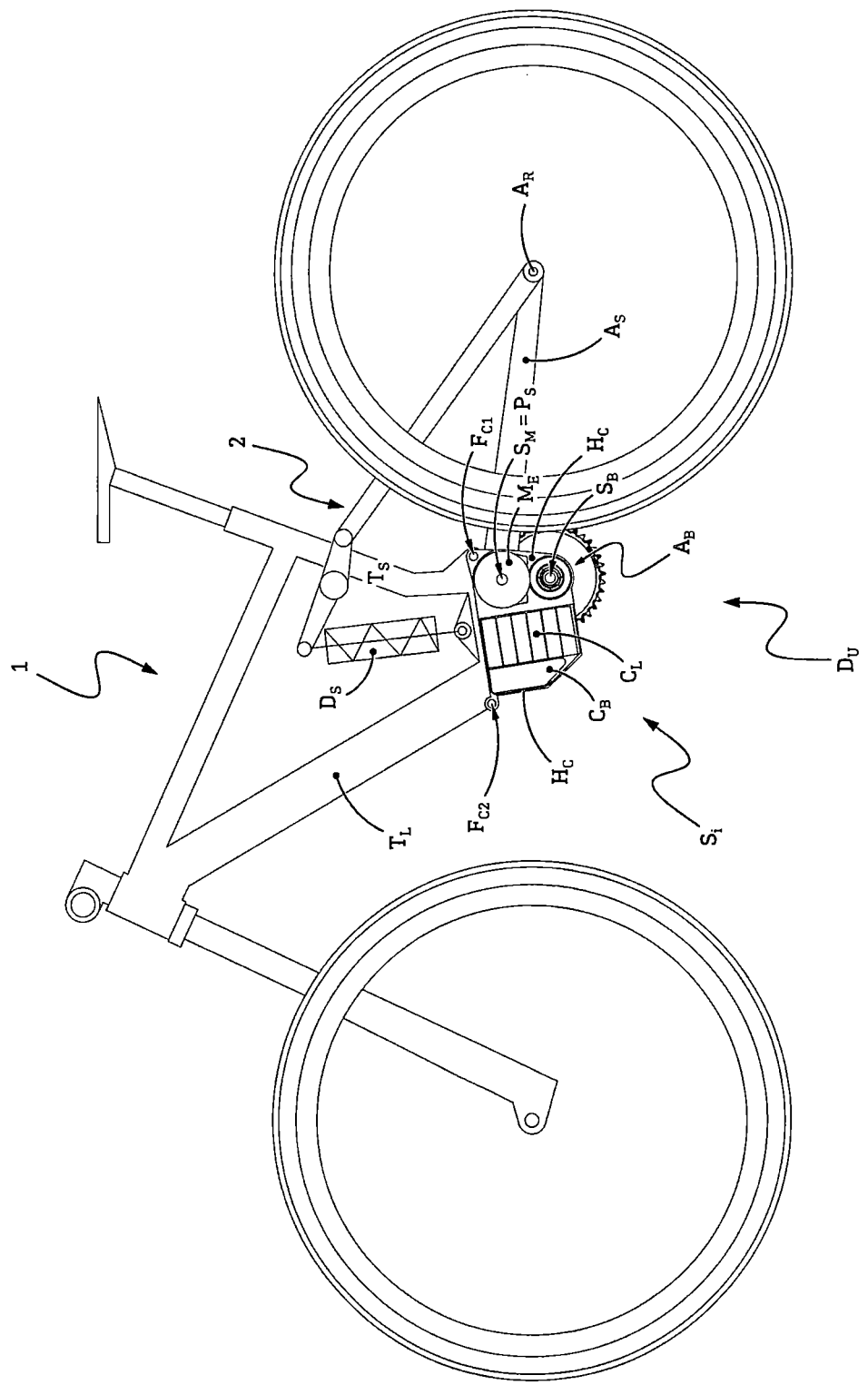
FIG. 7 shows the e-mountain bike according to FIG. 6 in side view from the non-drive side.

The e-mountain bike and the Drive Unit $D_U$ according to FIGS. 6 and 7 are essentially the same as the e-mountain bike and the Drive Unit $D_U$ according to FIGS. 2 and 3, with the difference that in the Drive Unit $D_U$ according to FIGS. 6 and 7, the Motor Controller $M_E$, Gearbox, Integrative Energy Storage Device $S_i$ and Motor Controller $C_M$, Battery Controller $C_B$ and Bottom Bracket Assembly $A_B$ are arranged in a single Common Drive Housing $H_C$. Similar to the embodiment according to FIGS. 2 and 3, the Common Drive Housing $H_C$ and thus the entire Drive Unit $D_U$ can be connected to the Main Frame 1 by means of two mounting axes $F_{C1}$ and $F_{C2}$.

The interfaces between a Drive Unit $D_U$ and a bicycle main frame 1, which are partially referred to as "attachment axes" in the present disclosure, do not necessarily have to be axis-shaped attachments or interfaces. Rather, the term "attachment axes" in the present disclosure is intended to imply generally spaced-apart connecting structures or attachment regions of a Drive Unit $D_U$, a Bicycle Frame or a Frame Interface Unit $I_U$ along a longitudinal axis and/or along a vertical axis of the bicycle. In this regard, each mounting axis may in turn include a plurality of connecting structures spaced along a transverse axis of the Bicycle Frame. These connecting structures, for example bolted connections, also need not necessarily extend or be arranged in the transverse direction of the bicycle. Rather, the longitudinal axes of such bolted connections may also extend, for example, within longitudinal planes, relative to a bicycle.

The arrangement of all components or assemblies of the electric Drive Unit $D_U$ in a Common Drive Housing $H_C$ results in considerable integration advantages, including in particular weight and cost advantages as well as advantages with regard to maintenance and service life.

Figure 8:
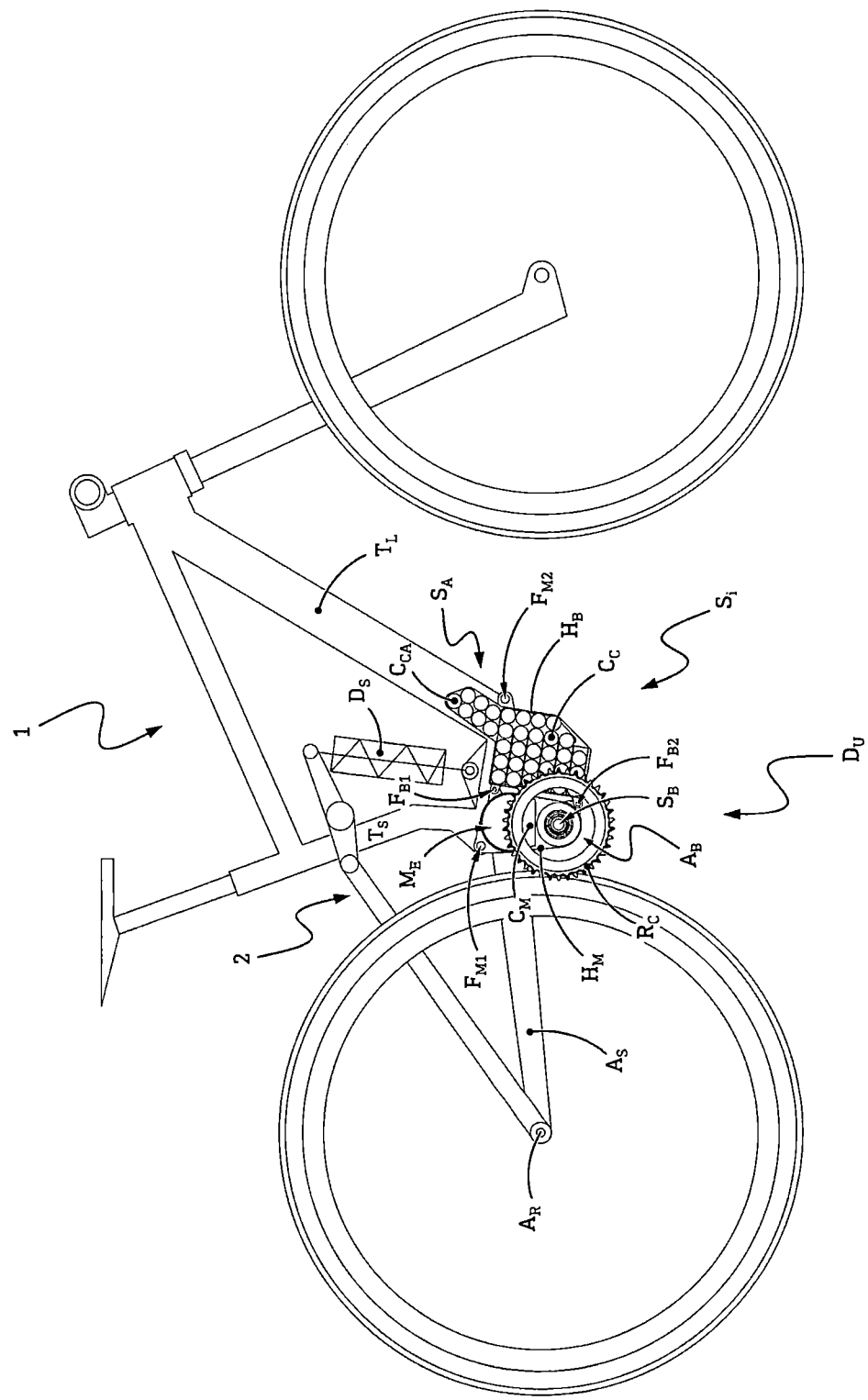
FIG. 8 shows in a view and representation corresponding to FIG. 2, a e-mountain bike with an embodiment of the Drive Unit similar to FIG. 2, in which the Integrative Energy Storage Device or the Auxiliary Energy Storage Device extends into the Down Tube.
Figure 9:
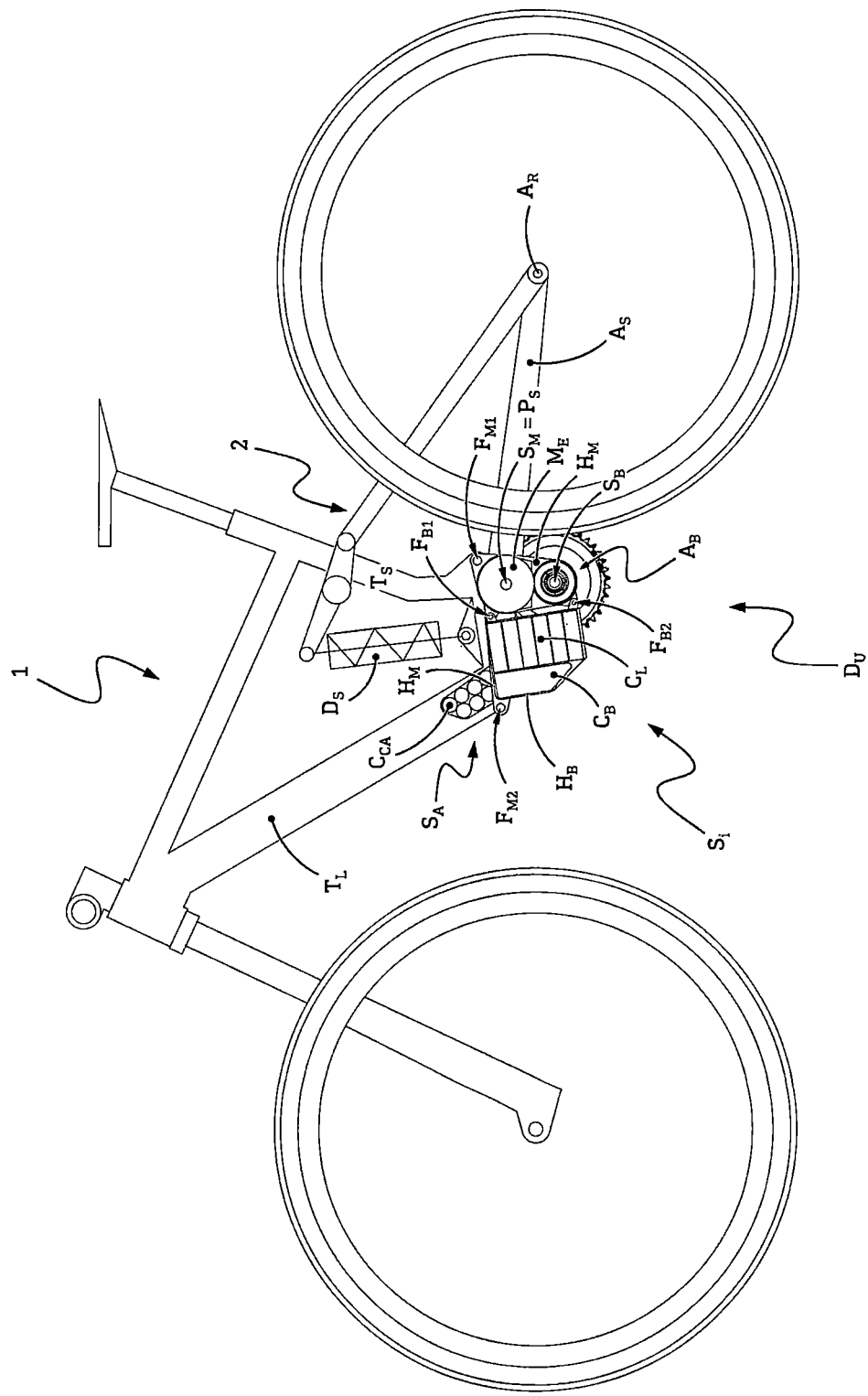
FIG. 9 shows the e-mountain bike according to FIG. 8 in side view from the non-drive side.

The e-mountain bike and the Drive Unit $D_U$ according to FIGS. 8 and 9 are also substantially the same as the e-mountain bike and the Drive Unit $D_U$ according to FIGS. 2 and 3. However, the Drive Unit $D_U$ of the embodiment according to FIGS. 8 and 9 has an Auxiliary Energy Storage Device $S_A$ with Energy Storage Cells $C_{CA}$, with the Auxiliary Energy Storage Device $S_A$ in this embodiment being in the form of an extension of the Integrative Energy Storage Device $S_i$. In other words, the Auxiliary Energy Storage Device $S_A$ is here integrally or integrally integrated into the Integrative Energy Storage Device $S_i$ and arranged in a common battery housing $H_B$. In the present embodiment, the Integrative Energy Storage Device $S_i$ extends partially into the Down Tube $T_L$ of the Main Frame 1.

In this embodiment, the Integrative Energy Storage Device $S_i$ is connected to the Motor Housing $H_M$ by means of two attachment points or attachment axes $F_{B1}$ and $F_{B2}$. The energy storage device $S_i$ is mounted on the frame 1. This eliminates the need for a separate mounting interface between the Energy Storage Device $S_i$ and the frame 1, which in turn reduces complexity, weight and costs.

As an alternative to the illustration in FIGS. 8 and 9, the Energy Storage Device $S_i$, similar to the embodiment according to FIGS. 6 and 7, can also be arranged together with the other assemblies of the Drive Unit $D_U$, in particular together with Motor Device $M_E$, Gearbox, Motor Controller $C_M$, Battery Controller $C_B$ and Bottom Bracket Assembly $A_B$ in a single Common Drive Housing $H_C$.

The e-mountain bike and the Drive Unit $D_U$ according to FIGS. 10 and 11 are again identical in essential aspects to the e-mountain bike and the Drive Unit $D_U$ according to FIGS. 2 and 3. However, in the embodiment according to FIGS. 10 and 11, the motor device $M_E$ with reduction gear is designed and arranged coaxially or concentrically to the Bottom Bracket Shaft $S_B$.

Similar to the embodiments according to FIGS. 2 and 3 or FIGS. 8 and 9, the Integrative Energy Storage Device $S_i$ is connected to the Motor Housing $H_M$ by means of two attachment points or attachment axes $F_{B1}$ and $F_{B2}$, and the Motor Housing $H_M$ including the Integrative Energy Storage Device $S_i$ attached thereto can be connected or is connected to the Main Frame 1 by means of two further attachment points or attachment axes $F_{M1}$ and $F_{M2}$.

The use of a coaxial motor-gear unit $M_E$ in this embodiment results in a compact Drive Unit so that additional free space can be used for other components. Examples of other components include, but are not limited to, the pivot bearing $P_S$, the connection of the Rear Swing Arm $A_S$, or also for further enlargements of the Integrative Energy Storage Device $S_i$. In another embodiment, the pivot bearing $P_S$ of the Rear Swing Arm $A_S$ is arranged coaxially with the shaft $S_B$ of the coaxial motor gearbox device $M_E$ so that the Rear Swing Arm $A_S$ is thus mounted on an output shaft $S_M$ of the coaxial motor gearbox device $M_E$ or on the Bottom Bracket Shaft $S_B$ coaxial therewith.

Figure 10:
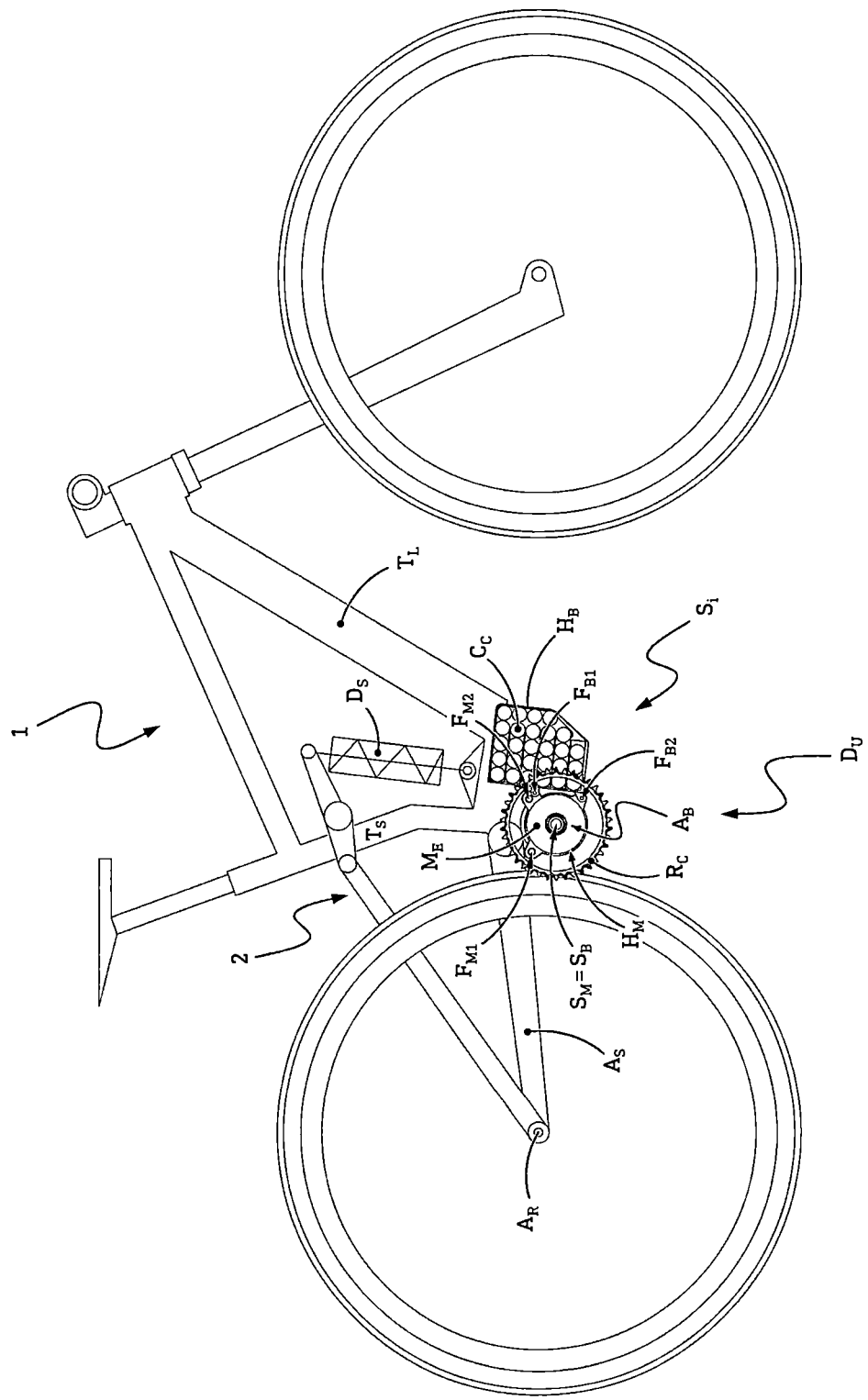
FIG. 10 shows, in a view and representation corresponding to FIG. 2, an e-mountain bike with an embodiment of the Drive Unit similar to FIGS. 2 and 3, in which the Motor Device including reduction gear is designed and arranged coaxially with the Bottom Bracket Shaft.
Figure 11:
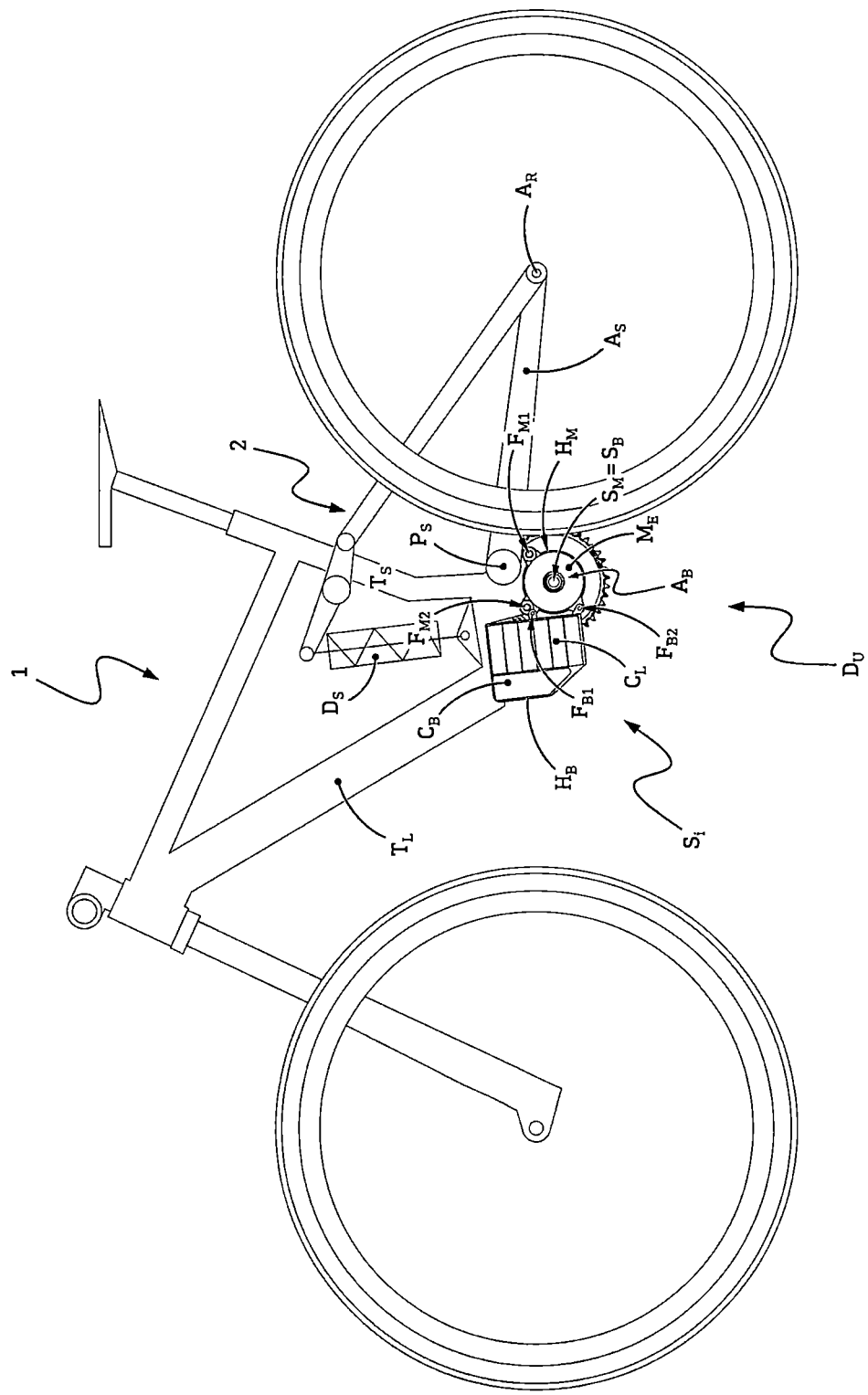
FIG. 11 shows the e-mountain bike according to FIG. 10 in side view from the non-drive side.
Figure 12:
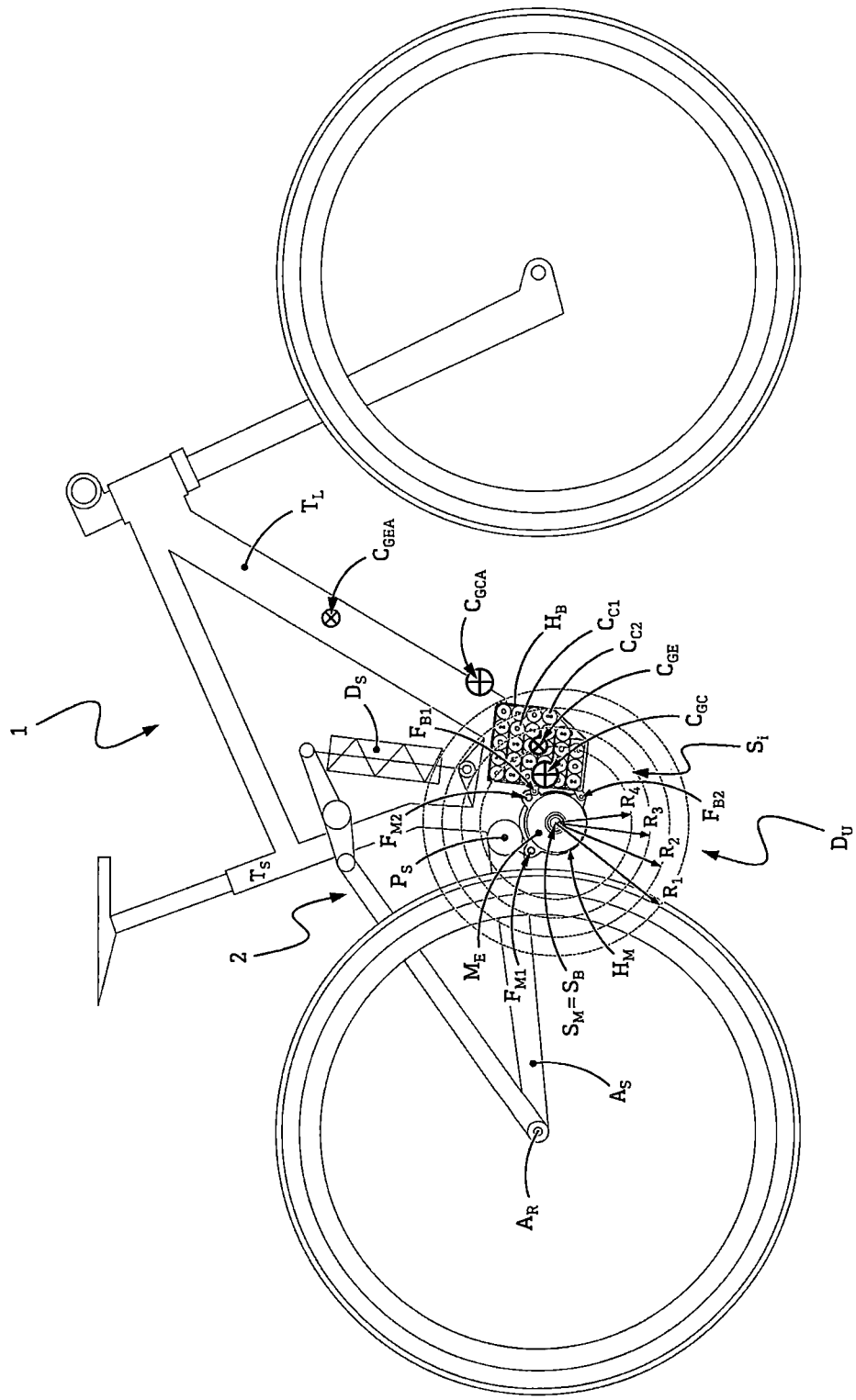
FIG. 12 shows, in a view and representation corresponding to FIG. 2, the e-mountain bike according to FIGS. 10 and 11 with a drawn-in center of gravity position.
Figure 13:
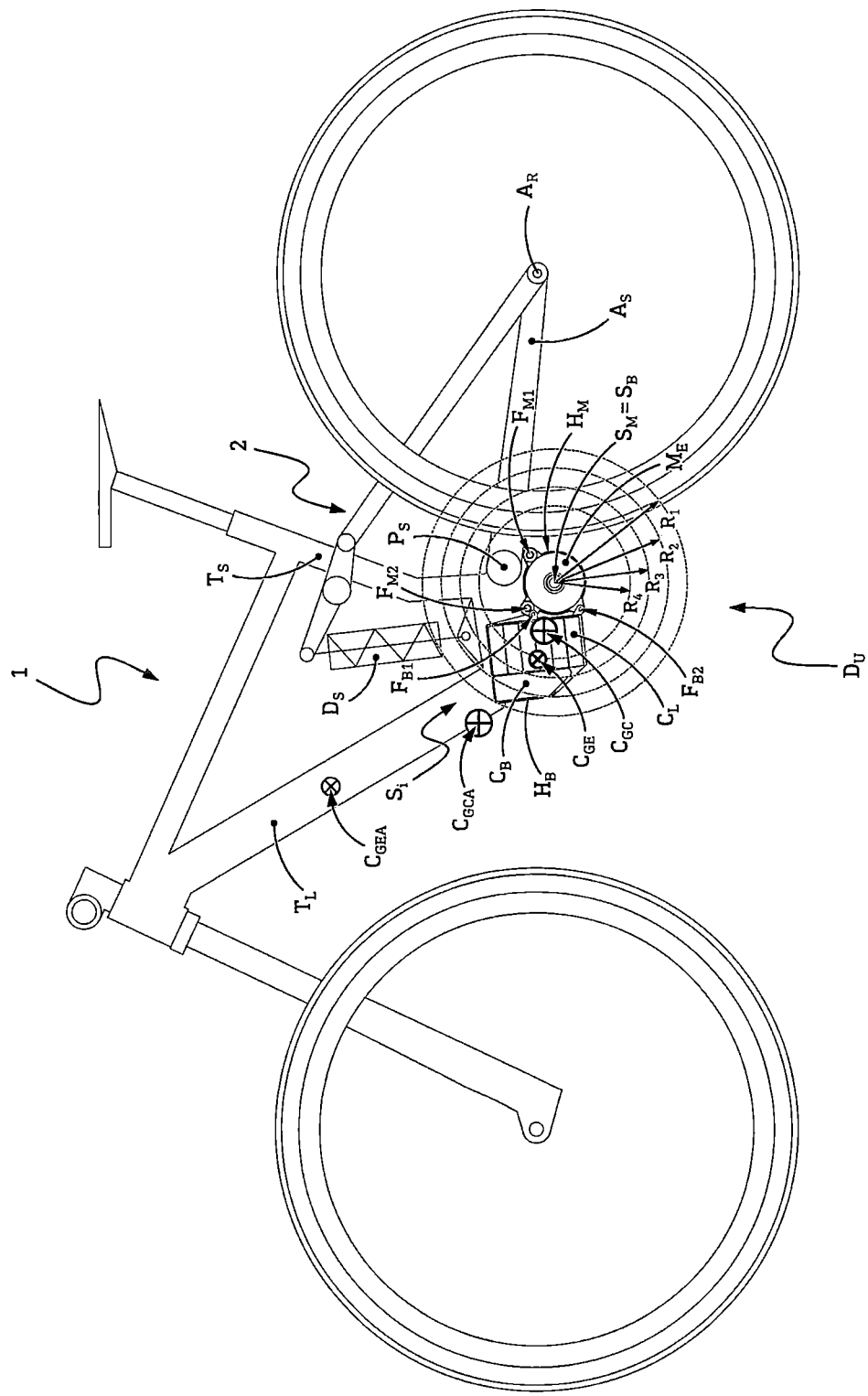
FIG. 13 shows the e-mountain bike according to FIG. 12 in side view from the non-drive side.

FIGS. 12 and 13 show the e-mountain bike and the Drive Unit $D_U$ according to FIGS. 10 and 11 with the additional center of gravity position $C_{GE}$ of the Integrative Energy Storage Device $S_i$ drawn in and with the center of gravity position $C_{GC}$ of the entire Drive Unit $D_U$ drawn in (that is, the common center of gravity position $C_{GC}$, in particular including the Motor Gear Unit $M_E$ and Integrative Energy Storage Device $S_i$).

In comparison with the prior art according to FIG. 1, the centers of mass $C_{GE}$, $C_{GC}$ are lower and further back in the bicycle due to the Drive Unit $D_U$ according to the disclosure than the centers of mass $C_{GEA}$, $C_{GCA}$ (shown again in dashed lines in FIGS. 12, 13, 17, 18, 19 and 23) of the prior art.

The centers of mass $C_{GE}$, $C_{GC}$ according to the present disclosure provide for improved handling as compared to the prior art.

In FIGS. 12 and 13, circumcircles $R_1$, $R_2$, $R_3$ and $R_4$ with radii of 175 mm, 150 mm, 125 mm and 100 mm are also drawn with dashed lines, defining a Bottom Bracket Area within which the center of gravity position $C_{GE}$ of the energy storage device $S_i$ and the center of gravity position $C_{GC}$ of the Drive Unit $D_U$ are located when the Drive Unit $D_U$ is viewed in a position corresponding to a position of the Drive Unit $D_U$ mounted on the bicycle.

It can be seen that the center of gravity $C_{GC}$ of the Drive Unit $D_U$ in the embodiment according to FIGS. 12 to 13 is located within the smallest circle $R_4$, that is, at a distance of less than 100 mm from the axis of rotation of the Bottom Bracket Shaft $S_B$.

In addition, the alternating orientation of the polarity of the Energy Storage Cells $C_{C1}$ or $C_{C2}$ to the right or to the left in relation to the direction of travel can be seen in FIG. 12.

Figure 14:
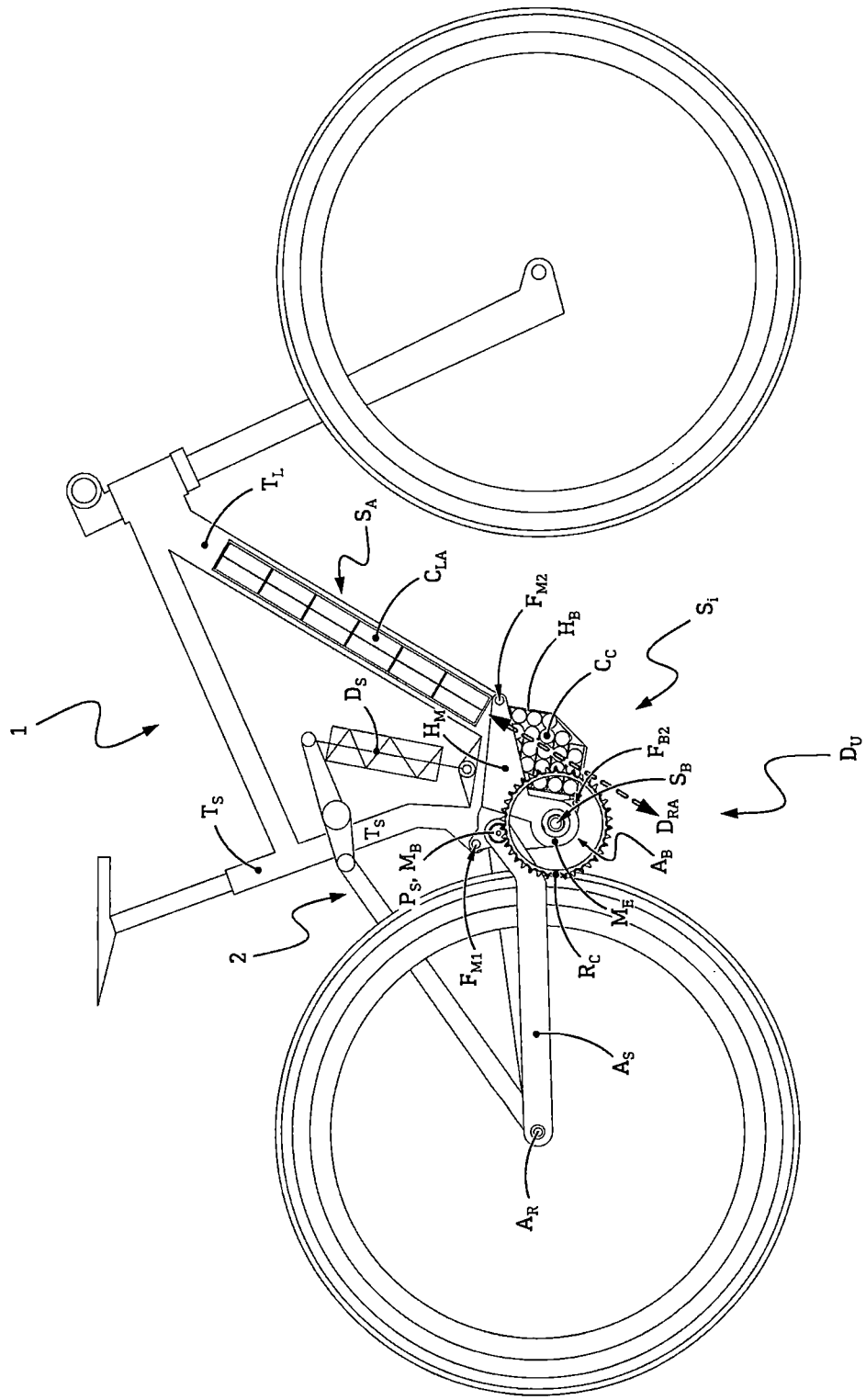
FIG. 14 shows a view and illustration corresponding to FIG. 2 of an e-mountain bike with an embodiment of the Drive Unit similar to FIGS. 4 and 5 with an additional integrated swing arm bearing for a rear suspension.
Figure 15:
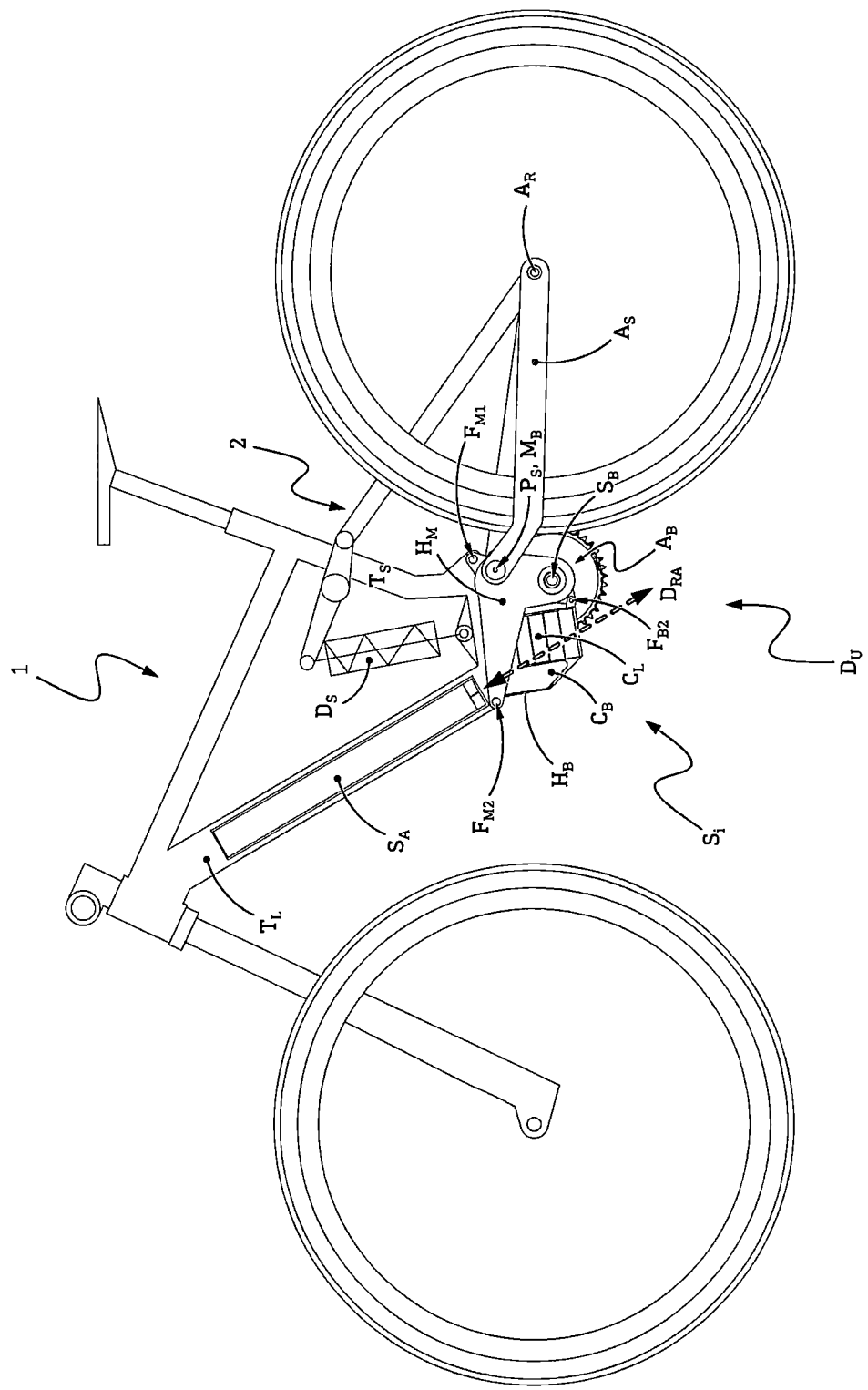
FIG. 15 shows the e-mountain bike according to FIG. 14 in side view from the non-drive side.
Figure 16:
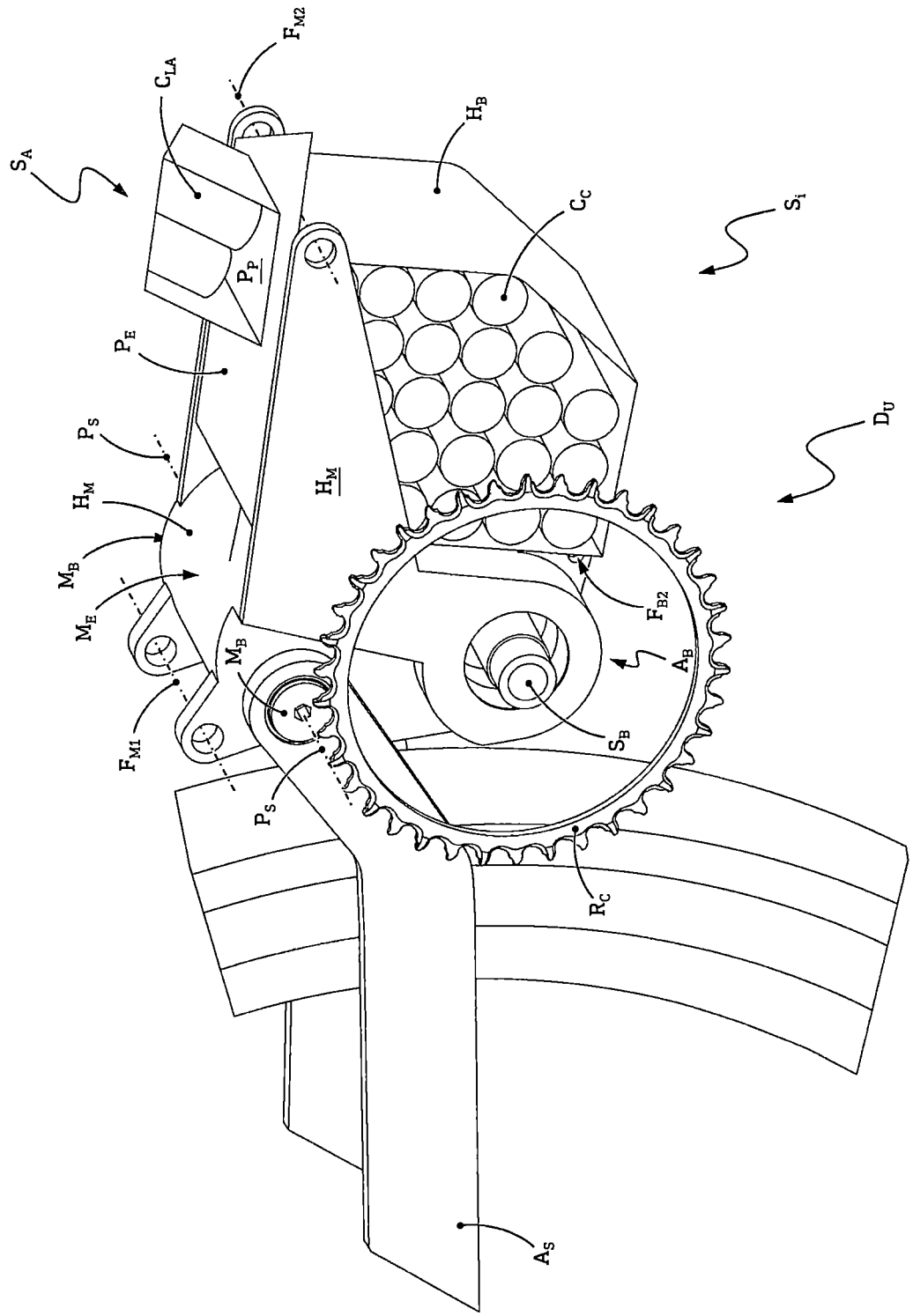
FIG. 16 shows the Drive Unit of the e-mountain bike according to FIGS. 14 and 15 in a schematic isometric view.

FIGS. 14 to 16 show an e-mountain bike or a Drive Unit $D_U$ similar to FIGS. 4 and 5, i.e. in particular with an additional battery $S_A$ as well as with an integrated battery $S_i$, which is attached to the Motor Housing $H_M$, whereby the Motor Housing $H_M$ together with the integrated battery attached to it are in turn connected to the Main Frame 1 at frame interfaces or Fixation Axis $F_{M1}$ and $F_{M2}$. Here too, after removal of the integrated battery $S_i$, the additional battery $S_A$ can be removed from the Down Tube $T_L$ in the axial Removal Direction $D_{RA}$, which again enables a closed tube cross section of the Down Tube $T_L$ with its advantages described above.

It can also be seen that the Drive Unit $D_U$ according to the embodiment shown in FIGS. 14 to 16 has bearing mounts $M_P$ for the Rear Swing Arm $A_S$ Pivot Mount $P_S$. This results in a particularly compact and torsionally stiff unit including Drive Unit and pivot bearing $P_S$. In this way, the distance between the rear wheel axle and the Bottom Bracket Shaft $S_B$ can also be kept as short as possible, which benefits the handling and maneuverability of the bicycle as well as the rigidity of the rear end 2.

By looking at FIGS. 14 and 15 together with the prior art according to FIG. 1, it becomes particularly clear the high degree of functional and component integration that can be achieved with the present disclosure.

FIG. 16 shows the Drive Unit $D_U$ of the e-mountain bike according to FIGS. 14 and 15 in schematic isometric detail. In particular, the Motor Housing $H_M$ can be seen with its frame interfaces or mounting axes $F_{M1}$ and $F_{M2}$ for connection to the Main Frame 1 not shown here.

The illustrated embodiment of the Drive Unit $D_U$ has a motor device $M_E$ arranged above the Bottom Bracket Assembly $A_B$, which acts on the Bottom Bracket Shaft $S_B$ via a gear device, for example via a spur gear and/or via a belt drive. Due in particular to this space-saving arrangement and functional integration, it is possible to position the energy storage unit $S_i$ directly in the Bottom Bracket Area and in the immediate vicinity of the motor $M_E$.

The illustration in FIG. 16, in particular of the additional battery $S_A$ as well as of an end plate $P_E$ of the Main Frame 1, which is penetrated at $P_P$ by the additional battery $S_A$, for example, is to be understood merely as exemplary and schematic, as is the longitudinal alignment of the cells $C_{LA}$ of the additional battery $S_A$ shown here. In this regard, reference is made to alternative embodiments of the additional battery $S_A$, as shown in FIGS. 8 and 9, for example, which can be combined with the other features of the embodiment according to FIGS. 14 to 16, in particular with the integrated swing-arm bearing $P_S$, $M_P$.

The same applies to the embodiment shown in FIGS. 10 to 13 with coaxial motor $M_E$. This embodiment can also be combined with an integrated swing arm bearing $P_S$, $M_P$ as shown in FIGS. 14 to 16.

Figure 17:
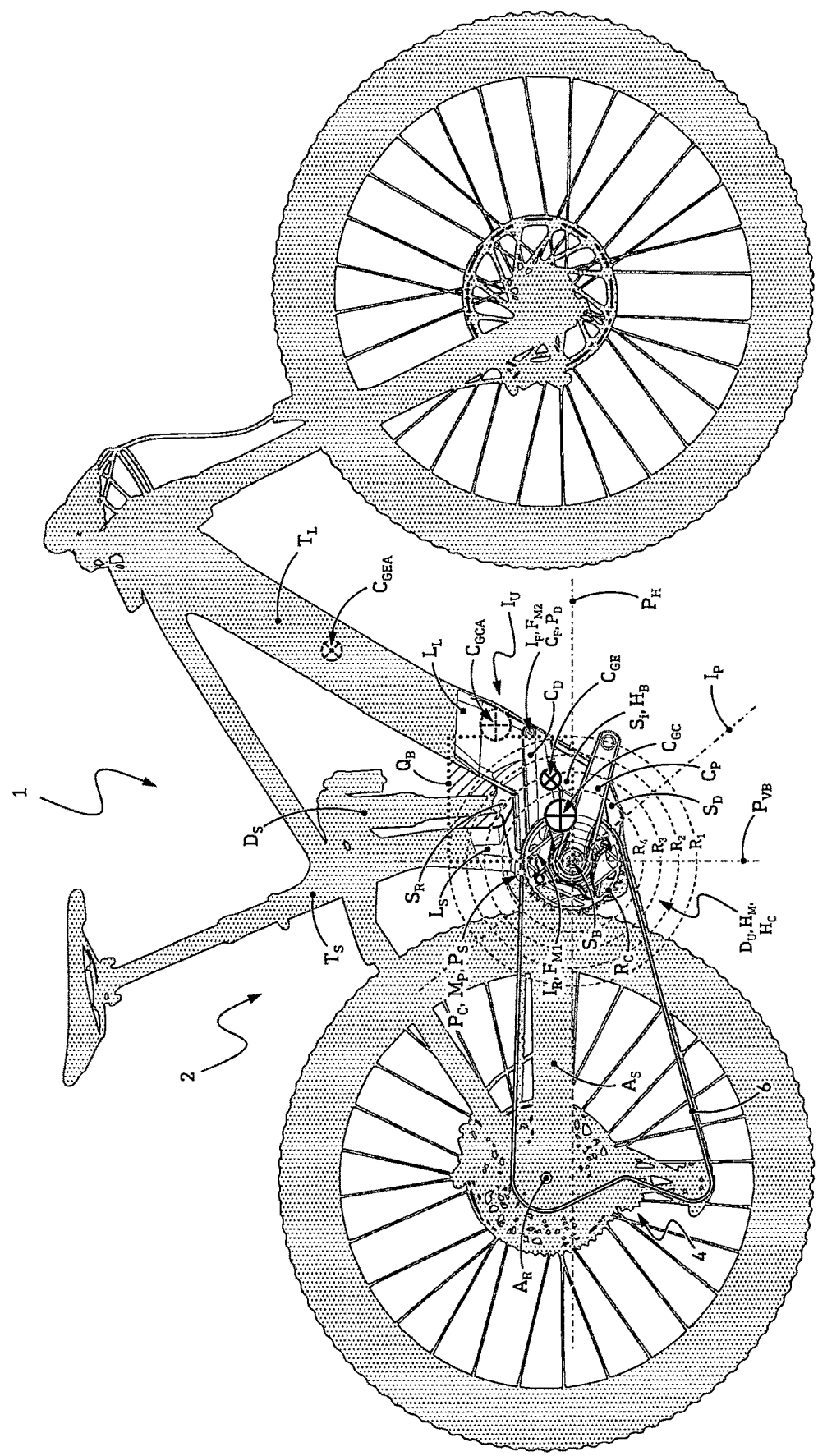
FIG. 17 shows a schematic outline of an e-mountain bike with a first embodiment of a Drive Unit with Integrative Energy Storage Device installed therein.

FIG. 17 shows a first embodiment of a Drive Unit $D_U$ with Integrative Energy Storage Device installed in an e-mountain bike. FIGS. 18 to 27 show various views and sectional views of the Drive Unit $D_U$ according to FIG. 17, and FIG. 28 shows an exploded view of the Common Drive Housing $H_C$ of the Drive Unit $D_U$ according to FIGS. 17 to 27.

It can be seen in FIG. 17, and more clearly in FIGS. 18, 19, 23, 24 and 26, that the Drive Unit $D_U$ achieves a considerable reduction in complexity and thus in the mass and costs of the Bicycle Frame in particular by omitting the additional suspension points in a rear region of the Drive Unit $D_U$, in particular behind an imaginary vertical plane $P_{VB}$, which runs through the Bottom Bracket Shaft $S_B$, or by relocating them in front of this vertical plane $P_{VB}$. This results in a considerable reduction in the volume of components behind the vertical plane $P_{VB}$, in particular also between the Bottom Bracket Shaft $S_B$ and the rear wheel axle $A_R$ and thus greater freedom of design with regard to the geometry, in particular in the case of sprung rear frames 2.

The Drive Unit $D_U$ according to the embodiment example shown in FIGS. 17 to 27 has or combines features of at least several of the Drive Units $D_U$ described above and shown in FIGS. 2 to 16, which can be seen in detail in FIGS. 17 to 28 and in the following description of the assemblies or components provided with corresponding reference signs in FIGS. 17 to 28.

First, FIG. 17 shows a Bicycle Main Frame 1, similar to the frame 1 shown in FIGS. 1 to 15. Furthermore, a Suspended Rear Frame 2, a Rear Frame Interface Arrangement $I_R$ and a Front Frame Interface Arrangement $I_F$ can be seen. Here, the Frame Interfaces $I_R$, $I_F$ of the Drive Unit $D_U$ are arranged on corresponding Frame Interface Units $I_{DR}$, $I_{DF}$ of a Frame Interface Unit $I_U$, which can be seen in particular in FIG. 22.

The Rear Frame Interface Arrangement $I_R$, and accordingly also the Rear Drive Unit Interface Arrangement $I_{DR}$ of the Frame Interface Unit $I_U$, is located on a straight mounting axis $F_{M1}$ (cf. FIGS. 16, 20, 22 and 26 to 28). As can be seen in particular from FIG. 18, in the assembled state of Drive Unit $D_U$ and Frame Interface Unit $I_U$, the vertical distance $D_{PV}$ between the fastening axis $F_{M1}$ and the point of application $P_C$ of the Chain Traction Force $F_{PC}$ is small, in another embodiment less than 30 mm, and in yet another embodiment less than 21 mm.

Figure 18:
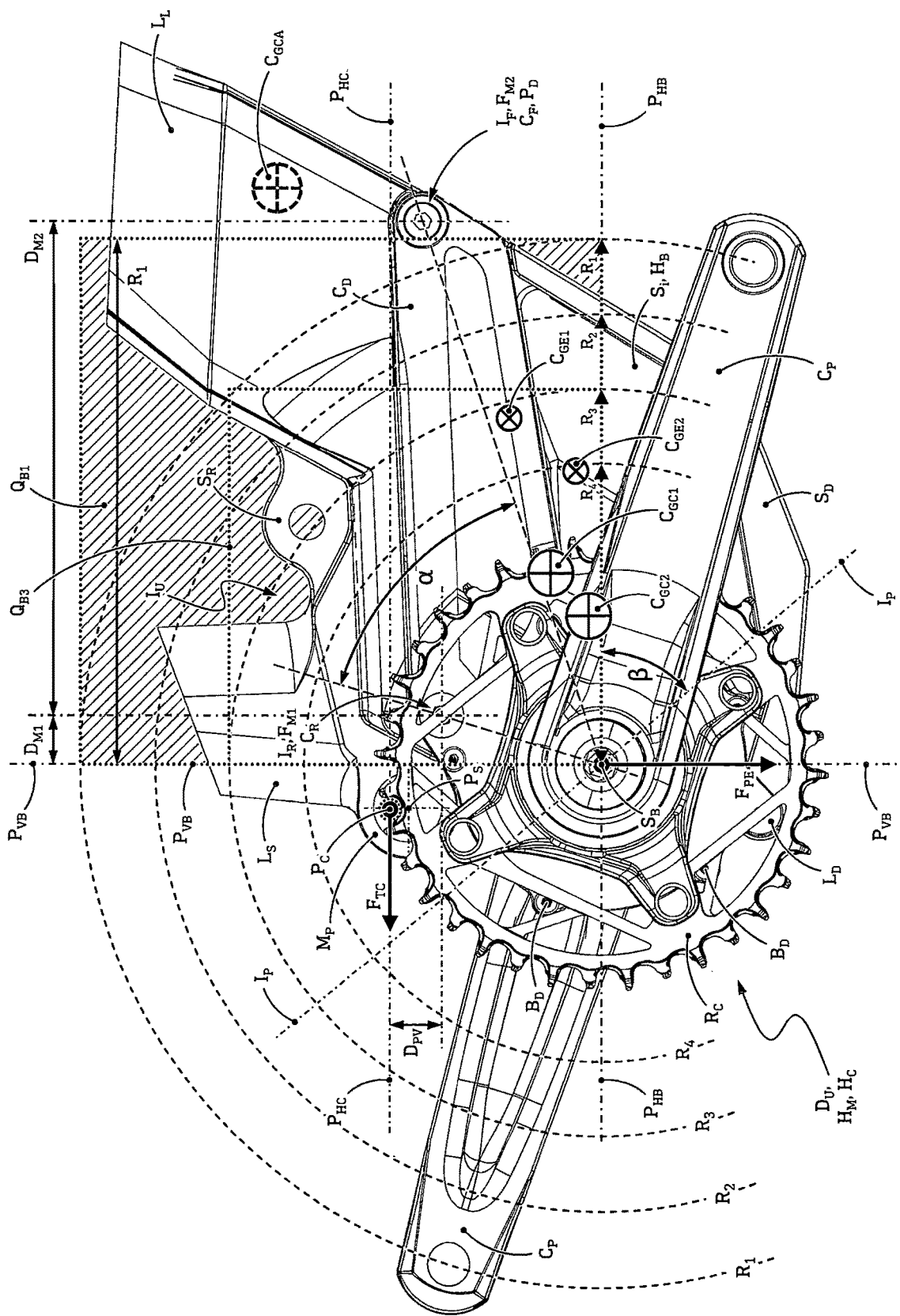
FIG. 18 shows the Drive Unit according to FIG. 17 in a side view from the drive side.

Similarly, the horizontal distance $D_{M1}$ between the mounting axis $F_{M1}$ and the axis of rotation of the Bottom Bracket Shaft $S_B$ (point of application of the rider weight force and rider drive force, i.e. the Effective Pedal Force $F_{PE}$, which runs approximately in the Bottom Bracket Axis Vertical Plane $P_{VB}$ according to FIG. 18) is also small, in an embodiment less than 30 mm, and in yet another embodiment less than 18 mm.

In this way, the torques generated by these two possibly very high forces, which have to be transmitted from the Drive Unit to the frame, are minimized. In particular, the Chain Traction Force $F_{TC}$ can easily reach and exceed orders of magnitude of 5000 N in dynamic load cases. Due to the minimization of the torques generated by Chain Traction Force $F_{TC}$ and Rider Weight Force/Drive Force $F_{PE}$ achieved with this design, and due to the large effective length $D_{M2}$ of the Drive Housing Cantilevers $C_D$, the reaction forces required to support these torques at the Front Frame Interface Arrangement $I_F$ are small and can be easily introduced into the frame there by means of a frictional connection between Drive Unit $D_U$ and Frame Interface Unit $I_U$, which is also subject to only minor requirements regarding compliance with dimensional tolerances.

Conversely, this means that of the two Frame Interface Arrangements $I_F$ and $I_R$, only the Rear Frame Interface Arrangement $I_R$ is subject to high requirements in terms of force transmission, rigidity and compliance with tolerances, while the Front Frame Interface Arrangement $I_F$ is only subject to low forces and is only subject to low tolerance or accuracy requirements.

This specific distribution of tasks between the two Frame Interface Arrangements $I_F$ (torque support) and $I_R$ (shortest-path support of all forces as well as dimensional referencing) also means that the connection between the Drive Unit $D_U$ and Rear Frame Interface Arrangement $I_R$ offers particularly high rigidity as well as direct force flow.

Figure 22:
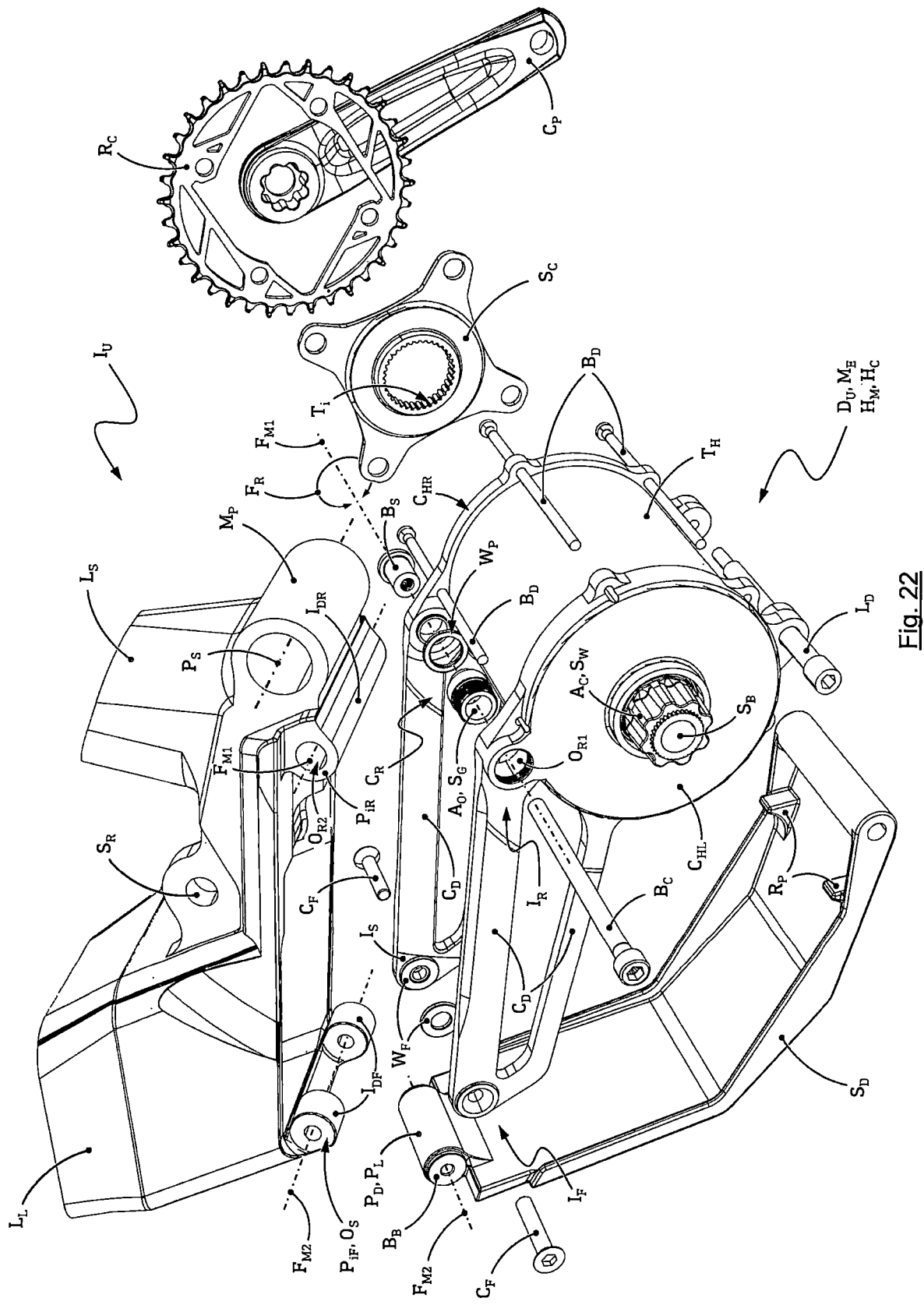
FIG. 22 shows the Drive Unit according to FIGS. 17 to 21 in an exploded view.

Furthermore, all degrees of freedom of movement of the Drive Unit $D_U$ (except for the degree of freedom of rotation $F_R$ about the rear mounting axis $F_{M1}$, cf. FIG. 22) with respect to the Main Frame 1 are fixated only by means of the Rear Frame Interface Arrangement $I_R$. As can be seen in particular from FIG. 22, the Rear Frame Interface Arrangement $I_R$ in the first embodiment example according to FIGS. 17 to 29A includes a screw connection $C_R$ for connecting the Rear Frame Interface Arrangement $I_R$ to the Drive Unit $D_U$.

In the first embodiment example, the screw connection $C_R$ (cf. in particular FIGS. 22, 26, 27) includes a Frame Offset Adapter $A_O$ in the form of or with a Graded Sleeve $S_G$, which has an external thread for variable backlash-free adjustment of the clamping in the axial direction between Motor Housing $H_M$ resp.Common Drive Housing $H_C$ and Rear Drive Unit Interface $I_{DR}$ of the Frame Interface Unit $I_U$, furthermore a Screw Bushing $B_S$, a Push Washer $W_P$, and a Connecting Bolt $B_C$ for screwing into the Screw Bushing $B_S$, whereby the above-described load-transmitting connection, free of play in all three spatial directions, is established between Motor Housing $H_M$ or Common Drive Housing $H_C$ and Rear Drive Unit Interface $I_{DR}$.

The connection between Motor Housing $H_M$ or Common Drive Housing $H_C$ and rear Drive Unit Interface $I_{DR}$ of Frame Interface Unit $I_U$ by means of Frame Offset Adapter $A_O$ is not only free of play in the axial direction, relative to the longitudinal axis of Offset Adapter $A_O$. By selecting the appropriate fits between the outer diameter of Frame Offset Adapter $A_O$ and the bores $O_{R1}$, $O_{R2}$ in Motor Housing $H_M$ or Drive Unit $D_U$ receiving it, it is possible to ensure that the connection between Motor Housing $H_M$ or Common Drive Housing $H_C$ and rear Drive Unit Interface $I_{DR}$ is free of play in the axial direction. Common Drive Housing $H_C$ and in the Drive Unit Interface $I_{DR}$ of the Frame Interface Unit $I_U$, it can be ensured that the connection between the Motor Housing $H_M$ or Common Drive Housing $H_C$ and the rear Drive Unit Interface $I_{DR}$ is also free of play in the radial direction, relative to the longitudinal axis of the Compensating Adaptor $A_O$.

In this context, the Frame Offset Adapter $A_O$ serves in particular to compensate for any tolerances existing on the Bicycle Frame 1 or on the Drive Unit Interface $I_{DR}$, in particular with regard to the Support Width $W_S$ (cf. FIGS. 26 to 28 and 33B).

This tolerance compensation is of considerable importance, since the Drive Unit $D_U$ can be combined in practice on the bicycle market with a wide variety of Bicycle Frames or with possibly different Frame Interface Units $I_U$, whereby the Bicycle Frames, or possibly the Frame Interface Units $I_U$, can come from or be supplied by a wide variety of manufacturers.

Experience has shown that, depending on the origin or manufacturer of the Bicycle Frame or the Frame Interface Unit $I_U$, respectively, this results in a wide variety of tolerance situations with regard to the Support Width $W_S$. Such different tolerance situations can be easily and continuously compensated for with the compensation adapter $A_O$.

As previously discussed, the Front Frame Interface Arrangement $I_F$ of the Drive Unit $D_U$ serves to provide torque support via the Drive Housing Cantilevers $C_D$ (and thus to fixate the sixth degree of freedom $F_R$ of six degrees of freedom of movement of the Drive Unit $D_U$ relative to the Main Frame 1). Due to the large horizontal distance $D_{M2}$ between Front Frame Interface Arrangement $I_F$ or Front Mounting Axis $F_{M2}$ and the axis of rotation of Bottom Bracket Shaft $S_B$, this results in only small reaction forces to be supported at Front Frame Interface Arrangement $I_F$.

In the prior art, three mounting axes are commonly used to connect the Drive Unit to the Bicycle Frame, however, unlike the present disclosure, there is no specific division of duties among the various mounting axes with respect to power transmission, torque transmission, and fixation of the degrees of freedom of movement of the Drive Unit relative to the Bicycle Frame. In particular, no clear load path exists for the introduction of forces and moments from the Drive Unit into the Bicycle Frame. Rather, in the prior art, the actual load path as well as the question of which suspension point or which mounting axis transmits which portion of the forces and moments is essentially dependent on random tolerance ratios and distributions between the multiple equal mounting axes on the Drive Unit and the Bicycle Frame.

In the state of the art, this often results in considerable difficulties with regard to tolerance compensation when mounting the Drive Unit in the Bicycle Frame, as well as with regard to a permanently firm and backlash-free connection between the Drive Unit and the Bicycle Frame.

In addition, in the prior art, one of the usually three mounting axes for connecting the Drive Unit and Bicycle Frame is located in an area behind or even considerably far behind the vertical plane $P_{VB}$, which contains the axis of rotation of the Bottom Bracket Shaft $S_B$, typically more than about 40 mm behind this vertical plane $P_{VB}$, and thereby often even below the horizontal plane $P_{HB}$, which contains the axis of rotation of the Bottom Bracket Shaft $S_B$. This means that the Bicycle Frame, or a Frame Interface Unit of the Bicycle Frame, must be built around the bottom bracket until far behind the bottom bracket and often even below the bottom bracket height in order to provide the required mounting axis or mounting receptacle there for connection to the Drive Unit.

However, such an extension or protrusion of the frame behind the bottom bracket, also known in the industry as a "frame flap", in order to be able to attach the Drive Unit there, is complex to manufacture, especially if it is to meet the aforementioned high requirements regarding compliance with tolerances and the absorption of forces at the same time. In addition, such an extension or protrusion of the frame behind the bottom bracket conflicts with the mount for the Rear Swing Arm Pivot Mount $M_P$ (cf. FIG. 1 and FIGS. 17 to 25), which is usually located in the same installation space and can significantly complicate its design and optimization.

The Drive Unit $D_U$ according to the present disclosure provides two Frame Interface Arrangements $I_R$, $I_F$ or two Fastening Axes $F_{M1}$, $F_{M2}$, of which the Rear Frame Interface Arrangement $I_R$ or mounting axis $F_{M1}$ is positioned very close to the essential force application lines of both the Chain Traction Force $F_{TC}$ and the rider weight force/drive force $F_{PE}$ and takes over all tolerance compensation and force transmission tasks as well as the fixation of all degrees of freedom of movement of the Drive Unit $D_U$ (except for a rotational degree of freedom $F_R$ about a rotational axis parallel to the Bottom Bracket Shaft $S_B$, cf. FIG. 22). The Front Frame Interface Arrangements $I_F$ or mounting axis $F_{M2}$ in the form of a torque arm is only required to fixate the remaining, aforementioned rotational degree of freedom $F_R$ of the Drive Unit $D_U$.

Accordingly, the Drive Unit $D_U$ particularly has two Frame Interface Units $I_R$, $I_F$, which are designed for connection to the respective associated Drive Unit Interfaces $I_{DR}$, $I_{DF}$ of the Frame Interface Unit $I_U$.

In an embodiment, the Front Frame Interface Arrangement $I_F$ of the Drive Unit $D_U$ is thereby formed in functional combination with a swivel bearing $P_D$ for the Drive Shield $S_D$, which is shown in particular in FIGS. 22 to 26 and FIG. 30.

In this case, the Drive Protection Shield $S_D$ is pivotably mounted on the Motor Housing $H_M$ and/or on the Frame Interface Unit $I_U$. This mounting of the Drive Shield $S_D$ is carried out on the axis $F_{M2}$ coaxially with the screw connection $C_F$ of the Front Frame Interface Arrangement $I_F$ of the Drive Unit $D_U$ with the Drive Unit Interface Arrangement $I_{DF}$ of the Frame Interface Unit $I_U$ (cf. FIGS. 21 to 26 and FIG. 33B), by means of Bearing Bushings $B_B$, for example by means of plastic or sintered bearing bushings. Alternatively, the drive shield $S_D$ can also be pivotably connected to the Common Drive housing $H_C$ at a fastening interface $L_D$. In this case, the lock of the drive shield $S_D$, which can be opened to remove the battery, is located in the area of the front Fixation Axis $F_{M2}$ (see FIGS. 22 to 25).

The Drive Shield $S_D$ protects the Drive Unit $D_U$ and in particular its removable battery $S_i$, and simultaneously forms a movable flap for the purpose of battery retention and battery removal. In the first embodiment, the battery $S_i$ is held by clamping between Drive Shield $S_D$ and Motor Housing $H_M$.

Figure 34:
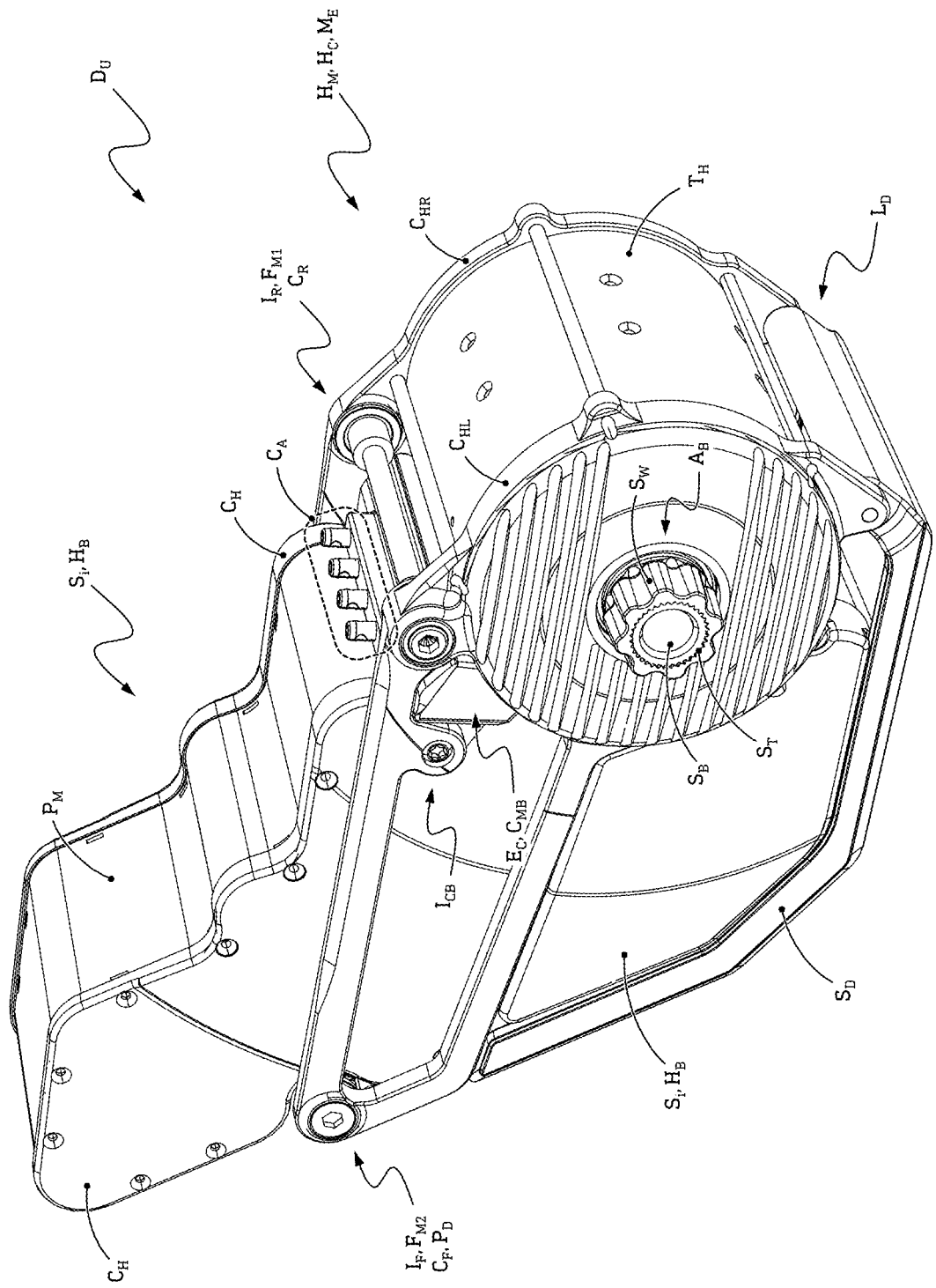
FIG. 34 shows the Drive Unit according to the second embodiment example shown in FIGS. 29C to 33C, including the Energy Storage Device.

As can be seen in particular from FIGS. 29A and 34, the drive shield $S_D$ is attached directly to the Motor Housing $H_M$ and to the Common Drive Housing $H_C$ of the motor $M_E$ and battery $S_i$, respectively.

This is particularly advantageous, since in this way the considerable forces which occur in particular when the bicycle touches down in the Bottom Bracket Area, for example on obstacles (which can occur quite frequently in sporting use) can be introduced directly from the Drive Guard $S_D$ via the fastening interfaces $P_D$, $L_D$ of the Drive Guard $S_D$ on the Common Drive Housing $H_C$ into the Common Drive Housing $H_C$, and from this via the Frame Interfaces $I_R$, $I_F$ of the Drive Unit $D_U$ and via the Drive Unit Interface arrangements $I_{DR}$, $I_{DF}$ into the Main Frame 1. Since both the Common Drive Housing $H_C$ with the frame interfaces $I_R$, $I_F$ and the Drive Unit Interface arrangements $I_{DR}$, $I_{DF}$ are designed to absorb high forces, such forces occurring, for example, when the bicycle is set down can be absorbed without difficulty and introduced safely into the Bicycle Frame.

The Bicycle Frame is also significantly relieved by the fact that the rider often stands on the pedals when the bicycle hits an obstacle in the Bottom Bracket Area. Here, thanks to the attachment of the Drive Shield $S_D$ to the Motor Housing $H_M$, the impact forces can be transmitted directly via the bearing $B_R$, $B_L$ of the Bottom Bracket Shaft $S_B$ from the Motor Housing $H_M$ into the Bottom Bracket Shaft $S_B$ and from there into the damping and cushioning legs of the rider.

In the prior art, on the other hand, drive shields are usually not connected to the drive housing but directly to the Main Frame 1. For this reason, there is a considerable risk in the prior art of damaging the Bicycle Frame, for example, when it hits obstacles.

In order to further improve the ability of the drive protection shield $S_D$ to absorb force impacts, the rear attachment $L_D$ of the drive protection shield $S_D$ in the direction of travel in particular can also be arranged further forward (not shown) so that the unsupported length of the drive protection shield $S_D$ is shortened accordingly.

In an embodiment, there is an air gap between the drive end shield $S_D$ and the battery $S_i$, at least over the unsupported length of the drive end shield $S_D$, so that the unsupported length of the drive end shield $S_D$ can yield in the event of force impacts occurring and absorb the force impacts accordingly without the drive end shield $S_D$ colliding with the battery $S_i$ and causing impermissibly high mechanical loads on the battery $S_i$.

Alternatively, it is also possible to at least partially dissipate force impacts via the cantilevered area of the drive end shield $S_D$ onto the battery $S_i$. For this purpose, the Battery Housing $H_B$ is designed to be suitably robust and an elastomer intermediate layer is provided to dampen and distribute the force, at least between the cantilevered area of the drive end shield $S_D$ and the front lower area of the battery $S_i$.

With the drive protection shield $S_D$ according to the present disclosure, it is also possible to dispense with the further mechanical interfaces between Main Frame 1 and battery $S_i$ which further reduces effort, costs and possible sources of error.

In another embodiment the Drive Shield $S_D$ is provided with retaining projections $R_P$ (cf. FIGS. 22 to 25), which make it easier to insert and remove the battery, and in particular prevent the battery from falling out in an uncontrolled manner when the Hatch $S_D$ is opened.

Figure 23:
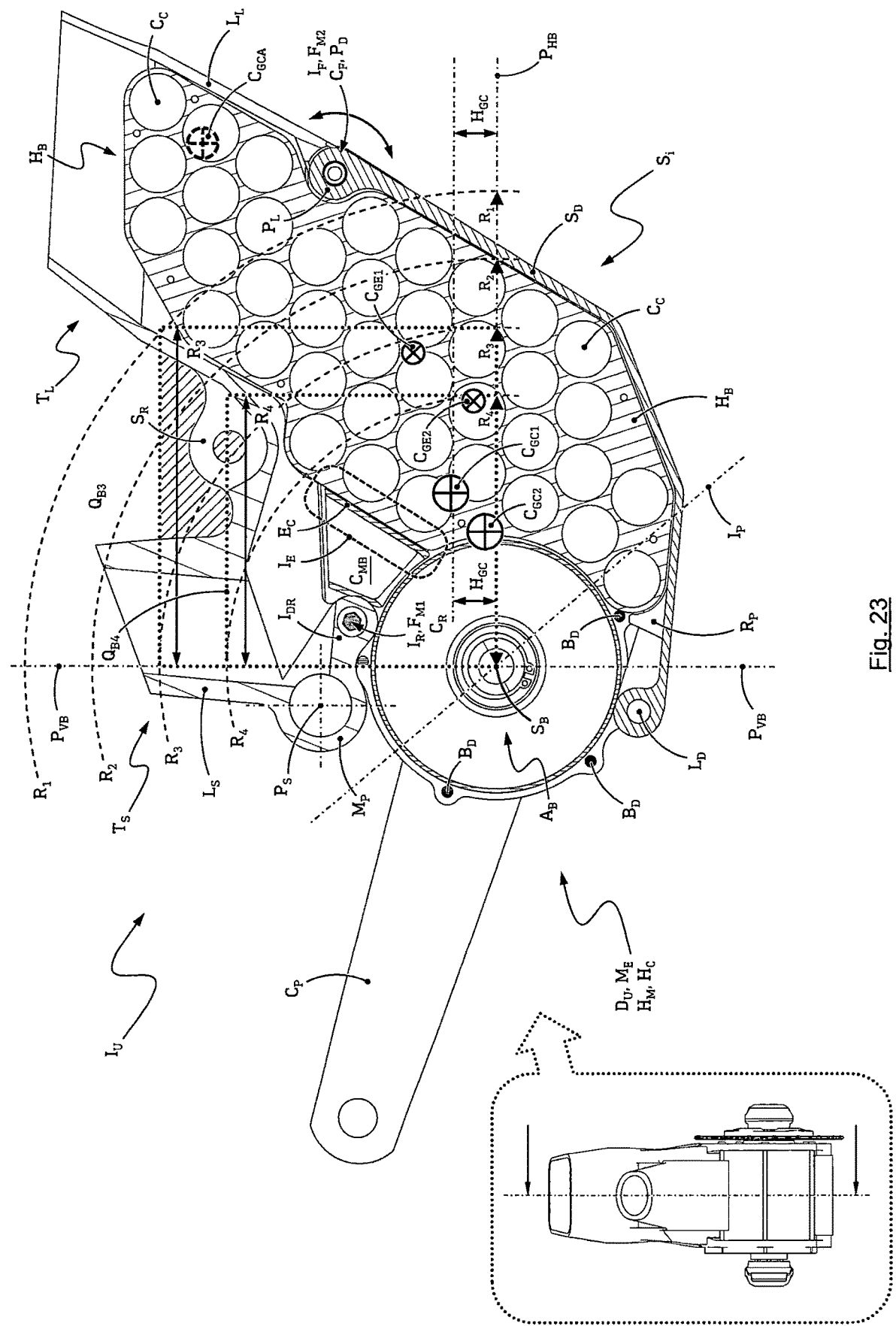
FIG. 23 shows the Drive Unit according to FIGS. 17 to 22 in a cross-sectional view as well as the associated sectional view.
Figure 25:
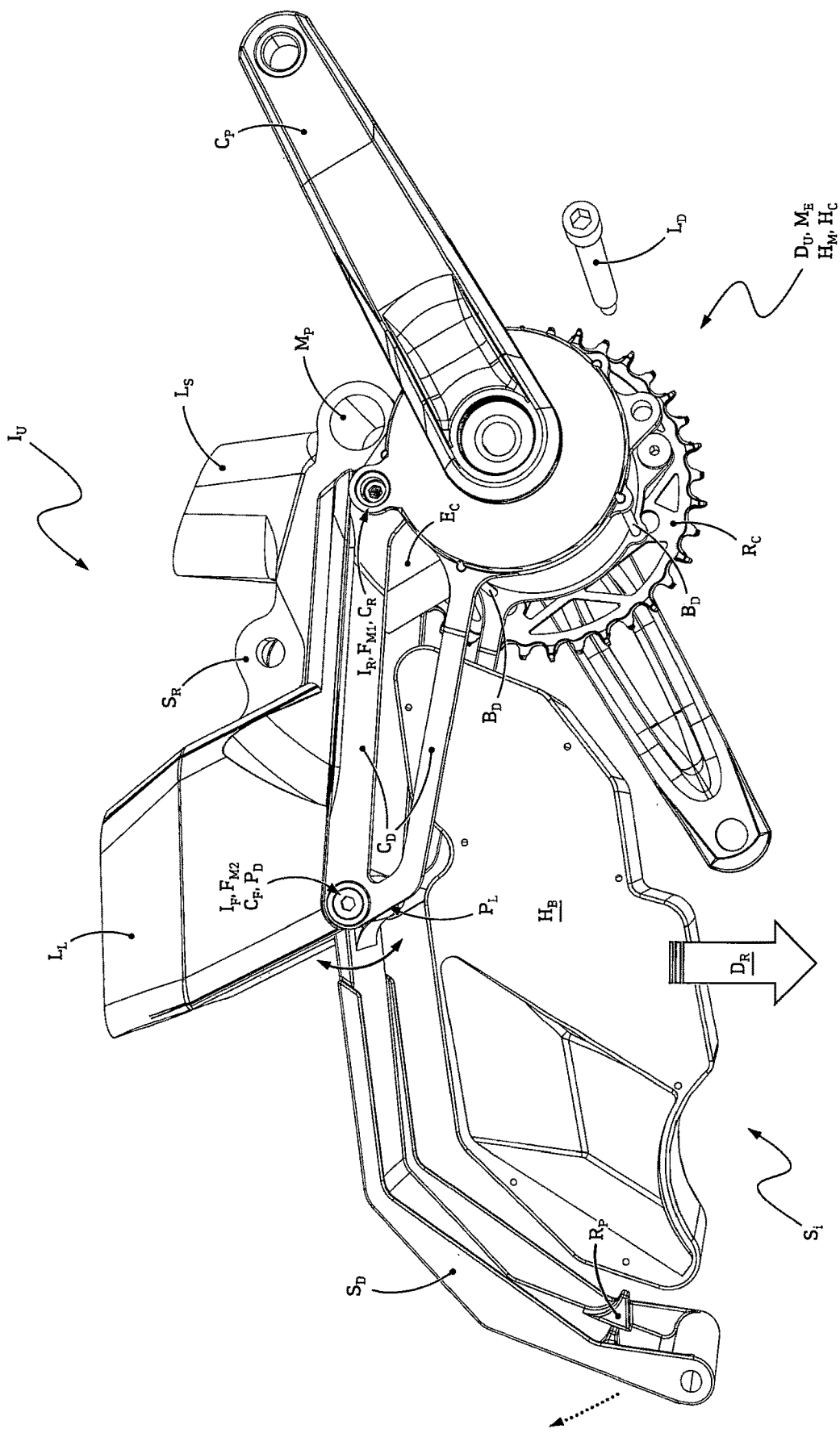
FIG. 25 shows the Drive Unit according to FIGS. 17 to 24 in an oblique view from the non-drive side with the drive shield open during battery removal, the opening angle of the drive shield being enlarged for better recognition of the individual parts.
Figure 30:
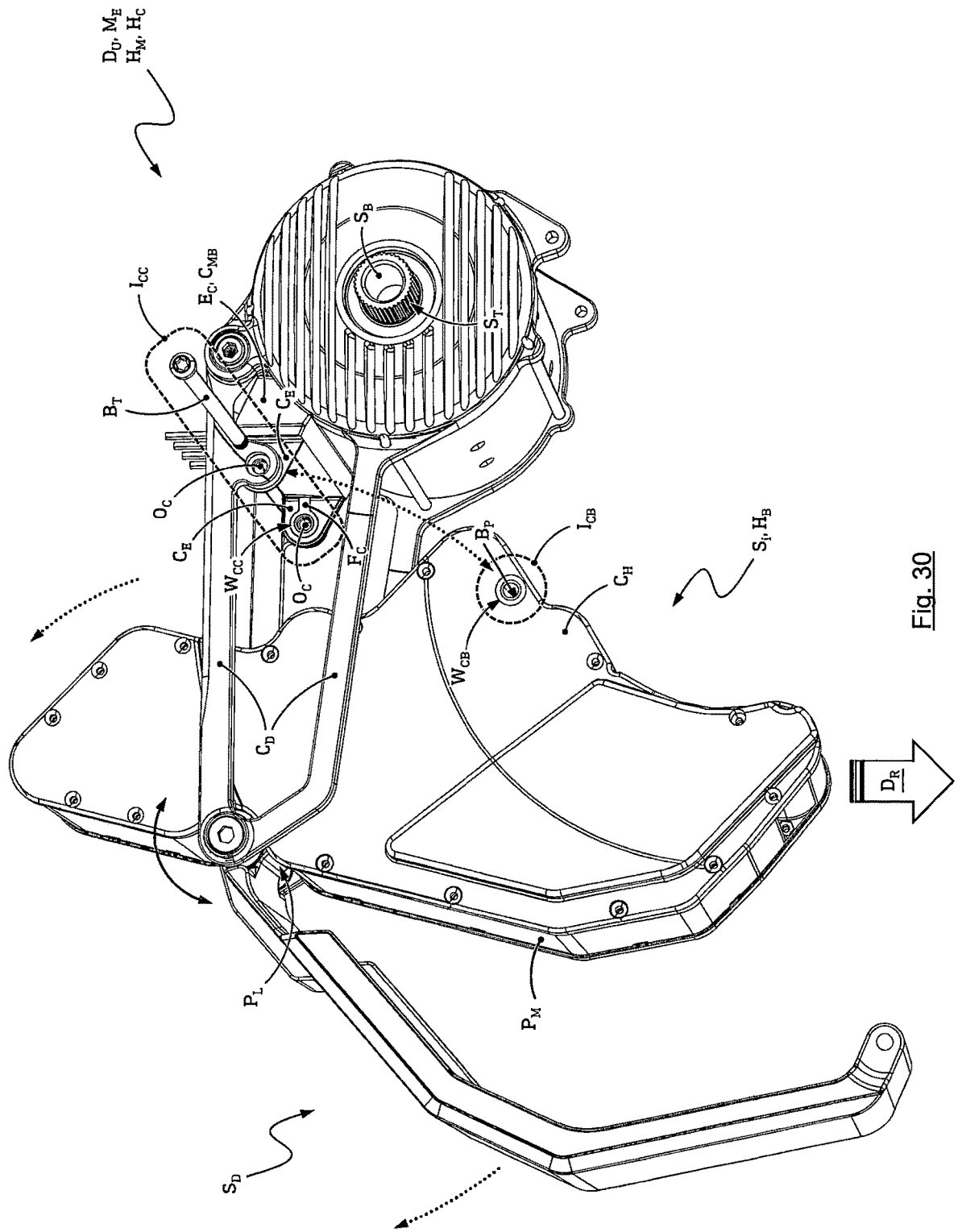
FIG. 30 shows the Drive Unit according to the second embodiment example shown in FIGS. 29C and 29D with the drive shield open and the battery swung out.

As can be seen from FIG. 29C, the Drive Shield $S_D$ can have a Locking Protrusion $P_L$ or a correspondingly eccentrically shaped cam that is eccentrically shaped relative to the axis of rotation $F_{M2}$ of the Drive Shield $S_D$ and is elastically compliant, which presses the Battery $S_i$ against corresponding abutments, for example on the Motor Housing $H_M$, $T_H$, when the Drive Shield $S_D$ is closed (cf. FIGS. 23/24 as well as FIGS. 25, 30 and 33B). In this way, the battery $S_i$ is held firmly in the Drive Unit $D_u$ without rattling, even during demanding uses of the bicycle, without the need for further latches or fasteners that would have to be specifically actuated by the user.

This fastening and locking of the battery $S_i$ by means of an elastic flexible Locking Protrusion $P_L$ has the further advantage that twisting of the Bicycle Frame and/or the Drive Unit $D_U$ occurring during operation in the area between the bottom bracket and the Down Tube $T_L$ has no detrimental effect on the firm enclosure of the battery $S_i$ in the Drive Unit $D_U$, since the elastic flexible Locking Protrusion $P_L$ compensates for such twisting.

Figure 19:
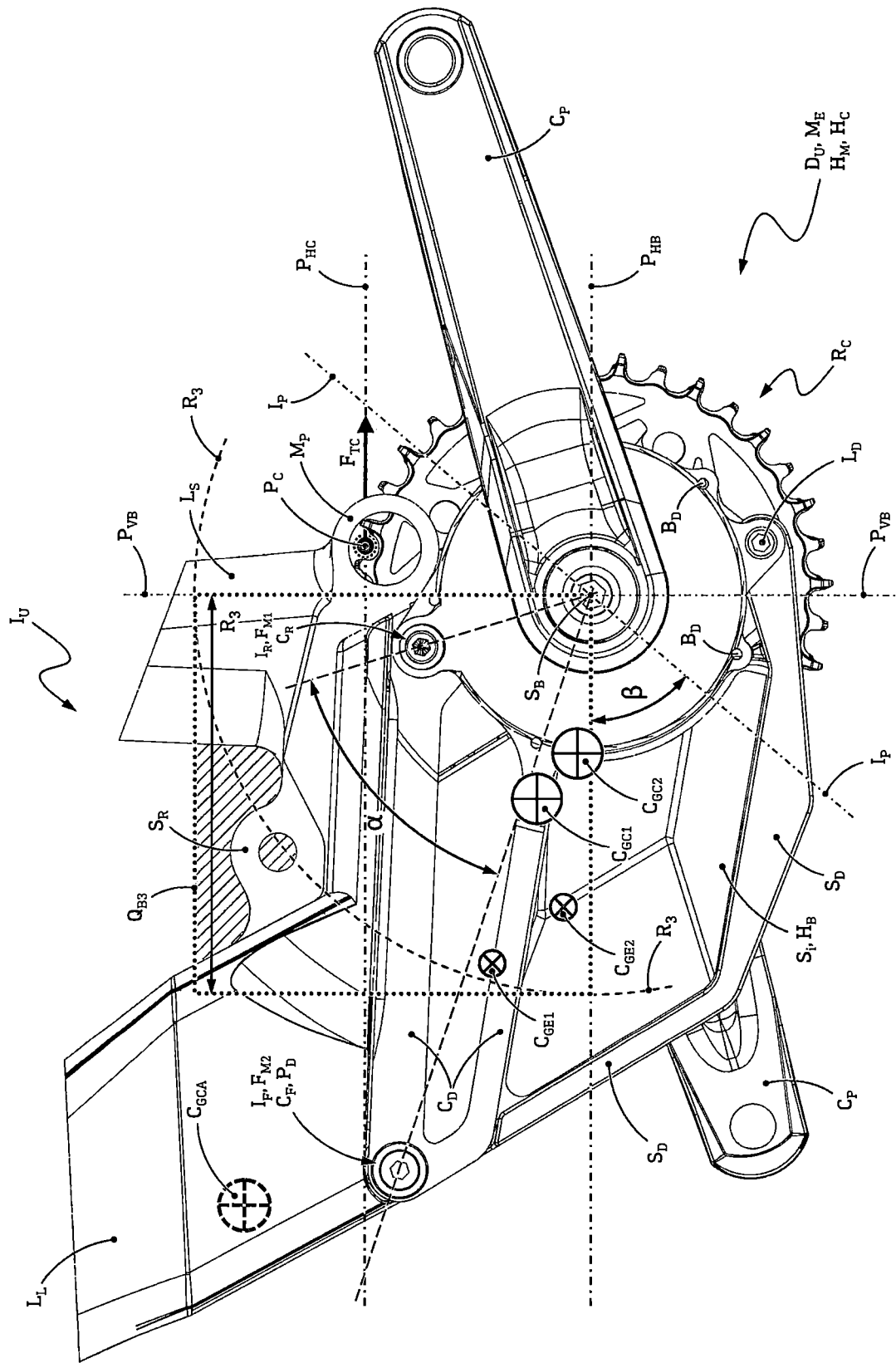
FIG. 19 shows the Drive Unit according to FIGS. 17 and 18 in a side view from the non-drive side.
Figure 20:
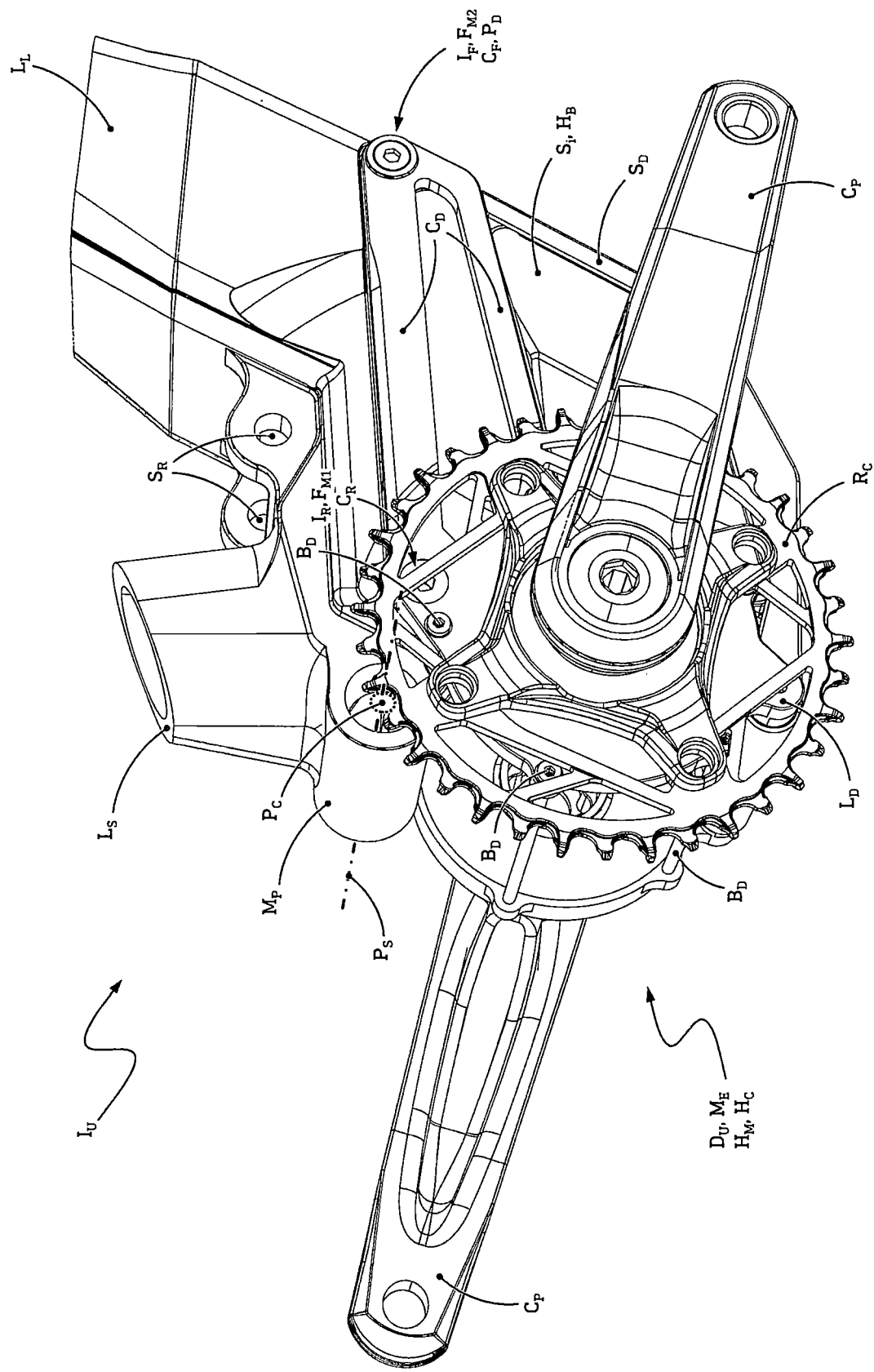
FIG. 20 shows the Drive Unit according to FIGS. 17 to 19 in a rear oblique view from the non-drive side.
Figure 21:
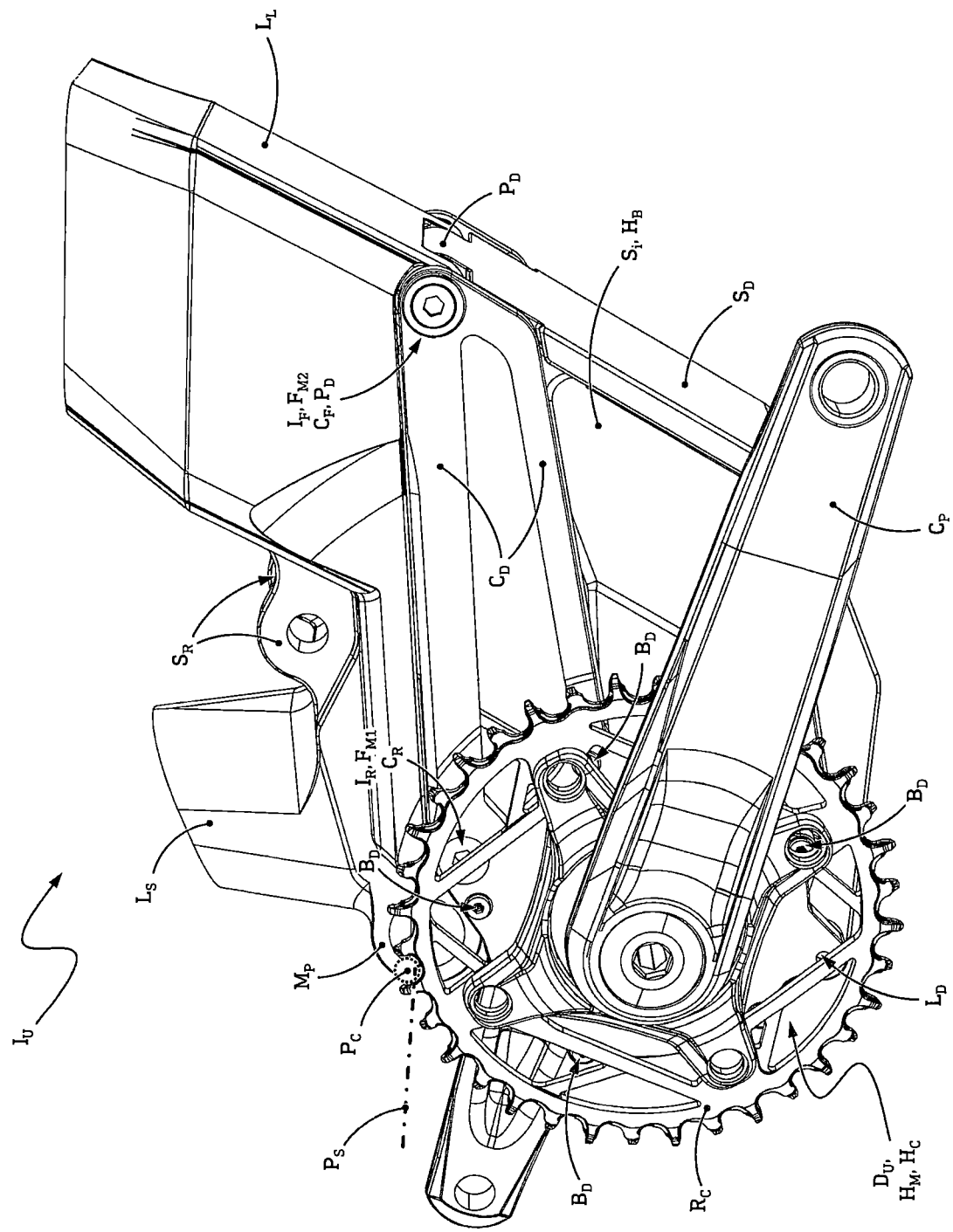
FIG. 21 shows the Drive Unit according to FIGS. 17 to 20 in a front oblique view from the non-drive side.

FIGS. 17 to 19 and 23 also show in this embodiment the centers of gravity $C_{GE1}$ (Battery Center of Gravity of the illustrated battery $S_i$) and $C_{GC1}$ (Overall Center of Gravity of the Drive Unit $D_U$ including battery $S_i$) and the centers of gravity $C_{GE2}$ (Battery Center of Gravity of a smaller battery $S_i$ not illustrated here similar to the embodiment according to FIGS. 12 and 13, in which the battery does not extend into the Down Tube) and $C_{GC2}$ (Overall Center of Gravity of the Drive Unit including the smaller battery). In particular, FIGS. 19 and 23 show that in this embodiment all centers of gravity $C_{GE1}$, $C_{GE2}$, $C_{GC1}$ and $C_{GC2}$ are advantageously located within the small quadrant $Q_{B3}$ with radius $R_3$, and thus in the immediate vicinity of the Bottom Bracket Shaft $S_B$ in terms of both their height and their horizontal position.

For comparison, FIG. 17 also shows the corresponding centers of gravity $C_{GEA}$ (battery center of gravity in the prior art according to FIG. 1) and $C_{GCA}$ (total center of gravity of motor unit $M_E$ and batteries $S_i$ and $S_A$). In FIGS. 18, 19 and 23, the overall center of gravity $C_{GCA}$ is drawn again for comparison. This shows, particularly clearly in FIG. 17, that the overall center of gravity $C_{GC}$ of the Drive Unit $D_U$ according to the present disclosure is significantly lower and further back and thus advantageously far more central in the Bicycle Frame than in the prior art, for example according to FIG. 1.

This brings advantages with regard to the center-of-gravity problem with known e-mountain bikes, as explained in the introduction to the description, in particular significant improvements in terms of handling and riding safety.

Furthermore, FIG. 17 shows a quadrant $Q_B$ lying at the top right as seen from the bottom bracket $S_B$, there with a side length $R_1$, which corresponds to the circumference radius $R_1$ around the bottom bracket $S_B$, and which contains the center of gravity position $C_{GE}$ of the Battery $S_i$ as well as the common center of gravity position $C_{GC}$ of the Drive Unit $D_U$ including the Battery $S_i$. It can already be seen here how much further down and further back in the bicycle the center of gravity positions $C_{GE}$ and $C_{GC}$ are arranged, relative to the center of gravity positions $C_{GEA}$ and $C_{GCA}$ corresponding to of the prior art (cf. FIG. 1). In particular, the center of gravity positions $C_{GE}$ and $C_{GC}$ are again particularly clear from the enlarged illustrations according to FIG. 18, FIG. 19 and FIG. 23.

FIGS. 18 and 19 also show an Inclined Plane $I_P$, which contains the axis of rotation of the Bottom Bracket Shaft $S_B$. The Inclined Plane $I_P$ is tilted forward relative to a horizontal plane by an angle β of 50° and delimits an area in front of and above the Bottom Bracket $S_B$, within which the two Mounting Axes $F_{M1}$ and $F_{M2}$ are arranged between Drive Unit $D_U$ and Bicycle Frame and between Drive Unit $D_U$ and Frame Interface Unit $I_U$, respectively. Also, the two attachment axes $F_{M1}$ and $F_{M2}$ are arranged within an angle α of 30° to 80°, particularly within an angle α of 50° to 60°, wherein the vertex of the angle α coincides with the axis of rotation of the Bottom Bracket Shaft $S_B$, and wherein the angle α is located in the Bottom Bracket Quadrant $Q_{B1}$.

This arrangement of the mounting axes $F_{M1}$, $F_{M2}$ is made possible by the interaction of a plurality of features of the Drive Unit according to the present disclosure, including the allocation of almost all forces, moments and tolerances to the rear frame interface, and the short force transmission paths and high stiffnesses of the Drive Unit thus achieved. This allows for dispensing with the third mounting axis that is typically far behind and often below the Bottom Bracket Shaft in the prior art.

Figure 24:
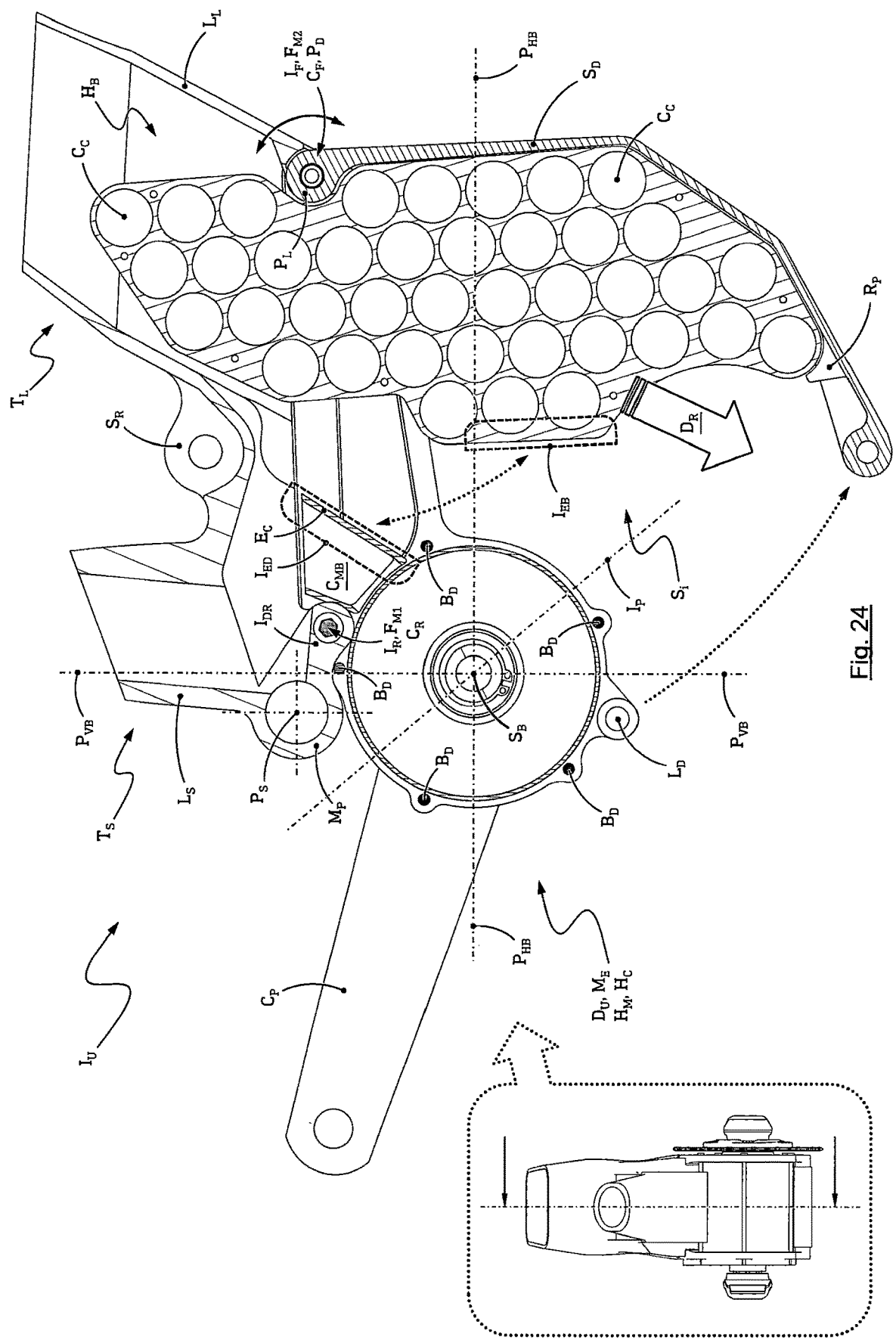
FIG. 24 shows the Drive Unit according to FIGS. 17 to 23 in cross-sectional view according to FIG. 23 with drive shield opened for battery removal and the associated sectional view.

FIGS. 23 and 24 show the Battery Housing $H_B$ (shown in section here) with battery cells $C_C$ contained therein. As can be seen in FIGS. 23 and 24, the battery cells $C_C$ are arranged in a hexagonal pack with minimal mutual spacing. Since the hexagonal packing corresponds to the spatial arrangement of cylindrical bodies with the highest packing density, a high battery capacity can be achieved in a small volume.

At the same time, the hexagonal packing together with the arrangement of most or all of the battery cells $C_C$ axially parallel to the Bottom Bracket Shaft makes it possible to give the battery $S_i$ a shape optimally adapted to the irregularly shaped spatial boundary conditions between Motor Housing $H_M/T_H$, Controller $C_{MB}$, Down Tube $T_L$ or Down Tube Lug $L_L$ (cf. synopsis of FIGS. 23 and 24).

This allows the energy content of the battery $S_i$ to be maximized, ensures easy removal of the battery $S_i$ by swinging it out of the Drive Unit $D_U$ (cf. FIGS. 24, 25 and 30), and ensures a tight and rattle-free enclosure of the battery in the Drive Unit $D_U$. In an embodiment, no further latches or fastening means for the battery other than the Drive Shield $S_D$ are present or required, nor are latches or fastening means on the part of the Bicycle Frame 1.

Figure 26:
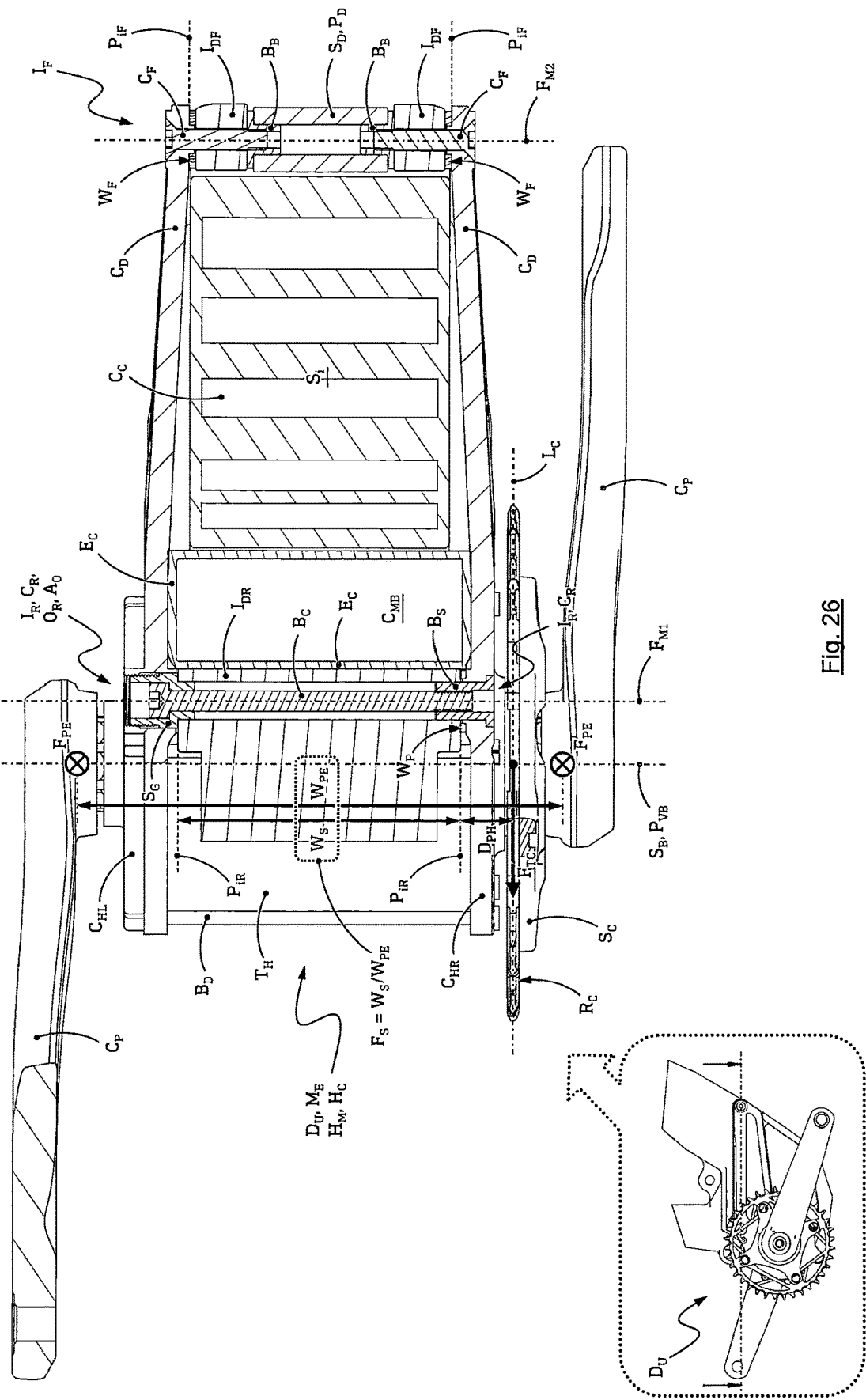
FIG. 26 shows the Drive Unit according to FIGS. 17 to 25 in a longitudinal sectional view through the frame interfaces, as well as the associated sectional view.

Furthermore, FIGS. 23 and 24 show an additional housing for accommodating a controller $C_{MB}$ for motor and/or battery $S_i$ (cf. also FIGS. 25 and 26). The Battery Housing may additionally contain a Battery Controller $C_B$ (not shown in FIG. 23/24, but cf. e.g. FIG. 9), which is responsible in particular for charging the battery $S_i$.

According to FIGS. 23 and 24, an Electrical Interface $I_E$ is located between the Controller $C_{MB}$ and the Battery $S_i$ for transmitting energy and wireless information between the Controller $C_{MB}$ and the Battery $S_i$. When the Drive Shield $S_D$ is opened and the Battery $S_i$ is pivoted as a result, the Electrical Interface $I_E$, which by way of example can be, but is not limited to, a plug connection is automatically separated into its two interface parts $I_{ED}$ (assigned to the Drive Unit) and $I_{EB}$ (assigned to the Battery) according to FIG. 24. Similarly, the two interface parts $I_{ED}$ and $I_{EB}$ are automatically and kinematically uniquely reunited after insertion of the battery $S_i$ and during subsequent closing of the Drive Shield $S_D$, thus ruling out incorrect operation and associated faulty contacting or damage to the interface contacts. A synopsis of FIGS. 23 and 24 shows that when the Drive Shield $S_D$ is opened, the battery $S_i$ is rotated or pivoted together with it about the front Drive Unit Interface $I_F$. The special shape of the battery $S_i$ in its upper region enables this pivoting movement without the battery $S_i$ colliding with the inner walls of the Down Tube $T_L$ or the Down Tube Lug $L_L$.

Figure 27:
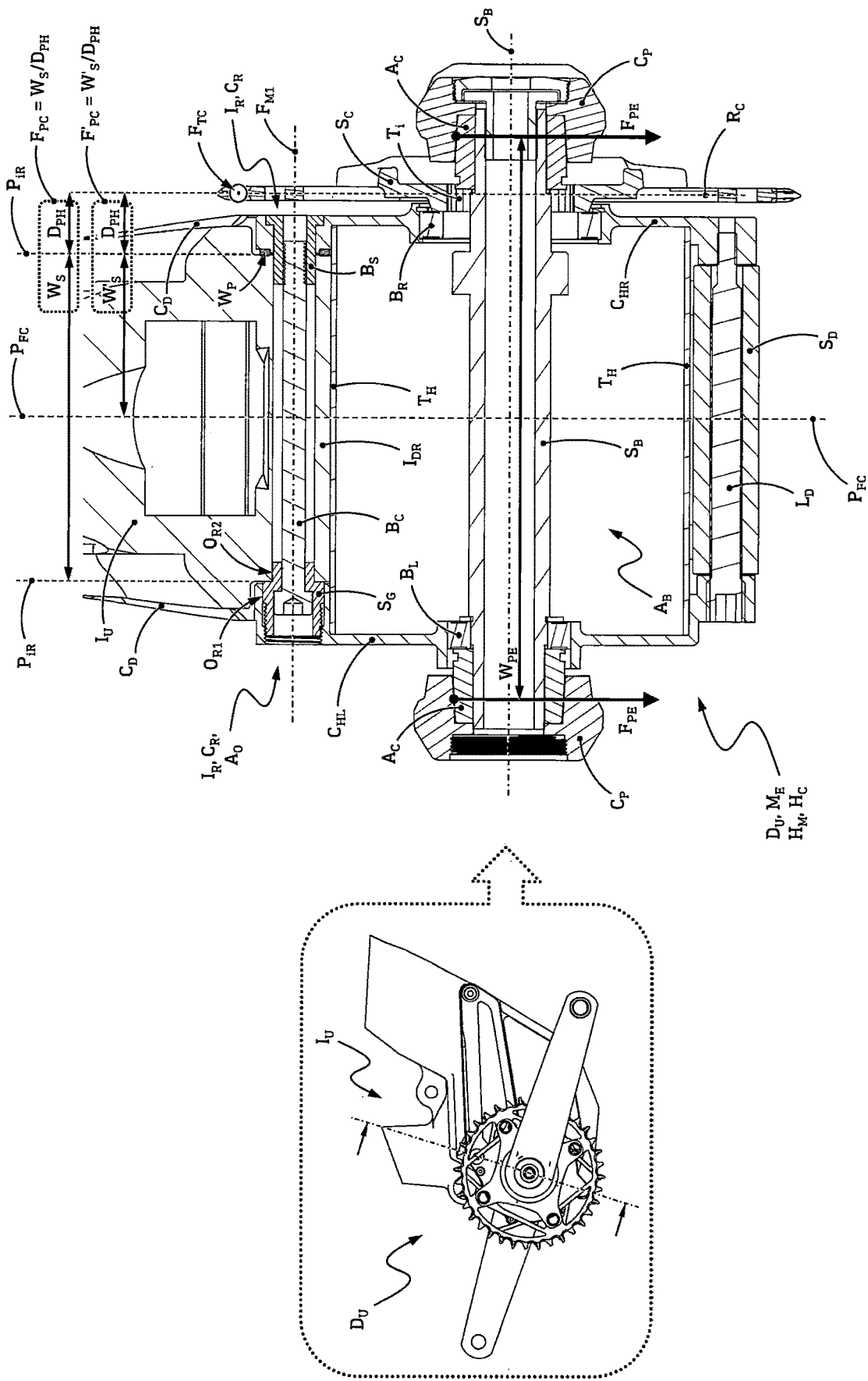
FIG. 27 shows the Drive Unit according to FIGS. 17 to 26 in a longitudinal sectional view through Bottom Bracket Shaft and Rear Frame Interface Arrangement and the associated sectional view.
Figure 28:
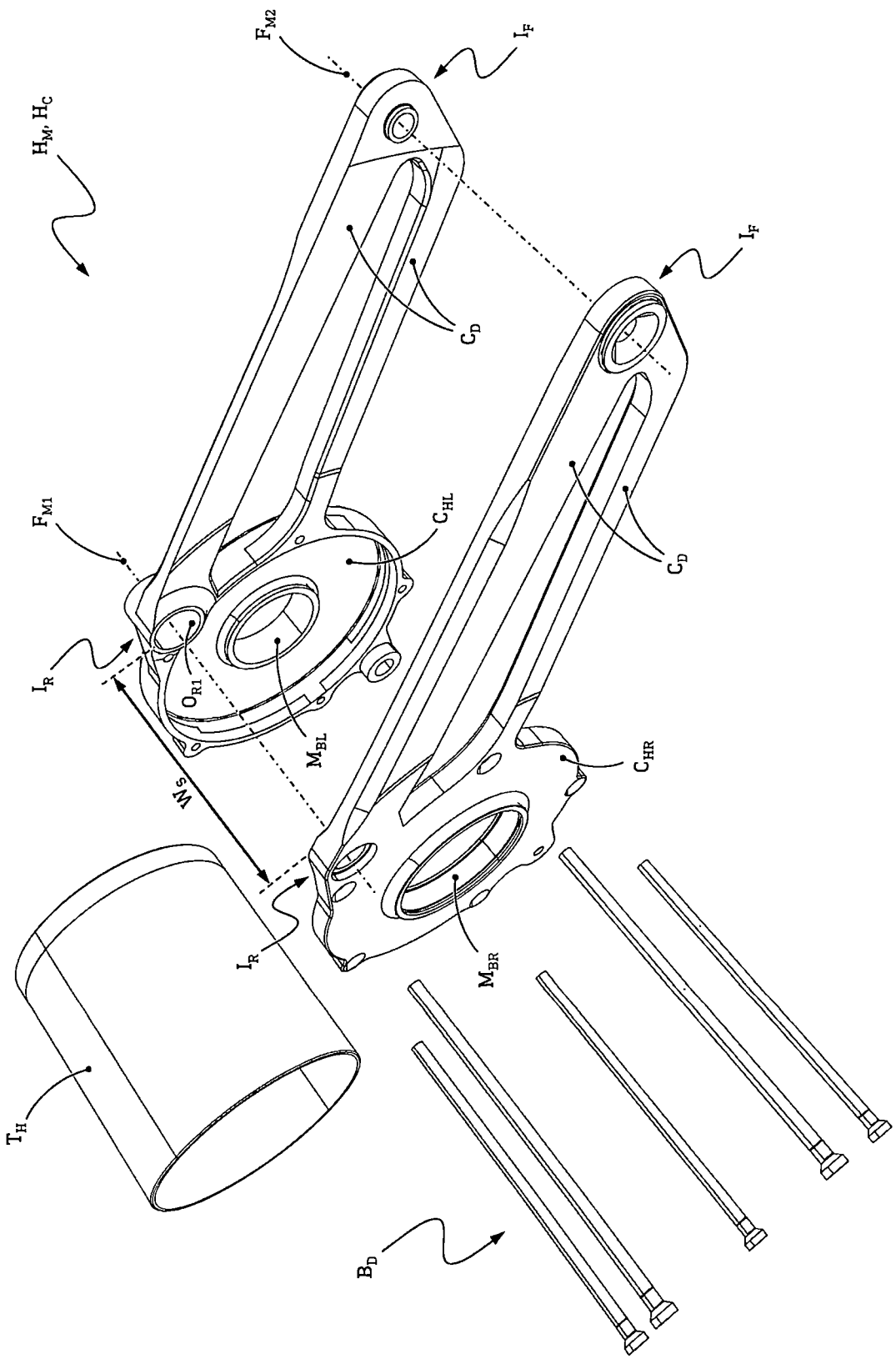
FIG. 28 shows the motor/gearbox housing of the Drive Unit according to FIGS. 17 to 27 in an exploded view.

The Drive Shield $S_D$ has a Drive Shield Latch $L_D$, which is designed as a bolt that can be easily removed with a conventional Allen key for easy opening of the Drive Shield $S_D$ (cf. FIGS. 22, 25, 27). In this way, the drive protection shield $S_D$ thus simultaneously forms essential parts of the battery compartment for receiving and holding the battery $S_i$.

In contrast to the embodiments shown in FIGS. 23 to 25 and 30, a drive protection shield $S_D$ can also be connected to the battery or formed integrally with part of the Battery Housing so that the battery itself also assumes the function of the drive protection shield $S_D$.

FIGS. 18 to 25 also show a Rear Swing Arm Pivot Mount $M_P$, which is present in the form of a Pivot Mount $M_P$ integrated in the Motor Housing $H_M$, in a Motor Device $M_E$ and Battery $S_i$ Common Drive Housing $H_C$, or, according to the embodiment considered here, in the Frame Interface Unit $I_U$, for pivotably mounting the sprung Rear Swing Arm 2 of the Bicycle Frame.

The Rear Swing Arm Pivot Mount $M_P$ can also be arranged or attached to the Bicycle Frame 1 similar to the prior art as shown in FIG. 1.

The bearing axis $P_S$ of the Rear Swing Arm $A_S$ (cf. FIGS. 11 to 24) runs through or very close to the main force application point $P_C$ of the Chain Traction Force $F_{TC}$ at the Chainring $R_C$ (cf. FIGS. 11 to 24) in order not to cause any undesired deflection movements of the Rear Swing Arm $A_S$ as a function of the Chain Traction Force $F_{TC}$.

In FIG. 17 to FIG. 25, $S_R$ designates a mount for a Spring/damper unit $D_S$ (cf. FIGS. 1 to 15 and 17) of the sprung Rear Swing Arm 2 of the Bicycle Frame.

The Saddle Tube $T_S$ (cf. FIGS. 1 to 15 and 17) of the Main Frame 1 is engaged in the first embodiment example according to FIGS. 17 to 29B by a Saddle Tube Lug $L_S$ (cf. FIGS. 17 to 25), which is formed integrally together with the Rear Shock Support $M_P$, the Rear Swing Arm Pivot Mount $S_R$ and a Down Tube Lug $L_L$ (cf. FIGS. 17 to 25), which engages in the Down Tube $T_L$ (cf. FIGS. 1 to 15 and 17) of the Main Frame 1.

In another embodiment, Saddle Tube $L_S$, Down Tube Lug $T_L$, Rear Swing Arm Pivot Mount $M_P$, Rear Shock Support Pivot Mount $S_R$, together with the Drive Unit Interface Units $I_{DR}$ and $I_{DF}$ form in one piece the Frame Interface Unit $I_U$, which is thus set up in particular to connect the Drive Unit $D_U$ to the Main Frame 1 and, if necessary, to the sprung Rear Swing Arm 2 (cf. FIGS. 16, 17 and 22).

As already explained above, the Drive Housing Cantilevers $C_D$ serve to define the sixth (Rotatory) Freedom of Movement $F_R$ (cf. FIG. 22) of the Drive Unit $D_U$ with respect to the Bicycle Frame 1 or with respect to the Frame Interface Unit $I_U$, by connecting the Drive Housing Cantilevers $C_D$ to the Front Drive Unit Interface $I_{DF}$ of the Frame Interface Unit $I_U$.

Since the connection of the Drive Housing Cantilever $C_D$ to the Front Drive Unit Interface Arrangement $I_{DF}$ of the Frame Interface Unit $I_U$, as also explained above in the discussion of the distribution of tasks of the two Frame Interface Arrangements $I_F$ and $I_R$, only has to transmit comparatively low forces and does not have to meet high accuracy requirements or tolerance requirements, it is sufficient that the connection between the Drive Housing Cantilever $C_D$ and the Front Drive Unit Interface Arrangement $I_{DF}$ is made by friction locking.

Friction Washers $W_F$ (cf. FIGS. 22 and 26) are used for this purpose in the first embodiment example according to FIGS. 17 to 29B, which are frictionally clamped between outer surfaces $O_S$ of the front Drive Housing Interface $I_{DF}$ and corresponding inner surfaces $I_S$ of the frame interfaces $I_F$ on the Drive Housing Cantilevers $C_D$ by the screw connection $C_F$ of the front Drive Housing Interface $I_{DF}$ with the Drive Unit $D_U$ (cf. FIGS. 22 and 26).

As already explained, the connection between the Drive Housing Cantilever $C_D$ and the front Drive Unit Interface Unit $I_{DF}$ of the Frame Interface Unit $I_U$ serves to rotationally fix the Drive Unit $D_U$ and to introduce torque starting from the Drive Unit $D_U$ into the Frame Interface Unit $I_U$ or into the Bicycle Frame.

In an embodiment, the connection between the Drive Housing Cantilever $C_D$ and the Front Frame Interface Arrangement $I_{DF}$ by means of frictional locking, (for example by means of bolting $C_F$ and Friction Washers $W_F$), does not place any high demands on the accuracy of the frame-side Front Frame Interface Arrangement $I_{DF}$ and the drive-side Frame Interface Arrangement $I_F$, i.e. in this case on the accuracy of the bores, shoulders and threads of the bolting $C_F$ in the radial direction, relative to the front mounting axis $F_{M2}$.

Also in the axial direction, relative to the front mounting axis $F_{M2}$, the connection between the Drive Housing Cantilevers $C_D$ and the front Drive Unit Interface Unit $I_{DF}$ of the Frame Interface Unit $I_U$, which is used as a torque arm to fixate the rotational degree of freedom $F_R$, places very few demands.

In particular, the Drive Housing Cantilevers $C_D$ can be designed so that, in the force-free, non-assembled state of the Drive Unit $D_U$, they have a distance that is slightly too large compared to the Interface Surfaces or Interface Planes $P_{iF}$ of the front Drive Unit Interface $I_{DF}$. When the Drive Unit $D_U$ is mounted, the Drive Housing Cantilevers $C_D$ are then elastically deformed slightly inwards by the force of the screw connection $C_F$, allowing any spacing tolerances of the Interface Planes $P_{iF}$ of the front Drive Unit Interface arrangement $I_{DF}$ to be generously and easily compensated.

In contrast, the Drive Unit $D_U$ is dimensionally fixed relative to the Frame Interface Unit $I_U$ or relative to the Main Frame 1 in all three spatial directions and the forces corresponding to these spatial directions are transmitted practically exclusively by the connection between the rear Drive Unit Interface $I_{DR}$ and Drive Unit $D_U$, which is positive in all three spatial directions (cf. FIGS. 22, 26 and 27).

In contrast, the connection between the Drive Housing Cantilever $C_D$ and the Front Drive Unit Interface Arrangement $I_{DF}$ is subject to only minor requirements in terms of accuracy and tolerances, which also reduces the manufacturing effort and costs for the Frame Interface Unit $I_U$.

FIG. 22 shows, in particular in conjunction with FIG. 28, that the Motor Housing $H_M$, which here simultaneously forms the Common Drive Housing $H_C$ for Motor $M_E$ and Battery $S_L$, is composed of only three individual parts, namely two Housing Lids $C_{HL}$, $C_{HR}$ and an essentially or entirely prismatic Housing Tube $T_H$, wherein the Housing Lids $C_H$ together with the Housing Tube $T_H$ can be connected to the Motor Housing $H_M$ by means of a plurality of Motor Housing Screws $B_D$.

As shown in particular in FIG. 28, the Housing Lids $C_{HL}$, $C_{HR}$ each integrally include one of the Drive Housing Cantilevers $C_D$, and have bearing mounts $M_{BR}$, $M_{BL}$, in which a bearing $B_L$ for the Bottom Bracket Shaft $S_B$, on the left-hand side, and a bearing $B_R$ for a Motor Output Hollow Shaft $S_{HM}$, on the right-hand side, can be accommodated (cf. FIGS. 29C and 27).

Figure 31:
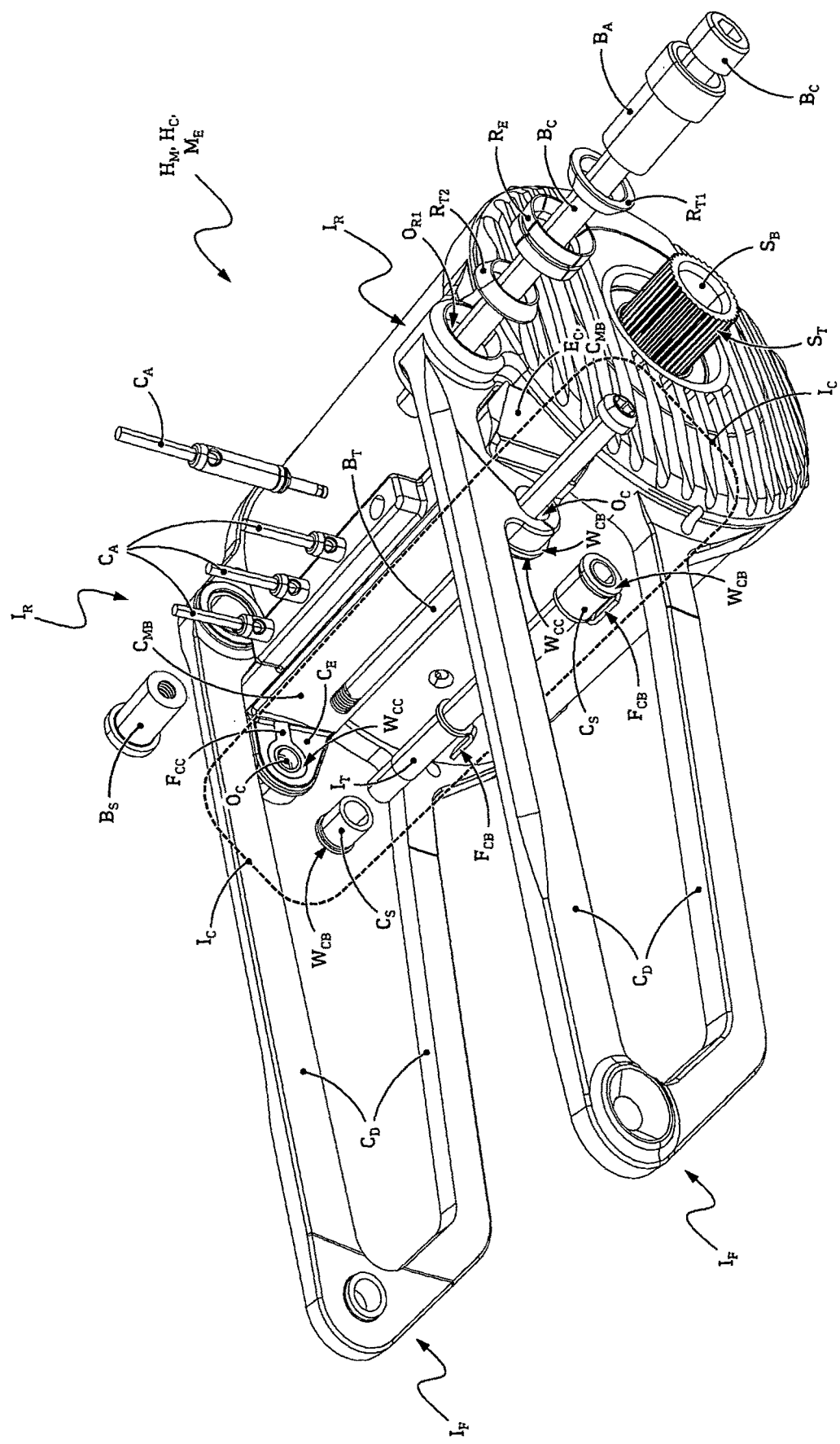
FIG. 31 shows the Drive Unit according to the second embodiment example shown in FIGS. 29C to 30 without battery and in a partial exploded view.

In the sectional view of FIG. 27, Crank Adapters $A_C$ can also be seen, which connect a Wavy Serration $S_T$, visible in FIGS. 30, 31 and 34 and arranged on the Bottom Bracket Shaft, with a Wavy Serration $S_W$ (cf. the form-corresponding Wavy Serration $S_W$ on the outer diameter of the Crank Adapter as visible in FIGS. 22, 29C and 34) arranged in the Pedal Crank $C_P$ in a rotationally positive manner.

The Crank Adapter $A_C$ is advantageous in two respects. On the one hand, it enables a simpler assembly concept for the Motor Device $M_E$, in particular an assembly concept for a reduction gearbox (not shown in the figures) of the Motor Device $M_E$ arranged on the right-hand side for an electric motor arranged on the left-hand side (also not shown). In the assembly concept, the Bottom Bracket Shaft $S_B$ in particular can be assembled more easily with other components of the Motor Device $M_E$, in particular with components of the reduction gear, without the attached Crank Adapter $A_C$, since the Bottom Bracket Shaft $S_B$ has a smaller diameter without the attached Crank Adapter $A_C$.

Another advantage of the Crank Adapter $A_C$ is the positive connection between the pedal cranks $C_C$ and the Bottom Bracket Shaft $S_B$, which is free of play in both directions of rotation.

In other applications in transmission technology, serrations $S_W$ usually only have to transmit a nominal torque backlash-free in one direction. On bicycles, on the other hand, it is necessary to transmit high torques between the pedal cranks $C_P$ and the Bottom Bracket Shaft $S_B$ without backlash in both directions of rotation. For example, the rider of a bicycle can stand with his entire body weight on the pedals, as a result of which high torques with opposite directions of rotation act in each case from the pedal cranks $C_P$ on the Bottom Bracket Shaft $S_B$. If the torques were not transmitted backlash-free from the splines $S_W$ of the pedal cranks $C_P$ to the Bottom Bracket Shaft $S_B$, this would lead to undesirable jerky rotational movements between the pedal cranks $C_P$ and the Bottom Bracket Shaft $S_B$ and to corresponding clicking noises. In addition, the connection between the pedal cranks $C_P$ and the Bottom Bracket Shaft $S_B$ would become damaged or loose over time, which would also lead to the risk of accidents.

For this reason, serrations $S_W$ between pedal cranks $C_P$ and Bottom Bracket Shaft $S_B$ on the bicycle must be tapered in addition to the torque-transmitting gearing in order to be able to press the pedal cranks $C_P$ axially onto the Bottom Bracket Shaft $S_B$ and thereby create a backlash-free connection between the pedal cranks $C_P$ and the Bottom Bracket Shaft $S_B$. Only in this way can the torque applied by the rider in both directions be transmitted backlash-free in both directions of rotation.

In particular, if the Pedal Crank Adapter $A_C$ is made of a ductile material and/or is thin-walled, pressing the Pedal Crank $C_P$ axially onto the Bottom Bracket Shaft $S_B$ results in radial compression of the Crank Adapter $A_C$ onto the Shaft Toothing $S_T$ (cf. FIGS. 30, 31 and 34). This also creates the desired positive connection between the Shaft Toothing $S_T$ and the Crank Adapter $A_C$, which is fixed without play in both directions of rotation, even if the Shaft Toothing $S_T$ is not conical but prismatic, as shown in FIGS. 30, 31 and 34. The prismatic design of the Shaft Toothing $S_T$ also saves costs in the manufacture of the Bottom Bracket Shaft $S_B$ compared with a conical design of the Shaft Toothing $S_T$ otherwise required without the Crank Adapter $A_C$.

The Frame Interfaces $I_R$, $I_F$ arranged on the Drive Unit $D_U$ as shape-corresponding counterparts to the Drive Unit Interface arrangements $I_{DR}$, $I_{DF}$ of the Frame Interface Unit $I_U$ are located on the housing covers $C_H$ of the Drive Unit $D_U$, as shown in particular in FIGS. 22, 28, 31 and 34 The Frame Interfaces $I_R$, $I_F$ are formed integrally with the housing covers $C_H$.

In this way, among other things, a desirably maximum Support Width $W_S$ of the connection between the Frame Interfaces $I_R$, $I_F$ of the Drive Unit $D_U$ and the Main Frame 1 or the Frame Interface Unit $I_U$ is achieved (cf. FIGS. 26 to 28), which improves the rigidity of the connection between the Bicycle Frame and the Drive Unit $D_U$ as well as the direct power flow.

The Drive Unit $D_U$ can also be designed asymmetrically (not shown) with respect to its essential dimensions in the transverse direction (along the axis of the Bottom Bracket Shaft $S_B$) with respect to a Frame Center Plane $P_{FC}$ (cf. FIG. 27). In particular, significant dimensions in the transverse direction can be larger on the left-hand side than corresponding dimensions on the right-hand side. This makes it possible, in particular, to guide the possibly very high Chain Traction Forces $F_{TC}$ with minimum Chain Traction Horizontal Distance $D_{PH}$ to the right-hand side Interface Plane $P_{iR}$ of the associated Rear Frame Interface Arrangement $I_R$. This minimizes the torques generated by the Chain Traction Forces $F_{TC}$ and thus the twisting of the Drive Unit $D_U$, the Frame Interface Unit $I_U$ and the Main Frame 1.

Due to the one-piece arrangement of the Frame Interface Units $I_R$, $I_F$ in the Housing Covers $C_H$, weight or Drive Forces $F_{PE}$ on the Bottom Bracket Shaft $S_B$ as well as Chain Traction Forces $F_{TC}$ are transmitted directly via the Bearings $B_L$, $B_R$ arranged in the Housing Covers $C_H$ into the Housing Covers $C_H$, and from there via the Frame Interface Units $I_R$, $I_F$ and the Drive Unit Interface Arrangements $I_{DR}$, $I_{DF}$ into the Frame Interface Unit $I_U$ and thus into the Bicycle Frame.

As a result, the central Housing Tube $T_H$ hardly has to transmit any load and can be optimized with regard to other aspects, for example in terms of material selection and manufacturing options. Due to the completely prismatic shape of the Housing Tube $T_H$, it is also easy and inexpensive to manufacture, for example by turning or extruding an aluminum tube.

The Housing Tube $T_H$ can also be optimized in terms of maximum thermal conductivity combined with low weight by selecting an aluminum alloy such as AL6060 for the Housing Tube $T_H$, which has far better thermal conductivity than the magnesium frequently used in the prior art.

Alternatively, the housing covers $C_H$ can also be arranged on the Bicycle Frame 1, in particular formed integrally with the Bicycle Frame 1. An embodiment is also provided in which one of the housing covers (e.g., the housing cover $C_{HR}$ arranged on the drive side, i.e. on the right-hand side in relation to the rider) is arranged on the Bicycle Frame and is formed in one piece with the Bicycle Frame, while the other housing cover $C_{HL}$ on the left-hand side is formed as a separate component that can be separated from the Housing Tube $T_H$. This provides easy access to the Motor Housing $H_M$, which is thus at least partially integral with the Main Frame 1, for example for maintenance purposes.

The Motor Output Hollow Shaft $S_{HM}$ (not shown in the figures of the first embodiment according to FIGS. 17 to 29B, but visible in FIG. 29C of the second embodiment according to FIGS. 29C to 34), which is also present in similar form in the first embodiment, has External Toothing $T_E$, which is set up for engagement in a correspondingly shaped Internal Toothing $T_i$ of a Chainring Spider $S_C$ (cf. FIG. 22). The torque interface formed by the Internal Toothing $T_i$ and the External Toothing $T_E$ transmits the sum torque formed by the driver torque and the engine torque from the Drive Unit $D_U$ to the Drive Train 3 (see FIG. 1).

The Internal Toothing $T_i$ can also be arranged directly in a Chainring $R_C$ (omitting the Chainring Spider $S_C$). In another embodiment there is a Chainring Spider $S_C$ on which optionally sprockets $R_C$ with, for example, different numbers of teeth or different Chain Line $L_C$ can be mounted (cf. FIGS. 26 and 22).

In another embodiment, positions of the Frame Interface Units $I_R$, $I_F$ and Drive Unit Interface Units $I_{DR}$, $I_{DF}$ relative to the Drive Unit $D_U$ and relative to the Frame Interface Unit $I_U$, respectively, are described below (see FIGS. 17 to 19 and FIGS. 22 to 26).

As can be seen in particular from FIG. 18, all frame interface arrangements $I_R$, $I_F$ or Drive Unit Interface arrangements $I_{DR}$, $I_{DF}$ and thus the two attachment axes $F_{M1}$, $F_{M2}$ as interfaces between Drive Unit $D_U$ and Main Frame 1 or between Drive Unit $D_U$ and Frame Interface Unit $I_U$ are located in a vertical region above an imaginary horizontal plane $P_{HB}$, which contains the axis of rotation of the Bottom Bracket Shaft $S_B$, and below a horizontal plane $P_{HC}$, which contains the point of engagement $P_C$ of the Chain Traction Force $F_{TC}$.

To minimize torques generated by the Chain Traction Force $F_{TC}$ and corresponding loads or deformations of Drive Unit $D_U$, Frame Interface Unit $I_U$ or Main Frame 1, the vertical distance $D_{PV}$ between the rear attachment axis $F_{M1}$ and the point of application $P_C$ of the Chain Traction Force $F_{TC}$ is as small as possible, in an embodiment less than 30 mm, an in yet another embodiment less than 21 mm.

Also in another embodiment, the two mounting axes $F_{M1}$, $F_{M2}$ lie further forward than an imaginary vertical plane $P_{VB}$, which contains the axis of rotation of the Bottom Bracket Shaft $S_B$, more than 15 mm further forward than the imaginary vertical plane $P_{VB}$.

In another embodiment, the two mounting axes $F_{M1}$, $F_{M2}$ lie in front of an imaginary Inclined Plane $I_P$, which contains the axis of rotation of the Bottom Bracket Shaft $S_B$, wherein the Inclined Plane $I_P$ is tilted forward by an angle $\beta$ of 50° relative to a horizontal plane, in other words tilted clockwise, with respect to a view from the right as depicted, for example, in FIGS. 17 and 18.

In a in another embodiment, a combination of the three aforementioned embodiments, the two fastening axes $F_{M1}$, $F_{M2}$ are located in a vertical region between the two horizontal planes $P_{HB}$ and $PH_C$, in front of the vertical plane $P_{VB}$, and in front of the inclined plane $I_P$.

In another embodiment, the two mounting axes $F_{M1}$, $F_{M2}$ lie within an angle $\alpha$ of 30° to 80° located in the top right Bottom Bracket Quadrant $Q_{B1}$, in yet another embodiment within an angle $\alpha$ of 50° to 60°, the vertex of the angle coinciding with the axis of rotation of the Bottom Bracket Shaft $S_B$ (cf. FIGS. 18 and 19).

Furthermore, a combination of the above-mentioned embodiments in which the two fastening axes $F_{M1}$, $F_{M2}$ lie in a vertical region between the two horizontal planes $P_{HB}$ and $P_{HC}$ and in front of the vertical plane $P_{VB}$, furthermore in front of the inclined plane $I_P$, and within an angle $\alpha$ of 30° to 80°, an in another embodiment within an angle $\alpha$ of 50° to 60°.

This provides more space for rear suspension assemblies such as swingarm bearings and shock linkage, since the Main Frame 1 no longer has to extend relatively far behind the bottom bracket, as in the state of the art, and in some cases even below the bottom bracket height. This also reduces complexity, weight and costs, and gives the frame manufacturer considerably more design freedom in the functionally very important area directly behind the bottom bracket.

Furthermore, at least in the area of the mounting axes, the above-described designs also improve the possibilities for cooling the electrical and electronic components of the Drive Unit since the Drive Unit is not enclosed by the frame. This is playing an increasingly important role in view of the current trend toward ever smaller sizes for these components, coupled with a simultaneous upward trend in engine output.

With regard to the lateral positioning of the Frame Interfaces, the Interface Planes $P_{iR}$ between the Rear Frame Interface Arrangements $I_R$ of the Drive Unit $D_U$ and the associated, Rear Drive Unit Interface Arrangements $I_{DR}$ of the frame and/or of the Frame Interface Unit $I_U$ are positioned on the left and right outboard side of the Main Frame 1 with a view to optimum torque and force transmission from the Drive Unit $D_U$ to the Main Frame 1 and with a view to high rigidity of the Drive Unit $D_U$, resulting in a correspondingly advantageously large Support Width $W_S$ (cf. FIGS. 22, 26 and 27).

In this context, a Support Factor $F_S$ can be formed as a quotient of the Support Width $W_S$ and a Pedal Force Effective Width $W_{PE}$, which corresponds to the horizontal distance between the effective pedal force application points on the connection surfaces between the pedal crank and Bottom Bracket Shaft (cf. FIG. 27). The Support Factor $F_S$ is greater than 0.5, in another embodiment greater than 0.55 and in yet another embodiment greater than 0.6.

Alternatively or in addition to the values of the Support Factor $F_S$, the Support Width $W_S$ is selected such that a Chain Pull Factor $F_{PC}$ formed as a quotient of the Support Width $W_S$ and a Chain Pull Horizontal Distance $D_{PH}$ between the Chain Pull Attack Point $F_{TC}$ and the right-hand Interface Plane $P_{iR}$ is greater than 5, in another embodiment greater than 5.5 and in yet another embodiment greater than 6.

This ensures optimum transmission of the lateral forces acting on the Drive Unit $D_U$, in particular the pedal forces $F_{PE}$, and also the Chain Traction Forces $F_{TC}$, by the shortest possible route into the Bicycle Frame. This also gives the structures of the Drive Unit $D_U$ and the Main Frame 1 or the Frame Interface Unit $I_U$ involved in this power transmission a particularly high rigidity with low weight, which counteracts undesirable twisting and associated power losses during operation of the Drive Unit $D_U$.

In prior art Drive Units, however, values for the Support Factor $F_S$ are usually well below 0.4, and values for the Chain Pull Factor $F_{PC}$ are usually well below 3.

In the prior art, this results in high bending moments due to the effect of the pedal forces $F_{PE}$ and the Chain Traction Forces $F_{TC}$, which either lead to correspondingly large deformations of the Drive Unit $D_U$ or the Bicycle Frame 1 in the Bottom Bracket Area, or must be absorbed and compensated for with large wall thicknesses in these areas, which leads to correspondingly high weights of the Drive Unit $D_U$ and frame.

If the Drive Unit $D_U$ is formed asymmetrically with respect to its essential dimensions in the transverse direction (along the axis of the Bottom Bracket Shaft $S_B$) with respect to a Frame Center Plane $P_{FC}$, as described above with reference to FIG. 27, then alternatively or in addition to a Chain Pull Factor $F_{PC}$ formed as a quotient of a Support Width $W_S$ and a Chain Pull Horizontal Distance $D_{PH}$, a Chain Pull Factor $F'_{PC}$ can be formed as a quotient of a right-hand Support Distance W's (see FIG. 27) and the Chain Pull Horizontal Distance $D_{PH}$. According to the present disclosure, this Chain Pull Factor $F'_{PC}$ is greater than 2.5, in another embodiment greater than 2.75 and in yet another embodiment greater than 3.

FIGS. 29C to 34 show a modified and structurally refined second embodiment example compared to the first embodiment example according to FIGS. 17 to 29B. Some essential differences between the first embodiment example according to FIGS. 17 to 29B and the second embodiment example according to FIGS. 29C to 34 can be seen from a synopsis of FIGS. 29A to 29D.

Firstly, it can be seen there in particular that the Motor and/or Battery Controller $C_{MB}$, which in the first embodiment example according to FIGS. 17 to 29B is essentially only shown schematically, is shown in greater detail in the second embodiment example according to FIGS. 29C to 34, there specifically as Motor Controller $C_M$.

Thus, the Motor Controller $C_M$ of the second embodiment provides, among other things, a number of Auxiliary Connections $C_A$ to which further power consumers can be connected. Examples of power consumers include, but are not limited to, bicycle lighting, an electric Rear Derailleur 4 according to FIG. 1, an electrically controlled height-adjustable Seat Post 8 according to FIG. 1, or electrically or electronically controlled Spring/Damper elements for a Front Suspension Fork and/or for a Suspended Rear Frame 2, $D_S$ known in the market, for example, under the trademark FLIGHT ATTENDANT® (cf. FIG. 1).

One or more of the Auxiliary Connections $C_A$ can also be used, for example, to provide the power supply for a Man-Machine Interface or Operating Interface $H_{Mi}$, which is set up to control the various electrical or electronic systems of the bicycle. Charging sockets for operating or charging auxiliary devices such as smartphones can also be arranged at the Operating Interface $H_{Mi}$ or elsewhere on the bicycle, for example in the area of an Upper Tube $T_U$ of the Bicycle Frame, the power supply for which can also be implemented via one of the Auxiliary Connections $C_A$.

In an embodiment, the Auxiliary Connections $C_A$ only serve to supply power to additional devices, such as those mentioned above, while data exchange between the Motor Controller $C_M$ and the additional devices, or data exchange between different additional devices, in particular for the purpose of controlling additional devices or the Motor Controller $C_M$, takes place by means of a wireless communication protocol, for example via Bluetooth.

In FIG. 29D (as well as in FIG. 30) it can be seen that the Battery Housing $H_B$ in this embodiment includes a Housing Middle Portion $P_M$ and two Housing Cover Plates $C_H$. The Housing Middle Portion $P_M$, which is designed similarly to the sectional views of FIGS. 23 and 24 for receiving and fixing the battery cells $C_C$, is closed on both sides with Housing Cover Plates $C_H$, which are screwed to the Housing Middle Portion $P_M$ in order to facilitate repairs or the replacement of used or defective battery cells. The screws for connecting the Housing Cover Plates $C_H$ to the Housing Middle Portion $P_M$ are not shown in FIGS. 29C and 30.

As a further significant difference between the first embodiment example according to FIGS. 17 to 29B and the second embodiment example according to FIGS. 29C to 34, one can recognize in FIGS. 29C and 29D a substantially axially formed or arranged Current Interface $I_C$, which includes a controller-side Current Interface Assembly $I_{CC}$ and a battery-side Current Interface Assembly $I_{CB}$.

The Current Interface $I_C$ can be set up for additional mechanical fixing of the battery $S_i$ in its ready-to-operate swiveled-in position similar to FIG. 23. In particular, however, the Current Interface $I_C$ is used for current-transmitting contact and connection between the battery $S_i$ and the Motor Controller $C_M$, which in turn transmits the drive energy drawn from the battery $S_i$ as traction current to the motor $M_E$.

In the prior art, for which FIG. 1 gives an example, the battery $S_i$ is usually connected to the Motor Controller $C_M$ or to a combined controller $C_{MB}$ for motor and/or battery by means of a plug connection. Such plug connections, known from the prior art, usually have multiple poles and are designed to transmit both driving currents in the direction of the controller and motor and charging currents in the direction of the battery, and also to transmit control signals between the controller and battery or between any separate charger, charging connection or charging controller and battery.

Such known plug connections are electrically and mechanically complex and therefore cause relatively high costs in production and assembly on the one hand. Furthermore, such plug connections are often the cause of malfunctions or failures, for example due to contamination or improper handling when removing or reinserting the battery $S_i$.

As explained above and in the description of FIGS. 23 and 24, the transmission of control signals between controller $C_{MB}$ and battery $S_i$ in the electric bicycle Drive Unit $D_U$ according to the present disclosure is carried out by means of a wireless transmission protocol. In this way, there is no need to provide a multi-pole plug connection between controller $C_{MB}$ and battery $S_i$ including various control lines. In an example embodiment the controller $C_{MB}$ and the integrated energy device $S_I$ or auxiliary energy device $S_A$ include wireless transceivers configured to communicate using one or more transmission protocols. Examples of wireless transceivers include, but are not limited to, BLUETOOTH® transceivers, WiFi transceivers (e.g., 802.11b, etc.), or proprietary wireless protocols.

With this in mind, the Current Interface $I_C$ is of two-pole design and, in another embodiment, does not include a plug connection.

The operation of such an embodiment of the Current Interface $I_C$ can be seen in a synopsis of FIGS. 30 and 31. It can be seen that the Current Interface $I_C$, which is here again composed of Controller-side Current Interface Assembly $I_{CC}$ and Battery-side Current Interface Assembly $I_{CB}$, includes a Threaded bolt $B_T$, which—in addition to enclosing the battery $S_i$ between the Drive Shield $S_D$ and the housing $H_C$—is set up both to mechanically secure the battery $S_i$ to the Drive Housing Cantilevers $C_D$ and to establish an electrical contact connection between the battery $S_i$ and the controller $C_{MB}$.

To establish this electrical contact connection, Metal Contact Washers $W_{CB}$ are arranged on the battery $S_i$ both on the left side (according to FIG. 30) and on the right side (hidden in FIG. 30, but visible in FIG. 32C), each of the two Metal Contact Washers $W_{CB}$ being connected to one of the two voltage poles of the battery. The contact surfaces of both the contact disks $W_{CB}$ and the contact disks $W_{CC}$ run in Interface Planes $P_i$, which are arranged parallel to the Removal Direction of the battery $S_i$, cf. FIG. 32C.

Corresponding Metal Contact Washers $W_{CC}$ are arranged on the right side (according to FIG. 30) as well as on the left side (hidden in FIG. 30, but visible in FIG. 32C) on inner sides of protrusions $C_E$ of the Controller $C_{MB}$, each of the two Metal Contact Washers $W_{CC}$ being connected to corresponding voltage poles of the Controller.

Figure 32A:
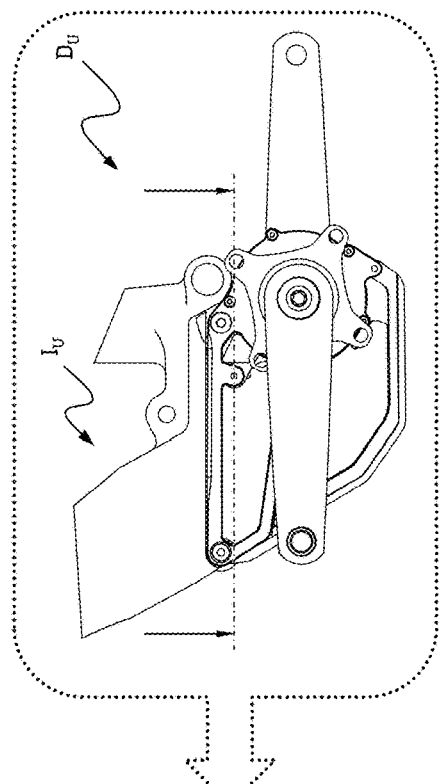
FIG. 32A-C shows a Current Interface for transmitting current between the Battery and the Motor Controller in the Drive Unit according to the second embodiment of FIGS. 29C to 31.
Figure 32C:
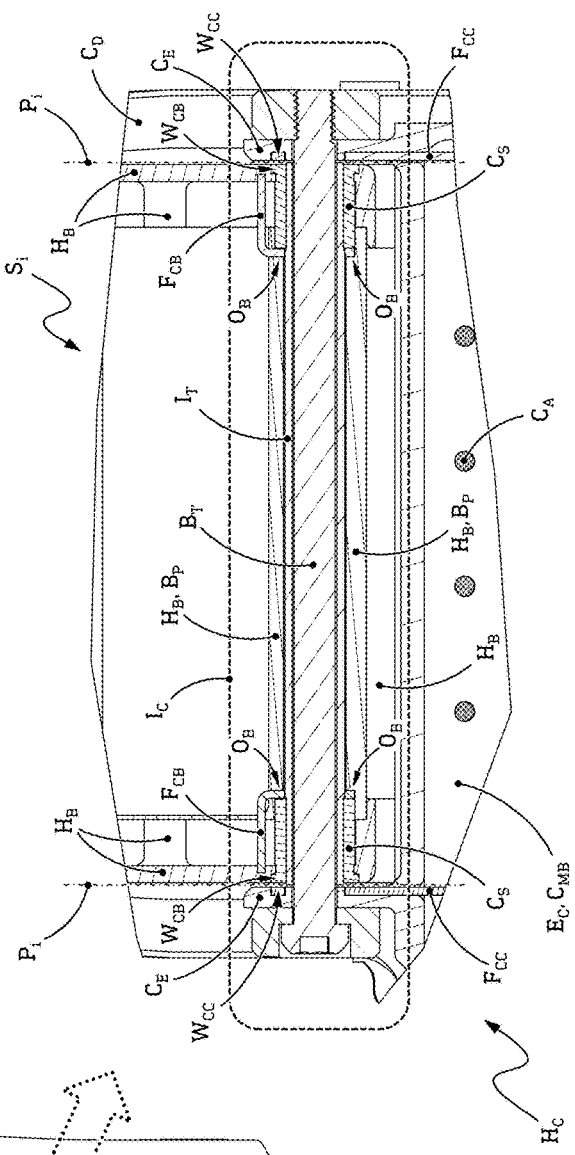

When the battery $S_i$ is inserted counter to the Removal Direction $D_R$ in FIG. 30 and when the battery $S_i$ is then swiveled in counterclockwise in the illustration of FIG. 30, the Metal Contact Washers $W_{CB}$ of the battery $S_i$ overlap with the corresponding Metal Contact Washers $W_{CC}$ of the controller $C_{MB}$, which can be seen particularly clearly in FIG. 32C.

If the Threaded bolt $B_T$ is then guided through the battery through the associated Clamp Openings $O_C$ and, in the case of $B_P$, through the battery as shown in FIGS. 30 and 32C and tightened, the Metal Contact Washers $W_{CC}$ of the controller $C_{MB}$ are placed on the Metal Contact Washers $W_{CB}$ of the battery $S_i$ due to slight elastic deformation of the Drive Housing Cantilever $C_D$ by the screw force of the Threaded bolt $B_T$, and are pressed firmly onto one another due to the screw force of the Threaded bolt $B_T$.

The structure of the Current Interface $I_C$ can be seen particularly clearly in FIG. 31. The Threaded bolt $B_T$ and Metal Contact Washers $W_{CB}$, $W_{CC}$ of battery $S_i$ and controller $C_{MB}$ can be seen again, which are brought into alignment with each other and pressed against each other when the battery $S_i$ is swiveled in and the Threaded bolt $B_T$ is subsequently tightened, as described above.

In the illustrated embodiment of the Current Interface $I_C$, the Contact Washers $W_{CB}$ assigned to the battery $S_i$ are formed by outer end faces of Metal Contact Sleeves $C_S$, while the Contact Washers $W_{CC}$ assigned to the controller $C_{MB}$ each have an integrally formed Contact Flap $F_{CC}$. Thus the Contact Flaps $W_{CC}$ together with the Contact Flaps $F_{CC}$ form a two-pole electrical current connection from the disc-shaped elements $W_{CC}$ into the housing of the controller $C_{MB}$.

In the illustrated embodiment of the Current Interface $I_C$, the contact washers $W_{CB}$ associated with the battery $S_i$ are formed by End Faces of conductive Contact Sleeves $C_S$, which are pressed onto Contact Flaps $F_{CB}$, also by the contact pressure of the Threaded bolt $B_T$. The Contact Flaps $F_{CB}$ form a two-pole electrical connection from the conductive Contact Sleeves $C_S$ into the housing of the battery $S_i$, see also FIG. 32C.

Figure 32B:
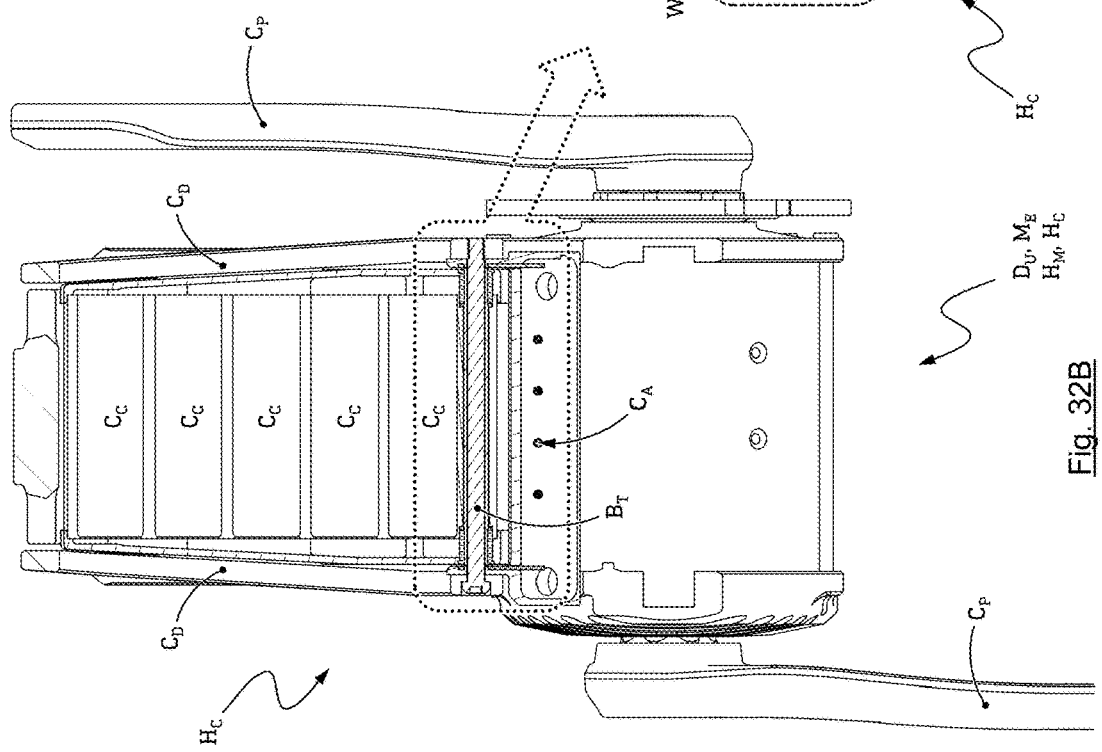

FIG. 32C shows a longitudinal section through the Current Interface $I_C$ according to FIGS. 29C to 31, where the sectional course of the longitudinal section shown in FIG. 32C can be derived from FIGS. 32A and 32B.

Firstly, the Common Drive Housing $H_C$ with its Drive Housing Cantilevers $C_D$, which are only shown in sections or partially cut away, and the controller $C_{MB}$ and battery $S_i$ with Battery Housing $H_B$, which are also only shown in sections and partially cut away, can be seen.

The Current Interface $I_C$ includes Threaded bolts $B_T$, Battery-side Contact Flaps $F_{CB}$, Contact Sleeves $C_S$ and Contact Washers $W_{CB}$ as well as Controller-side Contact Washers $W_{CC}$ and Contact Flaps $F_{CC}$. In the illustration of FIG. 32C, the Threaded bolt $B_T$ has not yet been tightened, so that the Drive Housing Cantilevers $C_D$ together with the projections $C_E$ of the Controller $C_{MB}$ that are flush therewith on the inside are not yet bent inward by the screw force of the Threaded bolt $B_T$, see the air gap at $P_i$ between the outer surfaces of the Battery Housing $H_B$ resp. the end Face contact surfaces of the Contact Washers $W_{CB}$ of the Contact Sleeves $C_S$ flush therewith and the inner surfaces of the projections $C_E$ of the Controller $C_{MB}$ and the Contact Washers $W_{CC}$ and Contact Flaps $F_{CC}$ flush therewith on the Controller side.

When the Threaded bolt $B_T$ is tightened, the Drive Housing Cantilevers $C_D$ together with the projections $C_E$ of the Controller $C_{MB}$ resting against them on the inside are bent slightly inward by the screw force of the Threaded bolt $B_T$, pressing the battery-side contact washers $W_{CB}$ and the controller-side contact washers $W_{CC}$ firmly against each other.

At the same time, the Contact Sleeves $C_S$ on the battery side and the Contact Flaps $F_{CB}$ (cf. FIG. 31) on the battery side are pressed against each other, whereby the annular areas of the Contact Flaps $F_{CC}$ (cf. FIG. 31) come to rest on Bore Offsets $O_B$ of the present cylindrical Permeation Bore $B_P$ of the Battery Housing $S_i$, in which the Threaded bolt $B_T$ penetrates the Battery Housing transversely (cf. FIG. 30).

In this way, a reliable, two-pole electrical connection with high current-carrying capacity is established between battery $S_i$ and controller $C_{MB}$ via the contact path $F_{CB} \rightarrow C_S \rightarrow W_{CB} \rightarrow W_{CC} \rightarrow F_{CC}$ without the need for technically complex, expensive and also damage-prone plug connections according to the state of the art. For example, the left-hand contact elements $F_{CB}$, $C_S$, $W_{CB}$, $W_{CC}$ and $F_{CC}$ are assigned to the positive pole of the power supply by the battery $S_i$, and the right-hand contact elements $F_{CB}$, $C_S$, $W_{CB}$, $W_{CC}$ and $F_{CC}$ to the negative pole. Reverse assignment of positive pole and negative pole is also possible without further ado.

In order to electrically insulate the left-hand and right-hand contact elements $F_{CB}$, $C_S$, $W_{CB}$, $W_{CC}$ and $F_{CC}$ associated with the two electrical poles from one another, the embodiment of the Current Interface $I_C$ according to FIGS. 29C to 32C has an Insulating Tube $I_T$ made of non-conductive material arranged coaxially with the Threaded bolt $B_T$ in the Permeation Bore $B_P$ of the Battery Housing $H_B$ arranged on the Threaded bolt $B_T$, as can be seen from a synopsis of FIG. 32C with FIG. 31.

The Insulating Tube $I_T$ is used to electrically insulate the left-hand contact elements, i.e. the electrically conductive Contact Sleeves $C_S$ with the Contact Washers $W_{CB}$ arranged thereon (here in one piece), as well as the Contact Flaps $F_{CB}$ with respect to the Threaded bolt $B_T$, from the corresponding right-hand contact elements $C_S$, $W_{CB}$ and $F_{CB}$.

In another embodiment, a charging port (not shown in the figures) is also arranged on the housing $E_C$ of the controller $C_{MB}$ for connecting an external or internal charger with respect to the Drive Unit $D_U$ to the power supply. A further function of the housing $E_C$ of the controller $C_{MB}$ can be to connect electrical or electronic assemblies of the Drive Unit $D_U$, which are arranged in the area of different sides of the Drive Unit $D_U$, to one another without requiring power lines for this purpose, in particular within or across the Motor Device $M_E$.

For example, a torque sensor device of the Drive Unit $D_U$ can be arranged in a right-hand area of the Drive Unit $D_U$ in the vicinity of the torque connection to the Chainring $R_C$, while at least parts of the Motor Controller $C_{MB}$, in particular parts of the power electronics, can be arranged in a left-hand area of the Drive Unit in the vicinity of the electric motor. In such cases, the housing $E_C$ of the controller $C_{MB}$ offers the possibility of connecting, for example, the torque sensor device to the power electronics or to their drive circuitry through the housing $E_C$ without having to route lines either through the motor device or, largely unprotected, outside the motor device. In particular, the latter is common in the prior art.

It is also possible and intended to arrange only certain parts of the power electronics for operating the electric motor, in particular the relatively voluminous capacitors of an electronic motor commutation in the housing $E_C$ of the controller $C_{MB}$, while other parts of the power electronics, in particular the power transistors, are arranged in the Motor Housing $H_M$, for example on an inner side in particular of the left-hand housing cover $C_{HL}$. The latter enables optimum cooling of the power transistors in particular if the corresponding housing cover $C_{HL}$ is provided with cooling fins on the outside (cf. FIGS. 30, 31 and 34).

FIG. 33C shows a longitudinal section through a left Rear Frame Interface Arrangement $I_R$ and through the associated left Rear Drive Unit Interface Arrangement $I_{DR}$ of the Frame Interface Unit $I_U$ with a Frame Offset Adapter $A_O$ arranged there for variable backlash-free adjustment of the clamping in the axial direction between Motor Housing $H_M$ or Frame Interface Arrangement $I_R$ and Drive Unit Interface Arrangement $I_{DR}$. The sectional course of the longitudinal section shown in FIG. 33C can be derived from FIGS. 33A and 33B.

In the first embodiment example according to FIGS. 17 to 29B, the Frame Offset Adapter $A_O$ was designed as a stop sleeve adjustable in axial direction by means of a thread, cf. FIGS. 22, 26 and 27 and the associated description above. By screwing in the compensation adapter $A_O$ to different depths, width or distance tolerances with regard to the Support Width $W_S$ (cf. also FIG. 28) of the Bicycle Frame or the Frame Interface Unit $I_U$, respectively, and the Motor Housing $H_M$ can be compensated.

In contrast, the Compensation Adapter $A_O$ of the second embodiment example according to FIGS. 29C to 34 does not require active manual compensation of the tolerances with respect to the Support Width $W_S$. As can be seen from a synopsis of FIG. 33C with FIG. 31, the Compensation Adapter $A_O$ of the second embodiment example according to FIGS. 29C to 34 includes two Thrust Rings $R_{T1}$, $R_{T2}$, which taper in a wedge shape at their outer circumference, an Expansion Ring $R_E$, which is divided into several segments along its circumferential direction, and an Alignment Bushing $B_A$.

When mounting the Drive Unit $D_U$ on the Main Frame 1 or on the Frame Interface Unit $I_U$, the Connecting Bolt $B_C$ is screwed into the Screw Bushing $B_S$, (cf. FIGS. 31 and 33B).

When the Connecting Bolt $B_C$ is tightened, the Compensation Adapter $A_O$ including Thrust Rings $R_{T1}$, $R_{T2}$, Expansion Ring $R_E$ and Alignment Bushing $B_A$ is then pulled inward in the locating hole $O_R$ of the Rear Frame Interface Arrangement $I_R$ (in FIG. 33C, drawn to the right according to the direction of arrow P) until the inner Thrust Ring $R_{T2}$ comes to rest against the outer End Face $F_E$ of the Rear Frame Interface Unit $I_{DR}$ of the Frame Interface Unit $I_U$.

When the Connecting Bolt $B_C$ was further tightened, the compensating adapter $A_O$ was axially compressed in such a way that the Thrust Rings $R_{T1}$ and $R_{T2}$ were pressed axially into the Expansion Ring $R_E$, increasing the outside diameter of the Expansion Ring $R_E$ until the Expansion Ring $R_E$ was firmly pressed into the location hole $O_R$ by friction.

Thus, merely by tightening the Connecting Bolt $B_C$, a backlash-free, fixed connection is automatically produced both axially and radially (in relation to the Connecting Bolt $B_C$) between the Drive Unit $D_U$ and the Main Frame 1 or the Frame Interface Unit $I_U$.

This accelerates and facilitates the assembly of the Drive Unit $D_U$, in particular with regard to the fact that in practice on the bicycle market it will be combined with a wide variety of Bicycle Frames or with possibly different Frame Interface Units $I_U$, whereby the Bicycle Frame, or possibly the Frame Interface Unit $I_U$, can come from or be supplied by a wide variety of manufacturers.

Experience shows that this can result in a wide variety of tolerance situations with regard to the Support Width $W_S$ of the rear Drive Unit Interface $I_{DR}$. Such different tolerance situations, depending on the origin of the Bicycle Frame or the Frame Interface Unit $I_U$, respectively, can thus be handled and compensated for in the simplest way, in particular with the compensation adapter $A_O$ of the second embodiment example according to FIGS. 29C to 34.

Precise adaptation to any tolerances of the Main Frame 1 or the Frame Interface Unit $I_U$ and a tight, backlash-free connection between the Drive Unit $D_U$ and the Main Frame 1 or the Frame Interface Unit $I_U$ in all three spatial directions is not only important with regard to the safe and reliable transmission of the considerable drive and Chain Traction Forces, as described further above in FIG. 17 but also to avoid noises such as creaking or squeaking.

Since in the prior art at least two or more fastening axes are usually used to connect the Drive Unit and the Bicycle Frame, but in which, unlike in the present disclosure, no specific division of tasks is made among the various fastening axes with respect to power transmission, torque transmission and fixation of the degrees of freedom of movement of the Drive Unit relative to the Bicycle Frame, considerable difficulties frequently arise there with respect to tolerance compensation when mounting the Drive Unit in the Bicycle Frame, as well as with respect to a permanently fixed and play-free connection between the Drive Unit and the Bicycle Frame.

As already explained in detail above in the description of FIG. 17, this problem is eliminated with the Drive Unit $D_U$ according to the present disclosure, in particular by the fact that exactly two fastening axes are provided, of which the rear fastening axis is positioned very close to the essential force application lines and takes over the fixation of all degrees of freedom of movement except for a rotational degree of freedom $F_R$ of the Drive Unit $D_U$, and that the front fastening axis is designed only and specifically as a torque arm for fixating the remaining rotational degree of freedom $F_R$ of the Drive Unit $D_U$.

FIG. 34 shows the second embodiment example for the Drive Unit $D_U$ according to FIGS. 29C to 33 again in a perspective overall view viewed from the rear left. It can again be seen that the Drive Unit $D_U$ includes a Motor Device $M_E$ as well as a Bottom Bracket Assembly $A_B$ with a Bottom Bracket Shaft $S_B$. Furthermore, the battery or Integrative Energy Storage Device $S_i$ for supplying power to the Motor Device $M_E$ can be seen. The Integrative Energy Storage Device $S_i$ is arranged adjacent to the Motor Device $M_E$.

Since in particular the properties and assemblies of the Drive Unit $D_U$ that are essential for the center of gravity positions $C_{GE}$, $C_{GC}$ according to the second embodiment according to FIGS. 29C to 34, especially the properties of the Integrative Energy Storage Device $S_i$, correspond to those of the first embodiment (cf. FIGS. 29A to 29D), a synopsis of FIG. 34 with one of FIGS. 17 to 19 and 23 shows that the center of gravity positions $C_{GE}$, $C_{GC}$ of Energy Storage Device $S_i$ and Drive Unit $D_U$ also lie advantageously within the Bottom Bracket Area R in Drive Unit $D_U$ according to the second embodiment according to FIGS. 29C to 34.

Also, all other features and advantages as described above with respect to the first embodiment example according to FIGS. 17 to 29B, as well as with respect to the embodiments according to FIGS. 2 to 16, are also present in the second embodiment example according to FIGS. 29C to 34.

The following clauses are offered as further description of the examples. Any one or more of the following clauses may be combinable with any another one or more of the following clauses. Any one of the following clauses may stand on its own merit without having to be combined with another other of the above-identified clauses. Clause 1: the Electric Bicycle Drive Unit of any clause mentioned in this paragraph, further including an Electric Motor Device having a Bottom Bracket Assembly and a Bottom Bracket Shaft; and an Integrative Energy Storage Device for supplying energy to the electric motor device, wherein the Integrative Energy Storage Device is arranged adjacent to the electric motor device so that a center of gravity position of the Energy Storage Device and a center of gravity position of the Electric Bicycle Drive Unit lie within the Bottom Bracket Area of a bicycle frame. Clause 2: the Electric Bicycle Drive Unit of any clause mentioned in this paragraph, wherein the Integrative Energy Storage Device is attached directly on a housing of the electric motor device. Clause 3: the Electric Bicycle Drive Unit of any clause mentioned in this paragraph, wherein the Integrative Energy Storage Device is at least partially enclosed by a housing of the electric motor device. Clause 4. the Electric Bicycle Drive Unit of any clause mentioned in this paragraph, wherein the Integrative Energy Storage Device is at least partially arranged with the electric motor device in a common drive housing. Clause 5: the Electric Bicycle Drive Unit of any clause mentioned in this paragraph, wherein in an operational state of the Drive Unit, the Integrative Energy Storage Device is not attached to the Bicycle Frame and the Integrative Energy Storage Device is attached to any one of the Motor Device, a housing of the Motor Device, or a common drive housing. Clause 6: the Electric Bicycle Drive Unit of any clause mentioned in this paragraph, wherein the Integrative Energy Storage Device is arranged, at least in part, in a Down Tube of the Bicycle Frame. Clause 7: the Electric Bicycle Drive Unit of any clause mentioned in this paragraph, wherein an Auxiliary Energy Storage Device is associated with the Electric Bicycle Drive Unit and the Auxiliary Energy Storage Device is arranged, at least in part, in a Down Tube of the Bicycle Frame. Clause 8: the Electric Bicycle Drive Unit of any clause mentioned in this paragraph, wherein the Auxiliary Energy Storage Device is mechanically fixed to any one of the Electric Bicycle Drive Unit or to the Integrative Energy Storage Device. Clause 9: the Electric Bicycle Drive Unit of any clause mentioned in this paragraph, wherein the Auxiliary Energy Storage Device is integrated into the Integrative Energy Storage Device. Clause 10: the Electric Bicycle Drive Unit of any clause mentioned in this paragraph, wherein, in a mounted state of the Electric Bicycle Drive Unit on the Bicycle Frame, the Integrative Energy Storage Device is arranged outside a Down Tube of the Bicycle Frame. Clause 11: the Electric Bicycle Drive Unit of any clause mentioned in this paragraph, wherein the Integrative Energy Storage Device is located at least partially below an axis of rotation of the Bottom Bracket Shaft. Clause 12: the Electric Bicycle Drive Unit of any clause mentioned in this paragraph, wherein a center of mass of the Integrative Energy Storage Device and a center of mass of the Electric Bicycle Drive Unit is within a circumference with the radius less than or equal to 175 mm around the axis of rotation of the Bottom Bracket Shaft. Clause 13: the Electric Bicycle Drive Unit of any clause mentioned in this paragraph, wherein a Center of Mass of the Integrative Energy Storage Device and a Center of Mass of the Electric Bicycle Drive Unit is within an upper right Bottom Bracket Quadrant having a side length less than or equal to 175 mm. Clause 14: the Electric Bicycle Drive Unit of any clause mentioned in this paragraph, wherein a center of mass of the Integrative Energy Storage Device and a Center of Mass of the Electric Bicycle Drive Unit is located at a height of less than or equal to 50 mm above the axis of rotation of the Bottom Bracket Shaft. Clause 15: the Electric Bicycle Drive Unit of any clause mentioned in this paragraph, further including a drive protection shield fastened to any one of a housing of the motor device or to a common drive housing of the Electric Bicycle Drive Unit, wherein the drive protection shield forms a movable closure flap for covering, holding, or both covering and holding the Integrative Energy Storage Device. Clause 16: the Electric Bicycle Drive Unit of any clause mentioned in this paragraph, further including two Rear Frame Interface Arrangements that define a Front mounting axis and a Rear mounting axis. Clause 17: the Electric Bicycle Drive Unit of any clause mentioned in this paragraph, wherein the front mounting axis and the rear mounting axis are arranged in a vertical region above a horizontal plane that contains the axis of rotation of the Bottom Bracket Shaft, and below a horizontal plane that contains a point of application of the Chain Pull Force. Clause 18: the Electric Bicycle Drive Unit of any clause mentioned in this paragraph, wherein the front mounting axis and the rear mounting axis are arranged in front of a vertical plane that contains the axis of rotation of the Bottom Bracket Shaft. Clause 19: the Electric Bicycle Drive Unit of any clause mentioned in this paragraph, wherein the front mounting axis and the rear mounting axis are arranged in front of an Inclined Plane that contains the axis of rotation of the Bottom Bracket Shaft, the Inclined Plane being tilted forwards by an angle of 50° relative to a horizontal plane. Clause 20: the Electric Bicycle Drive Unit of any clause mentioned in this paragraph, wherein the front mounting axis and the rear mounting axis are arranged within an angle α of 30° to 80° located in a top right Bottom Bracket Quadrant, the vertex of the angle coinciding with the axis of rotation of the Bottom Bracket Shaft. Clause 21: the Electric Bicycle Drive Unit of any clause mentioned in this paragraph, wherein a Support Width is selected as the distance between a left-hand and a right-hand Interface Planes of a Rear Frame Interface Arrangement such that a Support Factor, defined as a quotient of the Support Width and a Pedal Force Effective Width, is greater than 0.5. Clause 22: the Electric Bicycle Drive Unit of any clause mentioned in this paragraph, wherein a Support Width is selected as a distance between a left-hand and a right-hand Interface Planes of a Rear Frame Interface Arrangements such that a Chain Pull Factor, defined as a quotient of the Support Width and a Chain Pull Horizontal Distance, is greater than 5. Clause 23: the Electric Bicycle Drive Unit of any clause mentioned in this paragraph, wherein all degrees of freedom of movement of the Drive Unit relative to the Bicycle Frame or relative to a Frame Interface Unit is fixed via a Rear Frame Interface Arrangement, with the exception of a degree of freedom of rotation about an axis of rotation parallel to the axis of rotation of the Bottom Bracket Shaft. Clause 24: the Electric Bicycle Drive Unit of any clause mentioned in this paragraph, wherein a degree of rotational freedom can be fixed by a Front Frame Interface Arrangement relative to the Bicycle Frame or relative to a Frame Interface Unit by means of a frictional connection. Clause 25: the Electric Bicycle Drive Unit of any clause mentioned in this paragraph, wherein the Rear Frame Interface Arrangement has a Frame Offset Adapter configured to: compensate for width tolerances of the Bicycle Frame or of a Frame Interface Unit, radially fix the Rear Frame Interface Arrangement relative to the Bicycle Frame or to the Frame Interface Unit, and provide play-free adjustable axial tolerance compensation between the Rear Frame Interface Arrangement and the Bicycle Frame or Frame Interface Unit. Clause 26: the Electric Bicycle Drive Unit of any clause mentioned in this paragraph, wherein the Frame Offset Adapter is a stepped sleeve that can be screwed axially adjustably into a receiving bore of the drive housing. Clause 27: the Electric Bicycle Drive Unit of any clause mentioned in this paragraph, wherein the Frame Offset Adapter is a radial clamping device that can be received axially displaceably in a receiving bore of the drive housing. Clause 28: the Electric Bicycle Drive Unit of any clause mentioned in this paragraph, further including a hermetically sealed Controller Enclosure arranged in a space region between the Motor Device and the Energy Storage Device for receiving a Controller Device for controlling any one or a combination of the Motor Device and the Energy Storage Device. Clause 29: the Electric Bicycle Drive Unit of any clause mentioned in this paragraph, wherein the Controller Enclosure further includes a plugless Current Interface for connecting the Controller Device to the Energy Storage Device with one or more Interface Planes arranged parallel to a Removal Direction of the Energy Storage Device in such a way that the Current Interface is opened by removing the battery and connected by inserting the battery. Clause 30: the Electric Bicycle Drive Unit of any clause mentioned in this paragraph, further including an output shaft of the motor device arranged coaxially with the Bottom Bracket Shaft. Clause 31: the Electric Bicycle Drive Unit of any clause mentioned in this paragraph, further including bearing mounts for a swing arm of a sprung rear frame. Clause 32: A Bicycle Frame of any clause mentioned in this paragraph, including a Frame Interface Rear Connection and a Frame Interface Front Connection for connection to an Electric Bicycle Drive Unit having a rear mounting axis and a front mounting axis, wherein the frame interface rear connection fixes degrees of freedom of movement of the Electric Bicycle Drive Unit with respect to the Bicycle Frame except for a degree of rotational freedom about the rear mounting axis, and the Frame Interface Front Connection fixes the degree of rotational freedom of the Drive Unit about the rear mounting axis. Clause 33: the Bicycle Frame of any clause mentioned in this paragraph, further including a Support Factor, defined as a quotient of a Support Width and a Pedal Force Effective Width, wherein the Support Factor is greater than 0.5. Clause 34. the Bicycle Frame of any clause mentioned in this paragraph, further including a Chain Pull Factor, defined as a quotient of a Support Width and a Chain Pull Horizontal Distance, wherein the Chain Pull Factor is greater than 5. Clause 35: an Energy Storage Device of any clause mentioned in this paragraph, including a wireless transceiver for wirelessly communicating with a battery controller; and a connector for electrically connecting to an electric motor device so that the Energy Storage Device supplies energy to the electric motor device, wherein the center of gravity position of the Integrative Energy Storage Device lies within the Bottom Bracket Area of a bicycle frame. Clause 36: the Energy Storage Device of any clause mentioned in this paragraph, further including a connector for electrically connecting to an auxiliary energy storage device.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems may generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. An Electric Bicycle Drive Unit comprising:
an Electric Motor Device having a Bottom Bracket Assembly and a Bottom Bracket Shaft and a motor output shaft, the motor output shaft being arranged coaxially with the Bottom Bracket Shaft; and an Integrative Energy Storage Device for supplying energy to the electric motor device,
wherein the Electric Motor Device and the Integrative Energy Storage Device are configured to be separable, allowing the Energy Storage Device to be user-removable independently of the Electric Motor Device,
wherein the Integrative Energy Storage Device is arranged adjacent to the electric motor device so that a center of gravity position of the Energy Storage Device and a center of gravity position of the Electric Bicycle Drive Unit lie within the Bottom Bracket Area of a bicycle frame,
wherein the Integrative Energy Storage Device is at least partially enclosed by a Motor Housing of the Electric Motor Device, the Motor Housing simultaneously forming a Common Drive Housing for the Electric Motor Device and the Integrative Energy Storage Device, the Common Drive Housing not being a part of the bicycle frame.

2. The Electric Bicycle Drive Unit of claim 1, wherein in an operational state of the Drive Unit the Integrative Energy Storage Device is attached to any one of the Motor Device, a housing of the Motor Device, or a common drive housing.

3. The Electric Bicycle Drive Unit of claim 1, wherein the Integrative Energy Storage Device is arranged, at least in part, in a Down Tube of the Bicycle Frame.

4. The Electric Bicycle Drive Unit of claim 1, wherein an Auxiliary Energy Storage Device is associated with the Electric Bicycle Drive Unit and the Auxiliary Energy Storage Device is arranged, at least in part, in a Down Tube of the Bicycle Frame.

5. The Electric Bicycle Drive Unit of claim 4, wherein the Auxiliary Energy Storage Device is mechanically fixed to any one of the Electric Bicycle Drive Unit or to the Integrative Energy Storage Device.

6. The Electric Bicycle Drive Unit of claim 1, wherein the Integrative Energy Storage Device is located at least partially below an axis of rotation of the Bottom Bracket Shaft.

7. The Electric Bicycle Drive Unit of claim 1, wherein a center of mass of the Integrative Energy Storage Device and a center of mass of the Electric Bicycle Drive Unit is within a circumference with the radius less than or equal to 175 mm around the axis of rotation of the Bottom Bracket Shaft.

8. The Electric Bicycle Drive Unit of claim 1, wherein a center of mass of the Integrative Energy Storage Device and a Center of Mass of the Electric Bicycle Drive Unit is located at a height of less than or equal to 50 mm above the axis of rotation of the Bottom Bracket Shaft.

9. The Electric Bicycle Drive Unit of claim 1, further comprising a drive protection shield fastened solely to any one of a housing of the motor device or to a common drive housing of the Electric Bicycle Drive Unit, wherein the drive protection shield forms a movable closure flap for covering, holding, or both covering and holding the Integrative Energy Storage Device.

10. The Electric Bicycle Drive Unit of claim 1, further comprising two Frame Interface Arrangements that define a Front mounting axis and a Rear mounting axis.

11. The Electric Bicycle Drive Unit of claim 10, wherein the front mounting axis and the rear mounting axis are arranged in a vertical region above a horizontal plane that contains the axis of rotation of the Bottom Bracket Shaft, and below a horizontal plane that contains a point of application of a Chain Pull Force.

12. The Electric Bicycle Drive Unit of claim 10, wherein the front mounting axis and the rear mounting axis are arranged in front of a vertical plane that contains the axis of rotation of the Bottom Bracket Shaft.

13. The Electric Bicycle Drive Unit of claim 10, wherein the front mounting axis and the rear mounting axis are arranged within an angle of 30° to 80° located in a top right Bottom Bracket Quadrant, the vertex of the angle coinciding with the axis of rotation of the Bottom Bracket Shaft.

14. The Electric Bicycle Drive Unit of claim 1, wherein a Support Width is selected as the distance between a left-hand and a right-hand Interface Planes of a Rear Frame Interface Arrangement such that a Support Factor, defined as a quotient of the Support Width and a Pedal Force Effective Width, is greater than 0.5.

15. The Electric Bicycle Drive Unit of claim 1, wherein all degrees of freedom of movement of the Drive Unit relative to the Bicycle Frame or relative to a Frame Interface Unit are fixed via a Rear Frame Interface Arrangement, with the exception of a degree of freedom of rotation about an axis of rotation parallel to the axis of rotation of the Bottom Bracket Shaft.

16. The Electric Bicycle Drive Unit of claim 15, wherein a degree of rotational freedom can be fixed by a Front Frame Interface Arrangement relative to the Bicycle Frame or relative to a Frame Interface Unit by means of a frictional connection.

17. The Electric Bicycle Drive Unit of claim 15, wherein the Rear Frame Interface Arrangement has a Frame Offset Adapter configured to:
compensate for width tolerances of the Bicycle Frame or of a Frame Interface Unit,
radially fix the Rear Frame Interface Arrangement relative to the Bicycle Frame or to the Frame Interface Unit, and
provide play-free adjustable axial tolerance compensation between the Rear Frame Interface Arrangement and the Bicycle Frame or Frame Interface Unit.

18. The Electric Bicycle Drive Unit according to claim 1 further comprising a Controller Enclosure including a plug-less Current Interface for connecting the Controller Device to the Energy Storage Device with one or more Interface Planes arranged parallel to a Removal Direction of the Energy Storage Device in such a way that the Current Interface is opened by removing the Energy Storage Device and connected by inserting the Energy Storage Device.

19. The Electric Bicycle Drive Unit of claim 1 further comprising an output shaft of the motor device arranged coaxially with the Bottom Bracket Shaft.

20. The Electric Bicycle Drive Unit of claim 1 further comprising bearing mounts for a swing arm of a sprung rear frame.

* * * * *